(12) United States Patent
Miranda et al.

(10) Patent No.: US 8,286,112 B2
(45) Date of Patent: Oct. 9, 2012

(54) METHODS FOR CHARACTERIZATION OF ELECTRONIC CIRCUITS UNDER PROCESS VARIABILITY EFFECTS

(75) Inventors: Miguel Miranda, Kessel-Lo (BE); Bart Dierickx, Edegem (BE); Ankur Anchlia, Indore (IN)

(73) Assignee: IMEC, Leuven (BE)

( * ) Notice: Subject to any disclaimer, the term of this patent is extended or adjusted under 35 U.S.C. 154(b) by 997 days.

(21) Appl. No.: 12/144,491

(22) Filed: Jun. 23, 2008

(65) Prior Publication Data

US 2009/0031268 A1    Jan. 29, 2009

Related U.S. Application Data

(60) Provisional application No. 60/945,899, filed on Jun. 22, 2007.

(51) Int. Cl.
*G06F 17/50* (2006.01)
(52) U.S. Cl. ...................................... 716/110
(58) Field of Classification Search .................. 716/100, 716/110
See application file for complete search history.

(56) References Cited

U.S. PATENT DOCUMENTS

| | | | | |
|---|---|---|---|---|
| 2004/0122642 | A1* | 6/2004 | Scheffer | 703/14 |
| 2004/0167756 | A1* | 8/2004 | Yonezawa | 703/2 |
| 2005/0204316 | A1* | 9/2005 | Nebel et al. | 716/2 |
| 2008/0005707 | A1* | 1/2008 | Papanikolaou et al. | 716/4 |
| 2009/0024378 | A1* | 1/2009 | Dierickx et al. | 703/14 |

FOREIGN PATENT DOCUMENTS

| | | |
|---|---|---|
| EP | 1 583 009 A1 | 10/2005 |
| EP | 1 873 665 A1 | 1/2008 |

OTHER PUBLICATIONS

Chen et al. "Area Fill Synthesis for Uniform Layout Density." *IEEE Transactions on Computer-Aided Design of Integrated Circuits and Systems*. 21(10):1132-1147 (2002).
Clark. "The Greatest of a Finite Set of Random Variables." *Operations Research*. 9(2):145-162 (1961). Located at <http://or.journal.informs.org/cgi/content/abstract/9/2/145>.
Dierickx et al. "Propagating Variability from Technology to System Level." *Physics of Semiconductor Devices*. pp. 74-79, 2007.
Dierickx et al. "'VAM IF' Variability and Reliability Aware Modeling Information format Definition and User Manual." *VAM Information Format Definition and User Manual*. Issue 3.1. Sep. 10, 2008.
Extended European Search Report dated Nov. 5, 2008 for European Patent Application No. 08158713.1.

(Continued)

*Primary Examiner* — Suchin Parihar
(74) *Attorney, Agent, or Firm* — Knobbe Martens Olson & Bear LLP

(57) ABSTRACT

A method for determining an estimate of statistical properties of an electronic system comprising individual components subject to manufacturing process variability is disclosed. In one aspect, the method comprises obtaining statistical properties of the performance of individual components of the electronic system, obtaining information about execution of an application on the system, simulating execution of the application based on the obtained information about execution of the application on the system for a simulated electronic system realization constructed by selecting individual components with the obtained statistical properties determining the delay and energy of the electronic system, and determining the statistical properties of the delay and energy of the electronic system.

11 Claims, 46 Drawing Sheets

OTHER PUBLICATIONS

Grobman et al. "Reticle Enhancement Technology: Implications and Challenges for Physical Design." *DAC.* Jun. 18-22, 2001.

Gupta et al. "Toward a Systematic-Variation Aware Timing Methodology." *DAC.* 321-326. Jun. 7-11, 2004.

Harish et al. "Process Variability-Aware Statistical Hybrid Modeling of Dynamic Power Dissipation in 65 nm CMOS Designs." *Proceedings of the International Conference on Computing: Theory and Applications.* 94-98. Mar. 2007.

Jaffari. "Statistical Thermal Profile Considering Process Variations: Analysis and Applications." *IEEE Transactions on Computer Aided Design of Integrated Circuits and Systems.* 27(6):1027-1040 (2008).

Kim et al. "TCAD-Based Statistical Analysis and Modeling of Gate Line-Edge Roughness Effect on Nanoscale MOS Transistor Performance and Scaling." *IEEE Transactions on Semiconductor Manufacturing.* 17(2):192-200 (2004).

Papanikolaou et al. "A System-Level Methodology for Fully Compensating Process Variability Impact of Memory Organizations in Periodic Applications." *International Conference on Hardware/Software Codesign & System Synthesis.* Sep. 18-21, 2005. pp. 117-122.

Papanikolaou et al. U.S. Appl. No. 60/817527, entitled "A Method for Exploring Feasibility of an Electronic System Design", filed Jun. 28, 2006.

Pelgrom et al. "Matching Properties of MOS Transistors." *The Journal of Solid-State Circuits.* 24(5):1433-1440 (1989).

Sinha et al. "Advances in Computation of the Maximum of a Set of Random Variables." *Proceedings of the 7th International Symposium on Quality Electronic Design.* 2006.

Stok et al. "Structured CAD: Technology Closure for Modern ASICs." Conference—Apr. 2004.

Sylvester. "Toward Performance-Driven Reduction of the Cost of RET-based Lithography Control." Proc. SPIE vol. 5043 (2003). Located at <http://spiedl.aip.org/getabs/servlet/GetabsServlet?prog=normal&id=PSISDG005043000001000123000001&idtype=cvips&gifs=yes>.

Synopsys, Sold—Synopsys online documentation shipped with every release, 2007.

Wettstein et al. "Random Dopant Fluctuation Modelling with the Impedance Field Method." *IEEE.* 91-94 (2003).

Zhao et al. "New generation of predictive technology model for sub-45nm design exploration." *Proceedings of the 7th International Symposium on Quality Electronic Design* (2006).

Arm. Artisan ARM Physical IP—Memory Compiler—http://www.arm.com/products/physicalip/memory.html. Nov. 19, 2008.

"International Technology Roadmap for Semiconductors," http://public.itrs.net. Jul. 25, 2008.

* cited by examiner

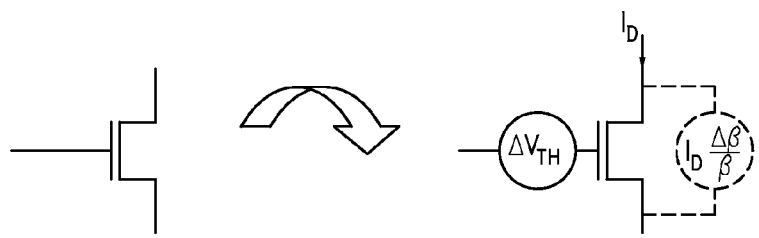

FIG. 3

| | (3) RTL Simulation Bit-level Activities |
|---|---|
| System parametric yield | |
| Statistical characterization of SoC architecture | (7) Analyse statistical architecture |
| | Statistical Energy/Delay per Component |
| | (6) Calculate Component statistics |
| Statistical digital characterization for std-cell blocks | Variability Energy/Delay per Component |
| | (5) Simulate random logic Component |
| | Variability logic Component (.verilog) |
| | (4) Create random logic Components |
| Statistical std cell library characterization | Characterized random std-cells (.lib) |
| | (2) Characterize std-cell |
| | Variable standart cells (.sp) |
| | (1) Create random cells |
| | Compact model + $\Delta VT/\Delta\beta$ |

FIG. 4

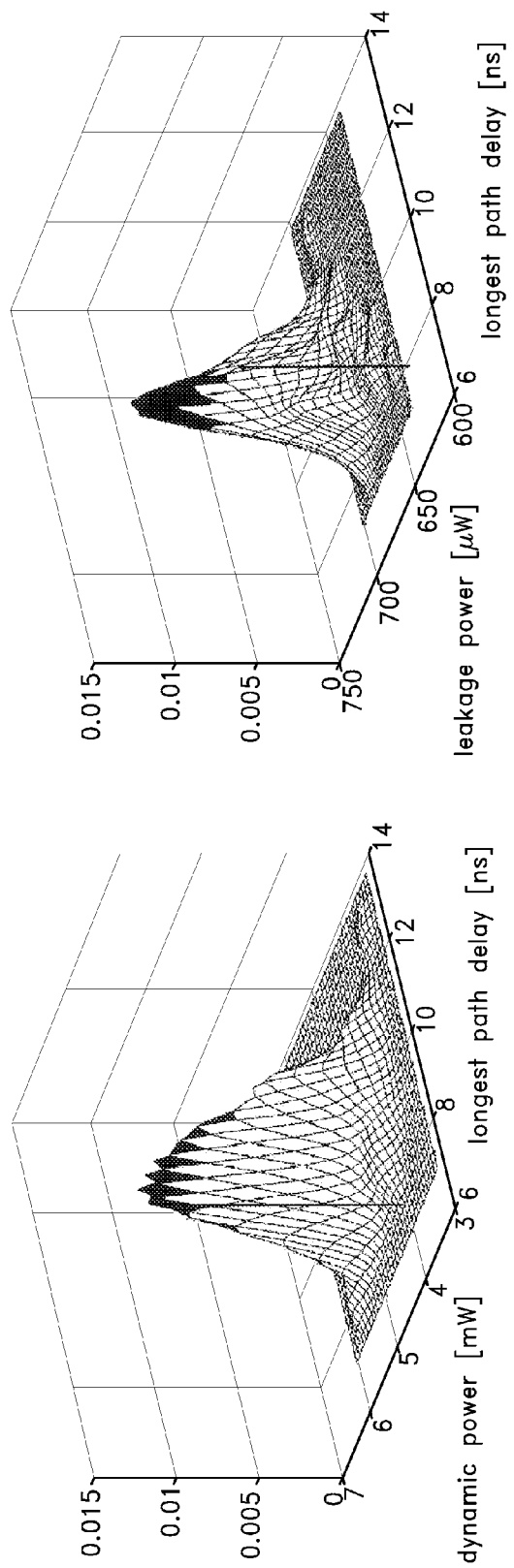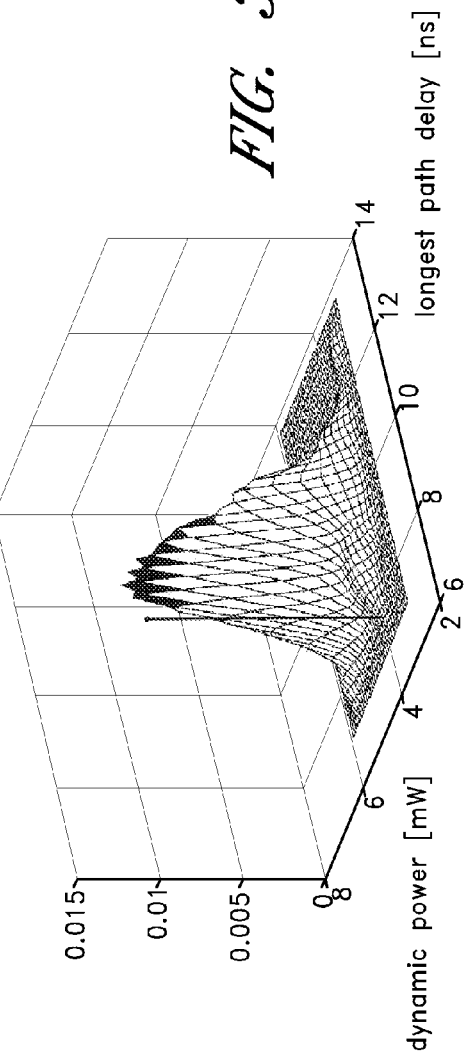
FIG. 32A
FIG. 32B
FIG. 32C

```
-- Original RTL
....
if (Clk'event and Clk='1') then
    signal_RHS <= signal_LHS;
    ....
end if
....

-- Transformed RTL entity DM is
    port(DMDin, DMQin, Clk, Rst, TADClk: in std_logic;
    Sout: out std_logic);
end DM;

....
if (Clk'event == 1) then
    signal_RHS <= signal_LHS;
    ....
end if
....
-- Delay Monitor insertion
    DelayMonitor_Inst1: DM
    port map (
            DMDin => signal_LHS,
            DMQin => signal_RHS,
            Clk => Clk,
            Rst => Rst,
            TADClk => TADClk,
            Sout => DelayMouts(0)
            );
....
```

*FIG. 35*

METHODS FOR CHARACTERIZATION OF ELECTRONIC CIRCUITS UNDER PROCESS VARIABILITY EFFECTS

CROSS REFERENCE TO RELATED APPLICATIONS

This application claims priority under 35 U.S.C. §119(e) to U.S. provisional patent application 60/945,899 filed on Jun. 22, 2007, which application is hereby incorporated by reference in its entirety.

TECHNICAL FIELD OF THE INVENTION

Certain inventive aspects relate to methods for characterization of electronic circuits under process variability effects, more in particular digital electronic circuits under random process variability effects, and systems/apparatus/modeling tools implementing such methods.

DESCRIPTION OF THE RELATED TECHNOLOGY

Thanks to technology scaling it has been possible to increase performance and reduce the energy consumption and the manufacturing costs in embedded system designs for more than 30 years. However, by scaling beyond 45 nm the unpredictability of electrical properties of devices is stopping this trend. Technology scaling past the 65 nm technology node, introduces a lot more unpredictability in the timing and energy consumption of the designs due to random within-die (WID) variations (hereafter called process variability). Treating these metrics at the system-on-chip (SoC) integration level as deterministic values via corner points requires the design margins to become so large that they can eat up all the benefits of moving to a more advanced technology node. Moreover the amount of corner points needed per process variability source increases dramatically every technology node leading to new statistical design paradigms.

Most of the existing work is focused at the gate level of abstraction with statistical static timing analysis (SSTA) as a method to analyze the timing of the circuits. Only very recently, statistical timing analysis has been combined with power optimization techniques to decide on the allocation of high or low threshold voltage gates hence co-optimizing timing and leakage power consumption. In this context, an approach has been proposed to estimate the correlated timing/leakage power distribution of a combinatorial circuit. Such a technique could handle yield estimation of power constrained systems but would fail capturing variability in switching power. To do so it should account for the impact of the application running on the SoC, crucial for the proper characterization of dynamic power and energy in general.

The reasons for ignoring the impact of process variability in switching power variation is the belief that they are solely attributed to capacitance variations, hence ignoring the contribution of variations in spurious activity which is correlated to timing variability. Indeed capacitance variations average linearly across the millions of switching nodes of the die and thus they alone have negligible impact on switching power. However, this does not necessarily mean it should be concluded there are no other sources of variability in switching power such as variability in activity. To a large degree, however, besides some work on studying the impact of systematic die to die variations, the impact of manufacturing variability in this area has not received much attention.

More importantly, energy and/or performance vs. cost trade-off decisions are an issue for embedded SoC design and the most critical trade-offs cannot be made at the gate level but at the higher IP-block or architecture level. Therefore some analysis techniques for timing and energy yield aware design are emerging to tackle the problem. However, these techniques often focus on memory organizations and are not generic enough to be applied to the full SoC context. These rely on the assumption that energy and timing are uncorrelated metrics and require percolating disjoint Gaussian statistical distributions for the statistics of the underlying SoC components.

SUMMARY OF CERTAIN INVENTIVE ASPECTS

Certain inventive aspects relate to a simulation approach that it is not constrained by the above limitations, hence capturing the fully correlated nature of the two metrics (e.g. timing and dynamic power) all the way up from the gate to the SoC level. The simulation may be used for estimating system-level yield loss of an electronic system.

Certain inventive aspects provide methods for characterization of digital electronic circuits under random process variability effects such as manufacturing process variability which may lead to manufacturing defects, and related systems/apparatus/modeling tools implementing such methods, capable for computing at least two metrics, the methods substantially preserving correlations between the metrics, the metrics being for example circuit delay and circuit power consumption. The method may further provide from the computed correlated metrics an estimate of the yield of the digital electronic circuit.

Since random process variability has lots of effects on the operation of such digital electronic circuits, the characterization methods are designed for obtaining large accuracy.

In embodiments of the present invention, the invented methods are organized in a hierarchical approach, covering device level, circuit level, gate level, component level, system level up to application level. The methods hence may provide information at higher abstraction level than gate level.

As a general summary it can be stated that certain inventive aspects provide for variability aware modeling (VAM) enabling characterizing digital blocks using statistical methods to obtain timing/power correlated metrics. This simulation flow may be used during the design development cycle, to give the designer an overview of the system's behavior after manufacturing. It presents the performance for each component, so the designer can optimize the system taking into consideration the impact of variability before manufacturing.

Reference is made to methods as described in EP-07075505.3, hereby fully incorporated by reference, which can be combined with this disclosure.

Design for manufacturability (DFM) solutions cannot deal with such unpredictable problems, because they cannot be deterministically modeled. In some embodiments of the present invention the proposed VAM approach targets the problems of parametric, intra-die, unpredictable and static nature.

In alternative embodiments a VAM approach extension with modules for inter-die and dynamic variability is provided.

Technology aware design (TAD) provides solutions for nanometer scaling problems. The traditional thinking sees two separate tracks between CMOS technology and design. Today both sides confront each other, because the new solutions are based on the knowledge of design and technology. TAD provides analysis and solution for these scaling problems, where VAM represents the analysis part. VAM focuses on scaling issues related to variability (static) and also reliability (dynamic), which are the challenges determining the benefits of scaling into the deep-deep sub micron. Variability includes transistor-to-transistor non-uniformity effects, up to wafer-to-wafer non-uniformity effects and degradation/ageing/drift. The model allows early variability estimation and also strategic solution for development of technology options and system architectures.

In the FIG. 2 the different modules/abstraction level used in the invented VAM flow are illustrated. Basically the whole VAM flow can be divided in three steps:

Variation Aware Timing/Energy Standard Cell Models: to characterize standard cells affected by variability. This is based on process variation aware device "compact models". This information includes the nominal compact models affected by variability and scaling rules for $\Delta V_t$, $\beta$, etc. The methodology for these tools is explained in the section "Statistical Characterization of Standard-Cells"

Variation Aware Timing/Energy Component Models: to simulate blocks in a specified architecture by using the application activity information and third party tools, e.g. in a Monte-Carlo (MC) like manner. Using MC and MC-like techniques and the variability aware standard cell information the scripts can statistically estimate the energy/delay of the architecture affected by variability. In the section "Statistical Characterization of Digital Components" a more detailed description of the methodology is given.

The "Statistical analog characterization for macroblocks", shown in the second row of FIG. 2, includes tools to estimate Energy/Delay of memories and register files. Because of the different structure of the memories in comparison with the structure of sequential or combinatoric blocks, different tools may be necessary.

Variation Aware Timing/Energy SoC Architecture Models: estimates the impact of variability in the parametric yield of the full architecture by using the Energy/Delay estimation of the architecture calculated by the previous paragraph. Reference is made to an analysis technique to do this described in EP-07075505.3. The goal there is to obtain a system wide trade-off cost model relating energy, system performance and parametric yield. To be able to use this simulation flow, a top-down system design flow is preferably provided by the design team. This design flow defines the system architecture and design constraints used during the subsequent synthesis steps. This part also provides a system level testbench used for system verification that may be reused for system characterization.

An inventive aspect of embodiments of the present invention relates to a method for computing the effects of for example semiconductor (e.g. Si) technology variability on systems designed with such technology. Since such variability is characterized by having outliers, the method may, according to embodiments of the present invention, be adapted to take this into account such that a rather accurate propagation of such outlier effects to system performance metrics is performed.

In an embodiment, the propagation of variability at a first level (e.g. the technology level) towards a second higher level, is performed by using Monte-Carlo simulations.

In a further embodiment thereof, the method enables the possibility to give higher weight to outliers.

In a further embodiment thereof, methods for determining an optimal weight factor are used.

Since Monte-Carlo simulations are computationally intensive and since the methods may need a plurality of Monte-Carlo simulations, e.g. to go in a hierarchical way from lower to higher level description via intermediate levels, the methods must be made computationally efficient while avoiding loss of accuracy. This can be done by applying compacting of the used populations in order to reduce the amount of simulations and/or reduce the needed storage space.

Since certainly at the lower levels (technology, transistor device, circuitry) the relations between the various levels are highly nonlinear, techniques capable of handling nonlinearities may be used. As an example response surface methods are demonstrated. Alternatively, where possible (e.g. at higher levels, such as component and system level), in case analytical expressions between the metrics at one level and the metrics at the higher level are known, these can be used either by defining an analytical solution and/or for constructing a numerical approach going beyond mere Monte-Carlo simulation. One example is demonstrated by defining a 2-D operator.

In an aspect, the present invention provides a method for determining an estimate of statistical properties of an electronic system comprising individual components subject to manufacturing process variability. The components subject to manufacturing process variability may lead to manufacturing defects of the electronic system. The method, which is executed on a computer, comprises (1) obtaining a description of the composition of the electronic system in terms of which individual components are used, (2) obtaining statistical properties of the performance of individual components of the electronic system;

(3) obtaining information about execution of an application on the system;

(4) simulating execution of the application based on the obtained information about execution of the application on the system for a simulated electronic system realization constructed by selecting individual components with the obtained statistical properties determining the properties of the 1st and 2nd performance variables of the electronic system;

(5) determining the statistical properties such as distribution (e.g. mean and variance) of the $1^{st}$ and 2nd performance variables of the electronic system;

(6) simulating execution of the application based on the obtained information about execution of the application on the system for another simulated electronic system realization constructed by selecting individual components with the obtained statistical properties determining the properties of the 1st and 2nd performance variables of the electronic system;

(7) updating the statistical properties of the $1^{st}$ and $2^{nd}$ performance variables of the electronic system; and (8) repetitively executing the steps (6) and (7).

Steps (6) and (7) may be repeated until a stop criterium is reached, e.g. until the updating of the statistical properties leads to a change in statistical properties which is below a pre-determined value, e.g. the variance on the mean value or the variance on the variance value drops below a pre-determined value.

In embodiments of the present invention, the 1st performance variable may be delay, and the 2nd performance variable may be energy consumption of the individual components and electronic system.

In embodiments of the present invention, the determining of the $1^{st}$ property of the electronic system realization may include critical path timing analysis and the timing of each of the individual components.

In embodiments of the present invention, the determining of the $2^{nd}$ property of the electronic system realization may include activity based energy consumption analysis based on the timing of the individual components. The determining and/or updating of the statistical properties of the electronic system may require combining the information from the critical path timing analysis and the activity based energy consumption analysis.

In embodiments of the present invention, the obtaining of statistical properties of the electronic system may at least partly be based on information gathered from run-time monitors inserted in manufactured electronic systems.

In embodiments of the present invention, the obtained statistical properties of the electronic system may be compared with information gathered from run-time monitors inserted in manufactured electronic systems, the comparison being used for calibrating the method, e.g. for updating the statistical information of the individual components.

A method according to embodiments of the present invention may furthermore comprise, based on the determined statistical properties of the electronic system, estimating system yield loss.

In a further aspect, the present invention provides a modeling tool adapted for carrying out a method in accordance with embodiments of the present invention.

A modeling tool according to embodiments of the present invention may comprise
an input port for receiving a description of the composition of an electronic system in terms of individual components used,
an input port for receiving distribution of statistical properties of the performance of the individual components of the electronic system,
an input port for receiving information about execution of an application on the system,
a simulator for simulating execution of the application on a simulated electronic system realization constructed by selecting individual components with the received statistical properties determining the properties of the 1st and 2nd performance variables of the electronic system, the simulating of the execution of the application being based on the obtained information about execution of the application on the system; and
a processor for determining statistical properties of the $1^{st}$ and $2^{nd}$ performance variables of the electronic system.

In a further aspect, the present invention provides a device for run-time control of a system, comprising:
an input port for receiving the energy-delay statistic behavior of the system due to manufacturing process variability as determined with a method according to embodiments of the present invention;
an input port for receiving a measurement of at least one actual delay characteristic of the system from a monitor inserted in the system;
a processor for determining from the energy-delay statistic behavior and the at least one measurement the statistic behavior in terms of energy; and
a controller for determining control actions on the system in accordance with the statistic behavior in terms of energy.

In a further aspect, the present invention provides a computer program product for executing any of the methods in accordance with embodiments of the present invention when executed on a computing device associated with a system-level simulator.

One inventive aspect also relates to a machine readable data storage storing the computer program product of embodiments of the present invention. One inventive aspect relates to a computer program product which provides the functionality of any of the methods when executed on a computing device. Such computer program product can be tangibly embodied in a carrier medium carrying machine-readable code for execution by a programmable processor. One inventive aspect thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution.

One inventive aspect also relates to transmission of the computer program product of embodiments of the present invention over a local or wide area telecommunications network. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Certain inventive aspects relate to transmission over a local or wide area telecommunications network of results of a method implemented by a computer program product as in embodiments of the present invention and executed on a computing device associated with a system-level simulator.

In one aspect, a method of determining an estimate of statistical properties of an electronic system comprising individual components subject to manufacturing process variability is disclosed. The method comprises obtaining a description of the composition of the electronic system in terms of which individual components are used. The method further comprises obtaining statistical properties of the performance of individual components of the electronic system. The method further comprises obtaining information about execution of an application on the system. The method further comprises simulating execution of the application based on the obtained information about execution of the application on the system for a simulated electronic system realization constructed by selecting individual components with the obtained statistical properties determining the properties of the 1st and 2nd performance variables of the electronic system. The method further comprises determining the statistical properties of the 1st and 2nd performance variables of the electronic system. The method further comprises repetitively (a) simulating execution of the application based on the obtained information about execution of the application on the system for another simulated electronic system realization constructed by selecting individual components with the obtained statistical properties determining the properties of the 1st and 2nd performance variables of the electronic system and (b) updating the statistical properties of the 1st and 2nd performance variables of the electronic system.

In another aspect, a modeling tool adapted for determining an estimate of statistical properties of an electronic system comprising individual components subject to manufacturing process variability is disclosed. The modeling tool comprises an input port for receiving a description of the composition of an electronic system in terms of individual components used. The modeling tool further comprises an input port for receiving distribution of statistical properties of the performance of the individual components of the electronic system. The modeling tool further comprises an input port for receiving information about execution of an application on the system. The modeling tool further comprises a simulator for simulating execution of the application on a simulated electronic system realization constructed by selecting individual components with the received statistical properties determining the properties of the 1st and 2nd performance variables of the electronic system, the simulating of the execution of the application being based on the obtained information about execution of the application on the system. The modeling tool further comprises a processor for determining statistical properties of the 1st and 2nd performance variables of the electronic system.

In another aspect, a device for run-time control of a system is disclosed. The device comprises an input port for receiving the energy-delay statistic behavior of the system due to manufacturing process variability. The device further comprises an input port for receiving a measurement of at least one actual delay characteristic of the system from a monitor inserted in the system. The device further comprises a processor for determining from the energy-delay statistic behavior and the at least one measurement the statistic behavior in terms of energy. The device further comprises a controller for determining control actions on the system in accordance with the statistic behavior in terms of energy.

In another aspect, a method of determining an estimate of statistical properties of an electronic system comprising individual components subject to manufacturing process variability is disclosed. The method comprises obtaining statistical properties of the performance of individual components of the electronic system. The method further comprises obtaining information about execution of an application on the system. The method further comprises simulating execution of the application based on the obtained information about execution of the application on the system for a simulated electronic system realization constructed by selecting individual components with the obtained statistical properties determining the properties of the 1st and 2nd performance variables of the electronic system. The method further comprises determining the statistical properties of the 1st and 2nd performance variables of the electronic system.

In another aspect, a system for determining an estimate of statistical properties of an electronic system comprising individual components subject to manufacturing process variability is disclosed. The system comprises means for obtaining a description of the composition of the electronic system in terms of which individual components are used. The system further comprises means for obtaining statistical properties of the performance of individual components of the electronic system. The system further comprises means for obtaining information about execution of an application on the system. The system further comprises means for simulating execution of the application based on the obtained information about execution of the application on the system for a simulated electronic system realization constructed by selecting individual components with the obtained statistical properties determining the properties of the 1st and 2nd performance variables of the electronic system. The system further comprises means for determining the statistical properties of the 1st and 2nd performance variables of the electronic system. The system further comprises means for repetitively (a) simulating execution of the application based on the obtained information about execution of the application on the system for another simulated electronic system realization constructed by selecting individual components with the obtained statistical properties determining the properties of the 1st and 2nd performance variables of the electronic system and (b) updating the statistical properties of the 1st and 2nd performance variables of the electronic system.

In another aspect, a system for determining an estimate of statistical properties of an electronic system comprising individual components subject to manufacturing process variability is disclosed. The system comprises a module for obtaining a description of the composition of the electronic system in terms of which individual components are used. The system further comprises a module for obtaining statistical properties of the performance of individual components of the electronic system. The system further comprises a module for obtaining information about execution of an application on the system. The system further comprises a module for simulating execution of the application based on the obtained information about execution of the application on the system for a simulated electronic system realization constructed by selecting individual components with the obtained statistical properties determining the properties of the 1st and 2nd performance variables of the electronic system. The system further comprises a module for determining the statistical properties of the 1st and 2nd performance variables of the electronic system. The system further comprises a module for repetitively (a) simulating execution of the application based on the obtained information about execution of the application on the system for another simulated electronic system realization constructed by selecting individual components with the obtained statistical properties determining the properties of the 1st and 2nd performance variables of the electronic system and (b) updating the statistical properties of the 1st and 2nd performance variables of the electronic system. Each module may be embodied in any suitable software/hardware.

BRIEF DESCRIPTION OF THE DRAWINGS

FIG. 4. The Gray scaled region shows the focus of the detailed description of the first embodiment of the present invention. The described Implementation starts in Cell level by using randomised Cells and finishes in the Component level with Energy and Delay results for randomised Component Netlists.

Figure 5:
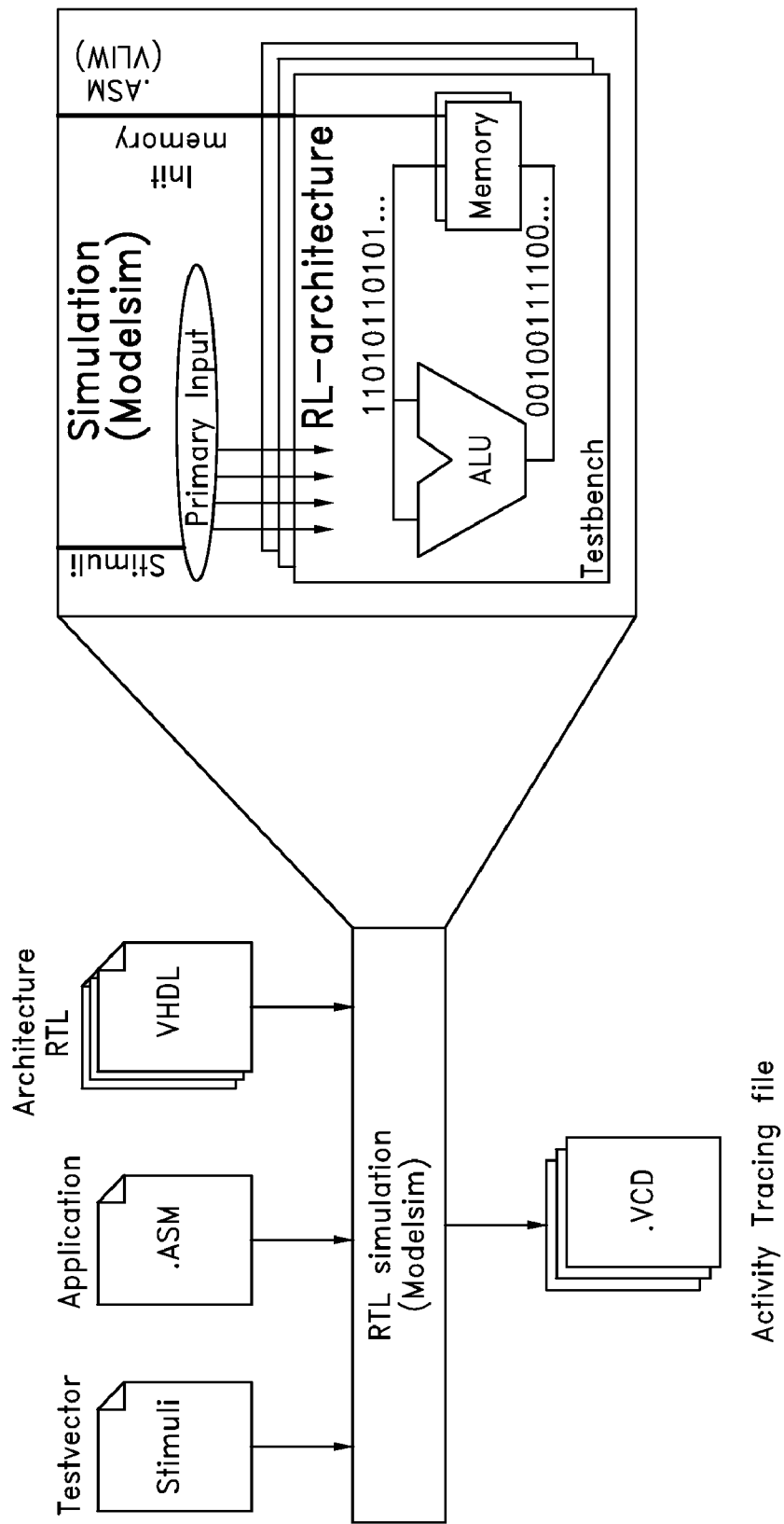

The left side of FIG. 5 shows input files used for simulating an architecture. The Simulation flow receives a Testbench, Stimuli file, RTL source of the architecture (description of the composition of the architecture) and information about execution of the application on the architecture. After initialising the memories the tool traces the net activities of the defined component during simulation of the architecture with the stimuli input vectors, as shown at the right side of FIG. 5.

Figure 6:
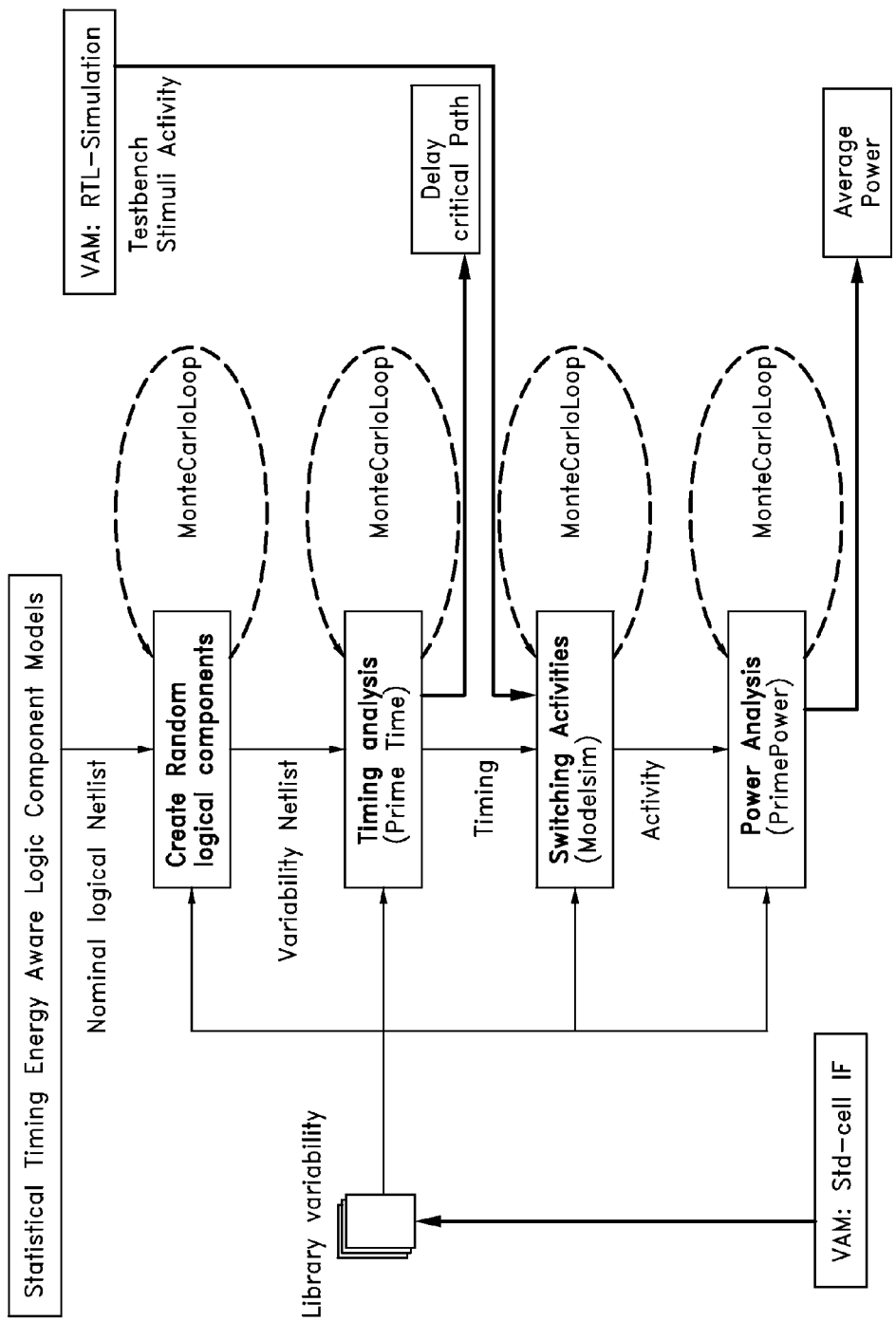

The Methodology of the Monte Carlo loops is shown in FIG. 6. For each defined component the tool calculates the timing and delay values by using the RTL trace information and the library information from the bottom VAM module.

Figure 7A:
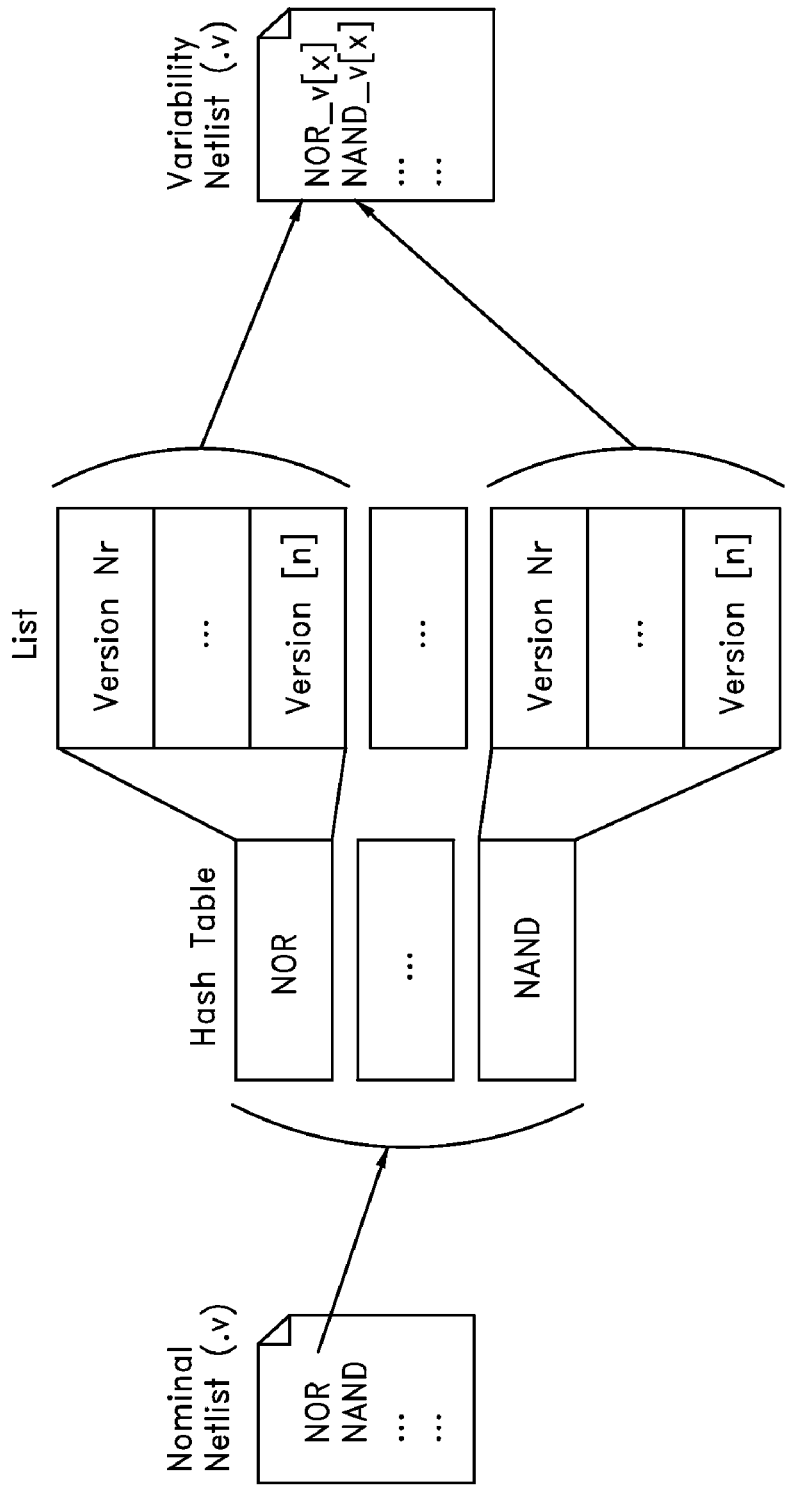

FIG. 7a. The Random Netlist Generator saves the different Cell names into a Hash table. The Cell name is the key to an extended list, where the different Version numbers are saved. If the script finds the target Cell name in the hash table it uses a random key for the extended Hash table to obtain a version of the cell, which is then used to replace the target cell in the variability netlist.

Figure 7B:
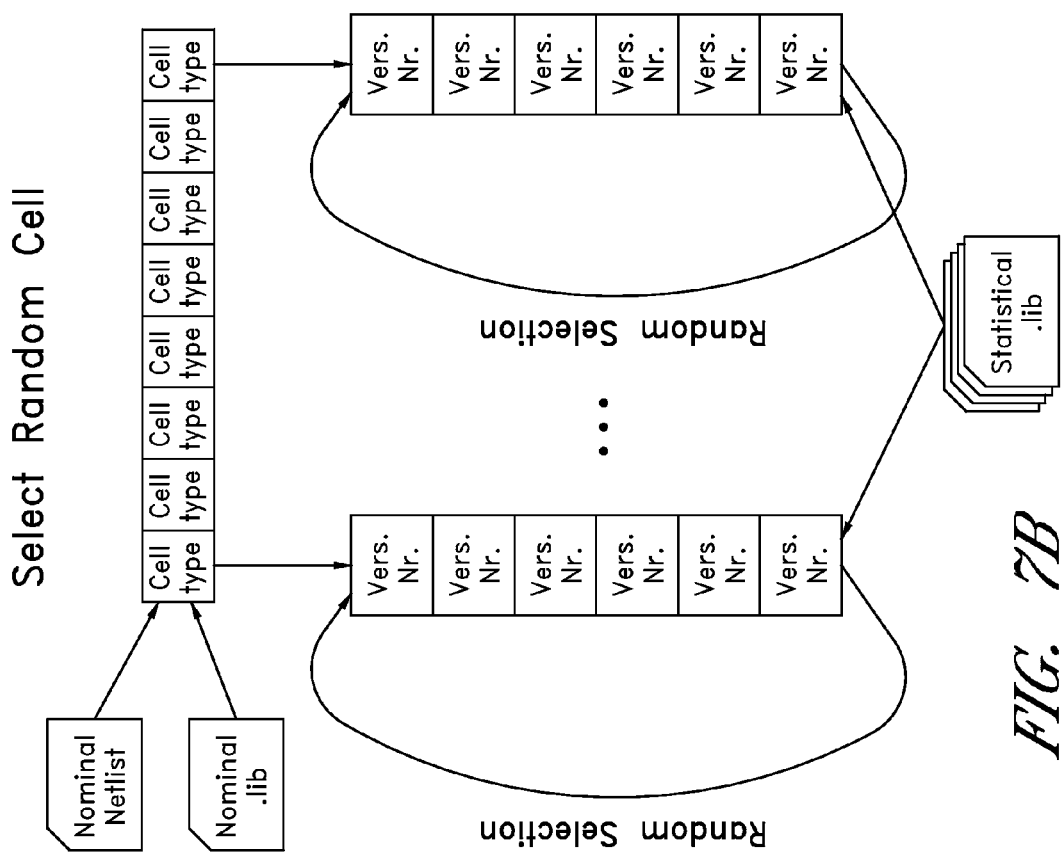

FIG. 7b illustrates an alternative implementation of the Random Netlist Generator avoiding the use of a hash table. The nominal Cell name is the first key to a double list. The second key points to where the different version numbers have been saved. When the script finds the target Cell name in the first list it uses a random key for accessing the second list to obtain a version of the cell, which is then used to exchange the target cell name in the variability netlist.

Figure 8A:
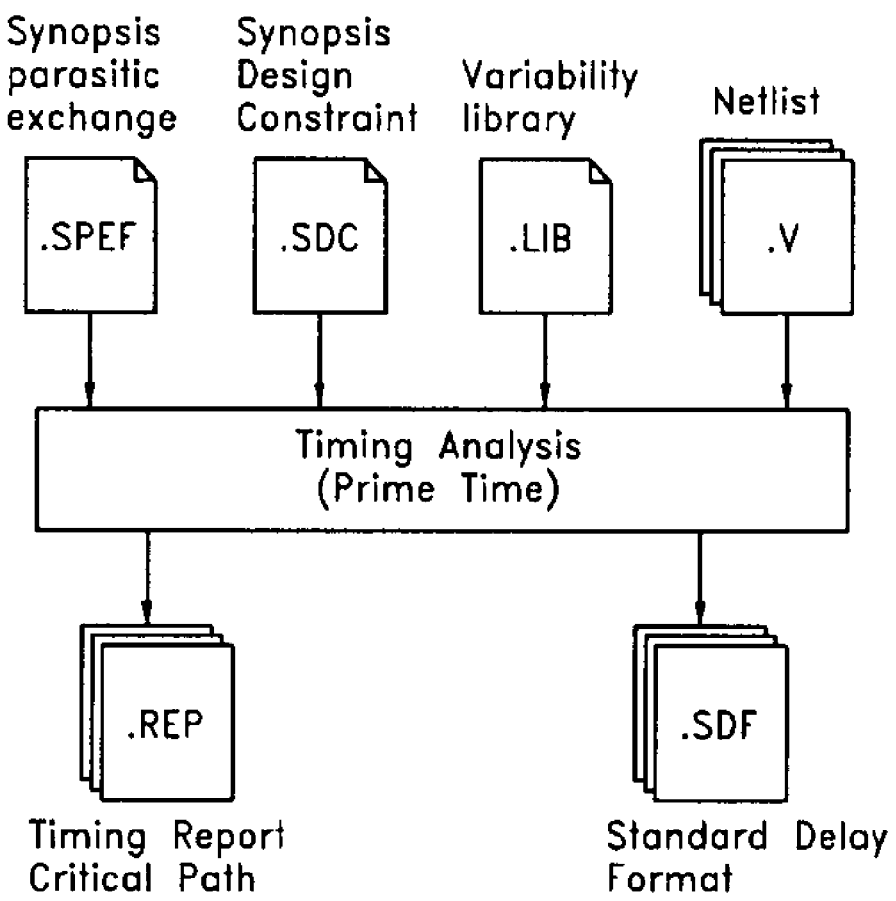

FIG. 8a. The timing analysis (Prime Time) script uses the variability library (LIB), synopsys design constraint (SDC) and the MC Netlists (verilog) to calculate the standard delay format (SDF) and the delay of the critical path. The result is the statistical timing per gate and the statistical critical path of the blocks.

Figure 8B:
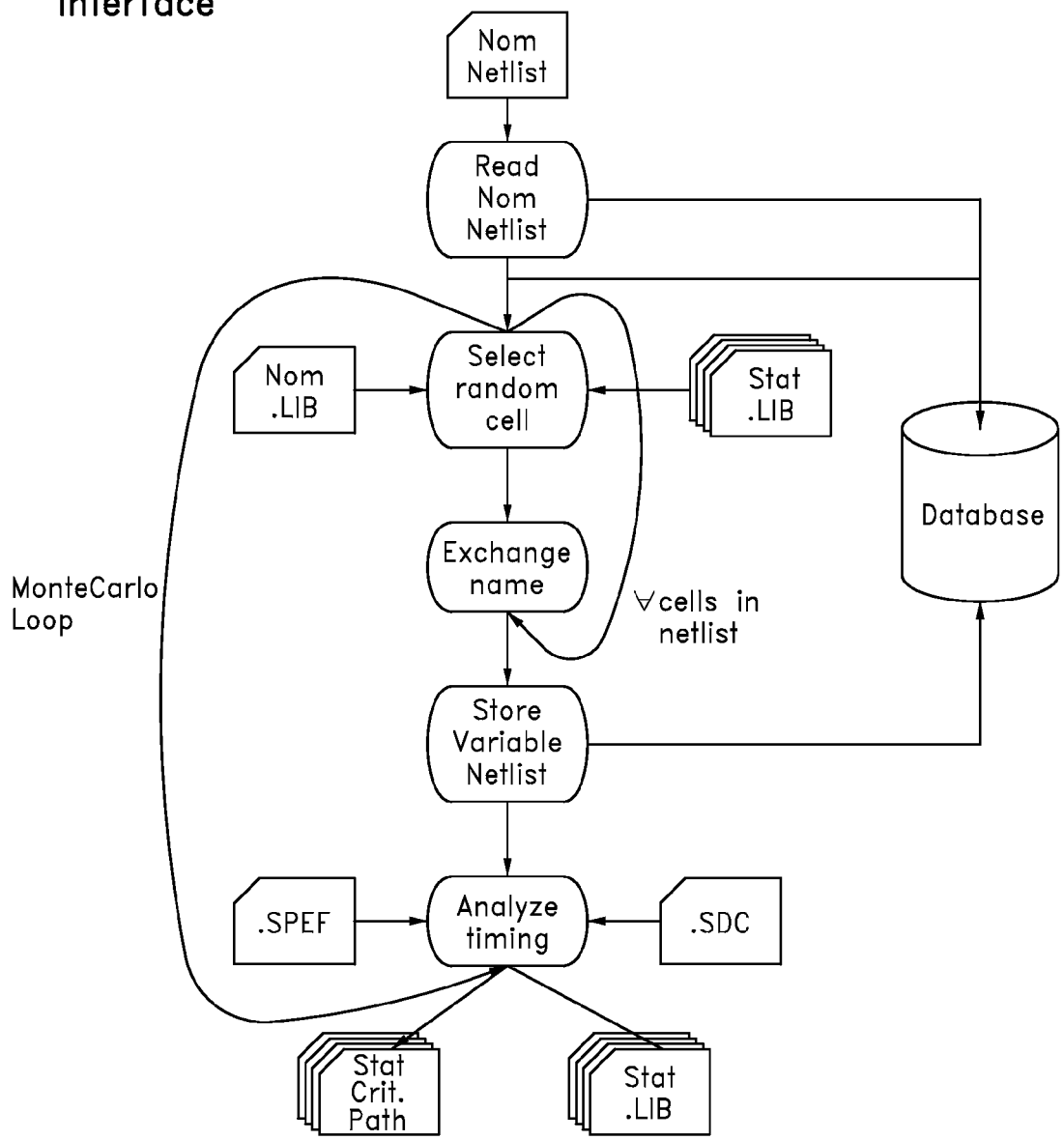

FIG. 8b. The timing analysis (Prime Time) script uses the variability library (LIB), SDC and creates the MC Netlists inside to calculate the standard delay format (SDF) and the delay of the critical path. The result is the statistical timing per gate and the statistical critical path of the blocks.

Figure 9A:
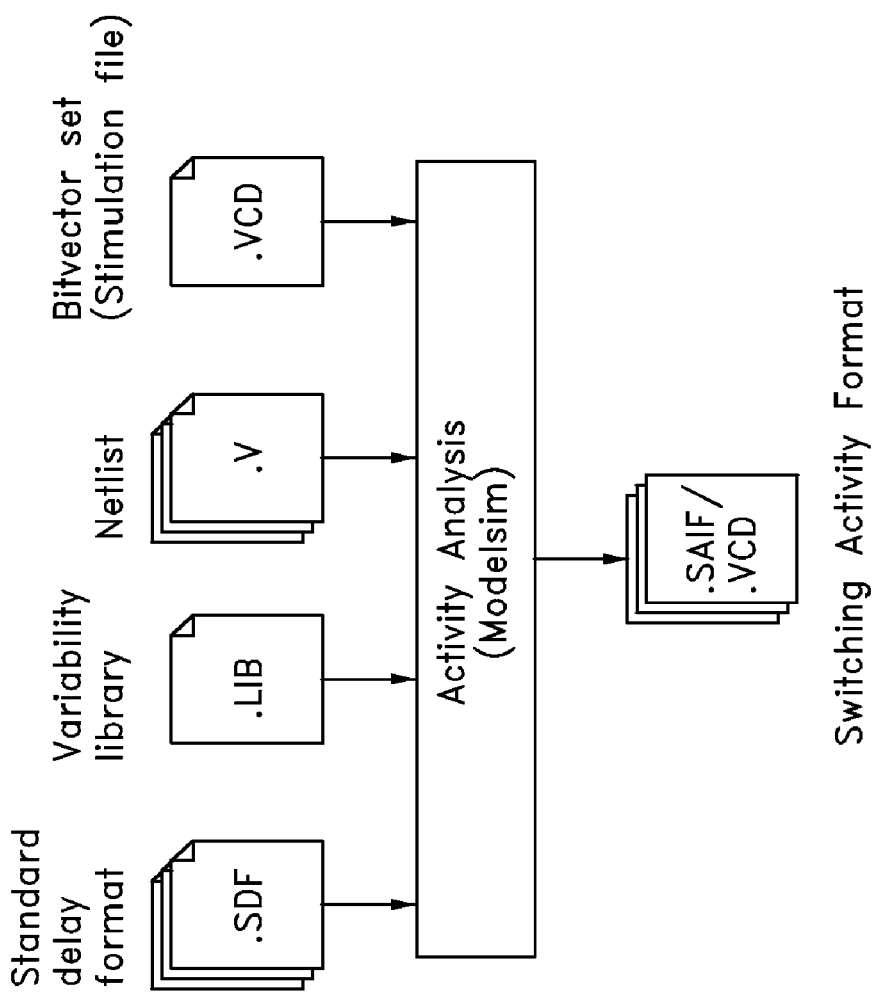

FIG. 9a. The activity analysis (Gatelevel simulation) compiles the VHDL VITAL and the variability netlist and simulates with the standard delay format (SDF) by using the Stimuli file of the RTL Simulation to create the SAIF/VCD. The result is the statistical activity per net of the block.

Figure 9B:
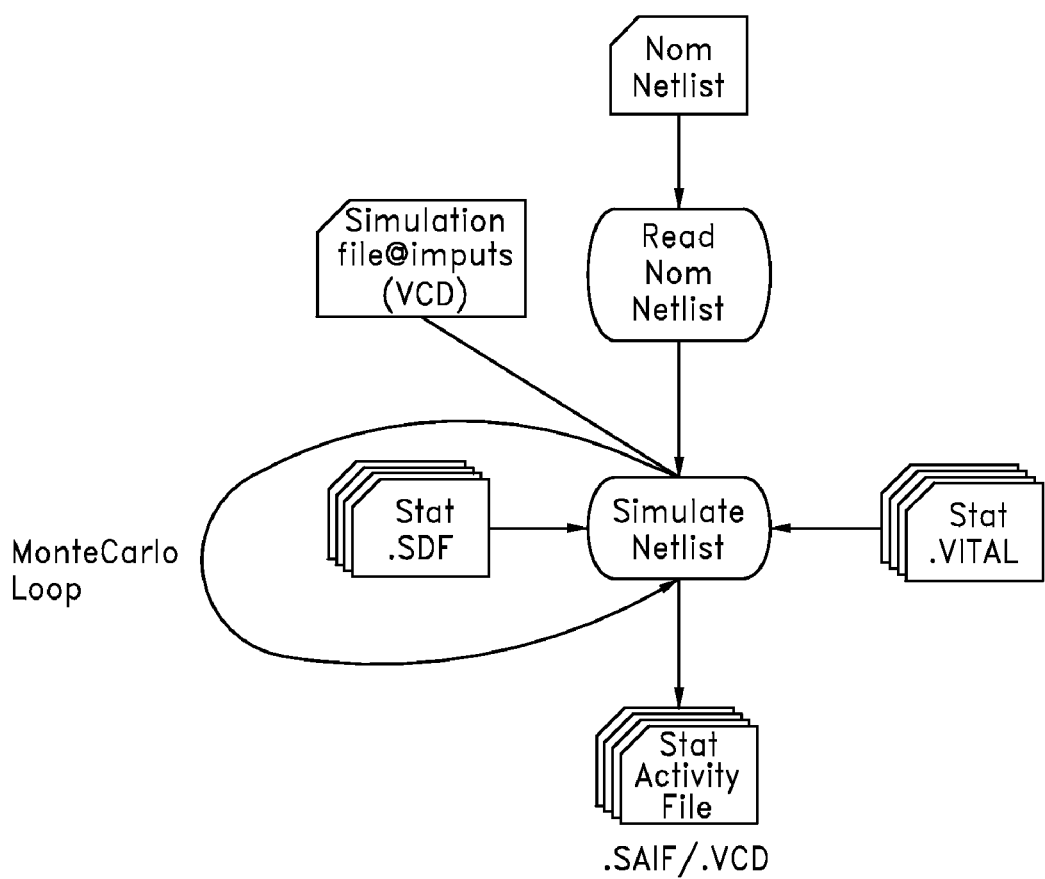

FIG. 9b. The activity analysis (Gatelevel simulation) compiles the VHDL VITAL and the nominal netlist and simulates the netlist with the different statistical SDF files (in the same order they are produced in the timing loop—see FIG. 8b) and by using the Stimuli file of the RTL Simulation to create the SAIFNCD. The result is the statistical activity per net of the block.

Figure 10A:
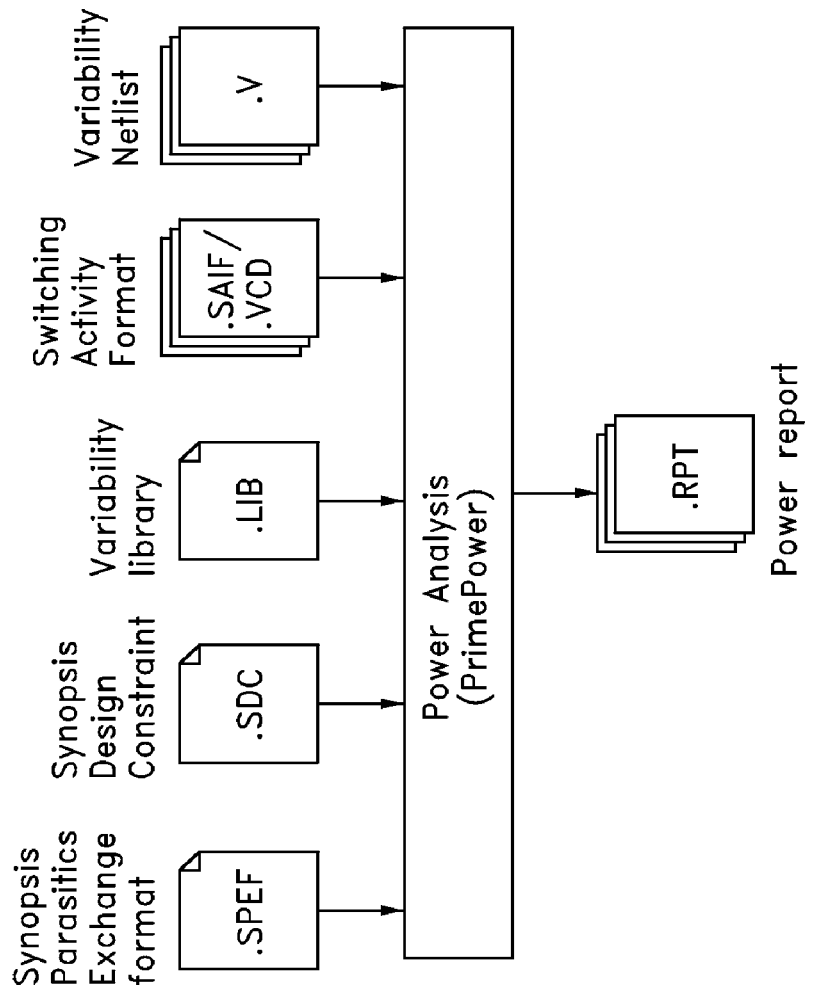

FIG. 10a. A power analysis tool (Prime Power Script) is used to calculate the Power consumption of the circuit. This is done by using the SAIF or VCD Format, the variability netlist and the variability standard cell library and the parasitics SPEF (file). The result is the statistical Power consumption of the Component.

Figure 10B:
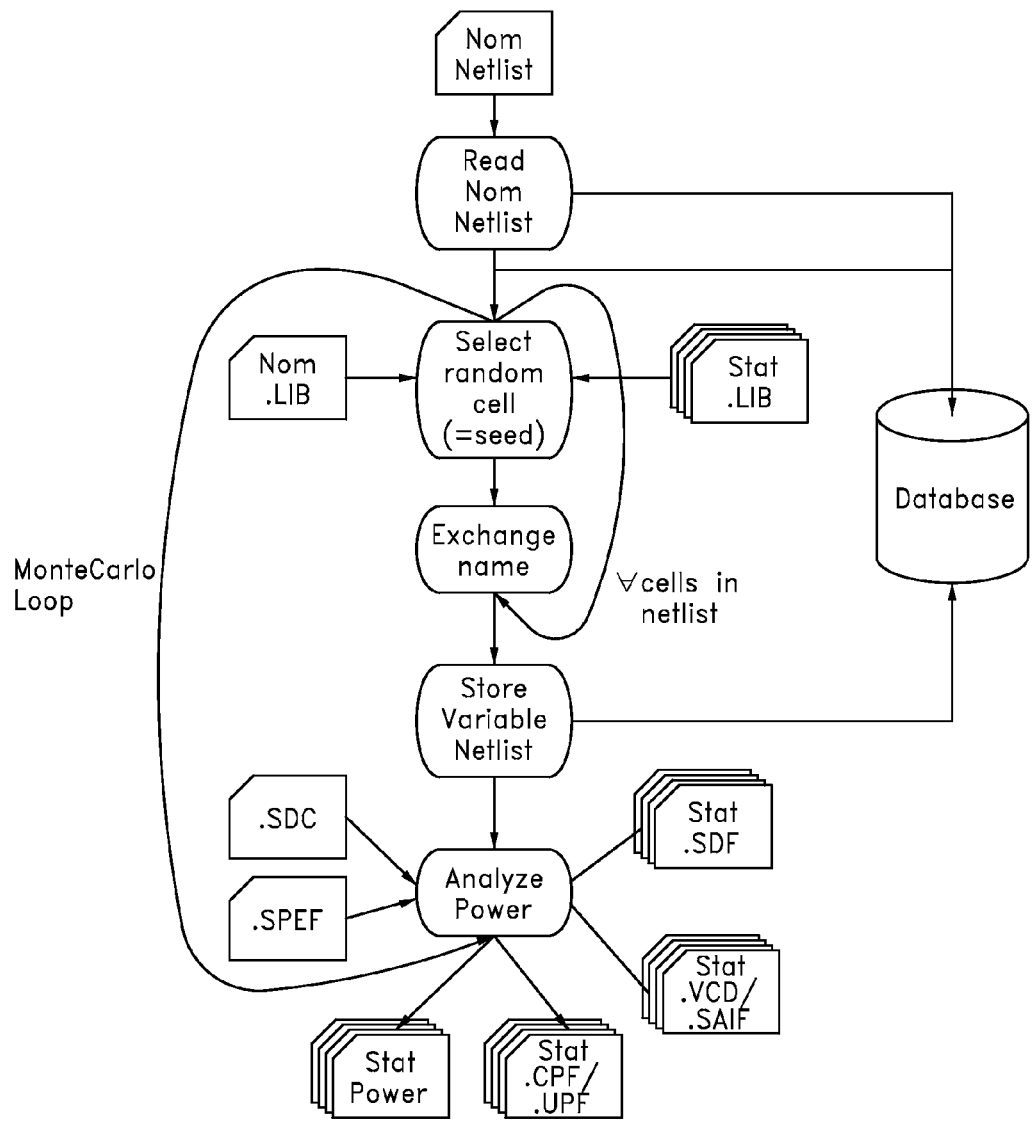

FIG. 10b. A power analysis tool (Prime Power Script) is needed to calculate the Power consumption of the circuit. This is done by using the SAIF or VCD Format, and the variability standard cell library and the parasitic SPEF (file). The variability netslist is created internally. The variability netlists created contain the same variable cells and are generated in the order as in the timing analysis loop (see FIG. 8b). This is done by using the same seed for the random process as the one used for the timing analysis cases (see FIG. 8b). The result is the statistical Power consumption of the Component.

Figure 11A:
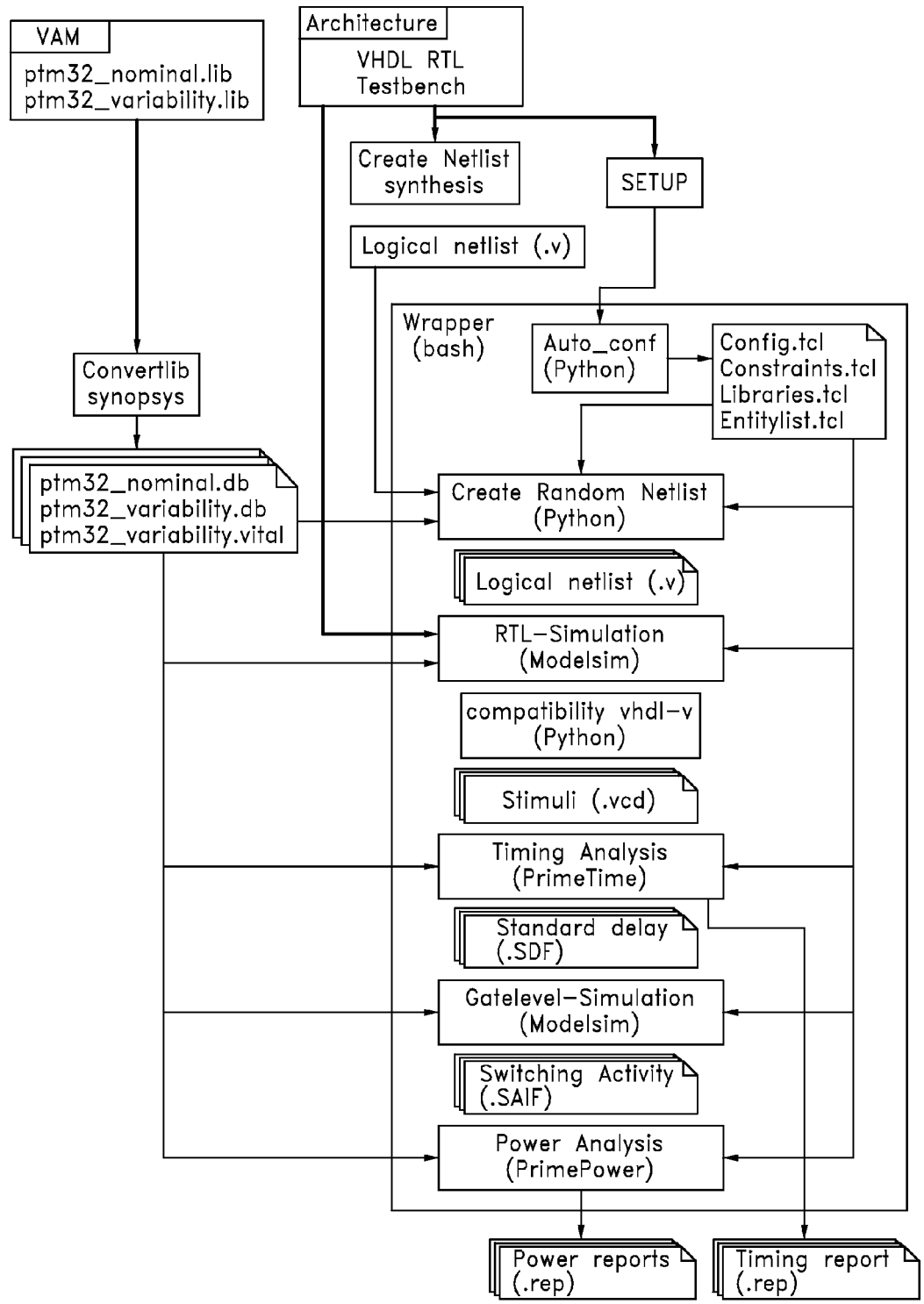

FIG. 11a shows details of an implementation of a VAM Module according to embodiments of the present invention when creating variability netlists outside third party tools.

Figure 11B:
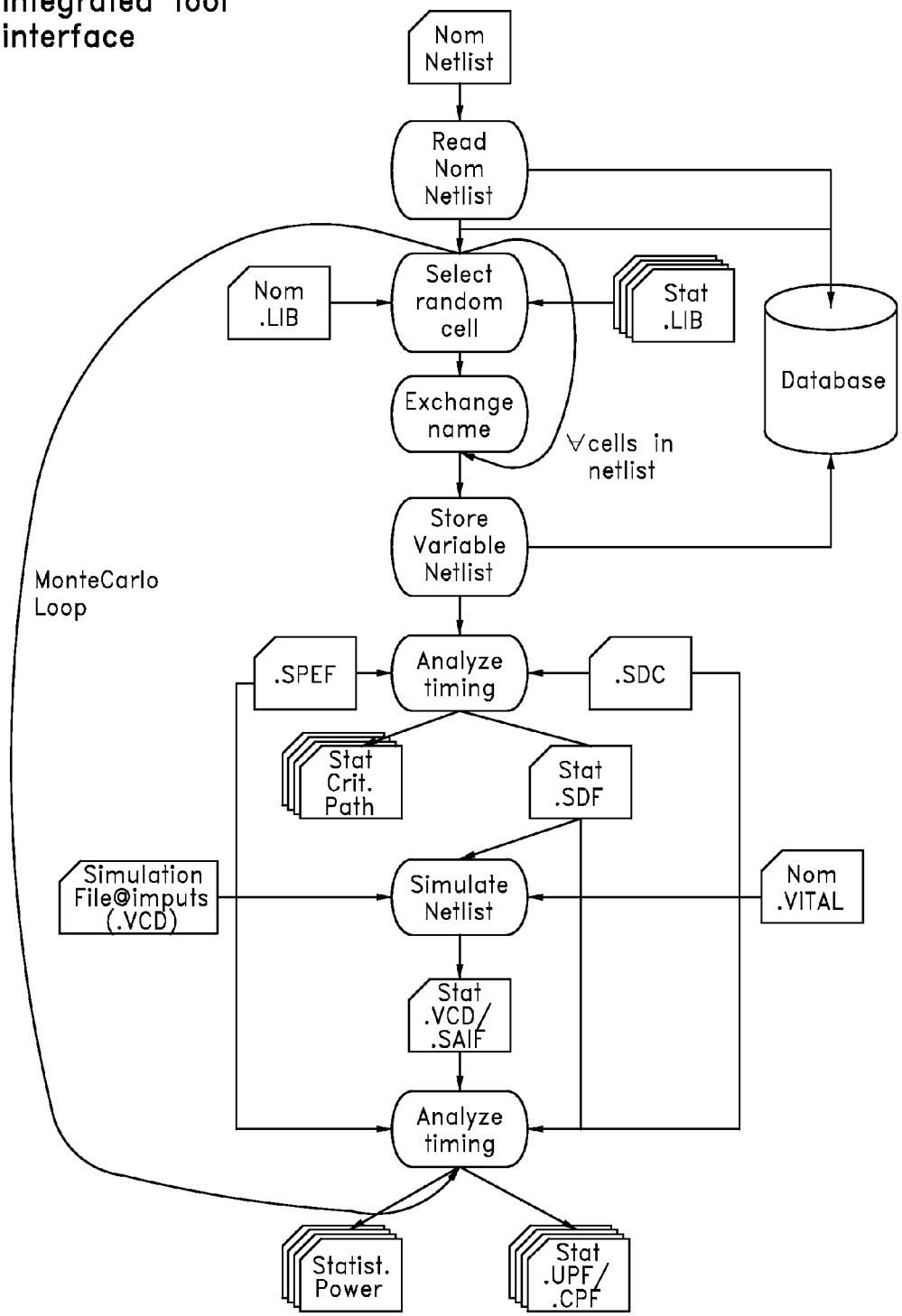

FIG. 11b shows details of an implementation of a VAM Module according to embodiments of the present invention when creating variability netlists inside third party tools.

Figure 12:
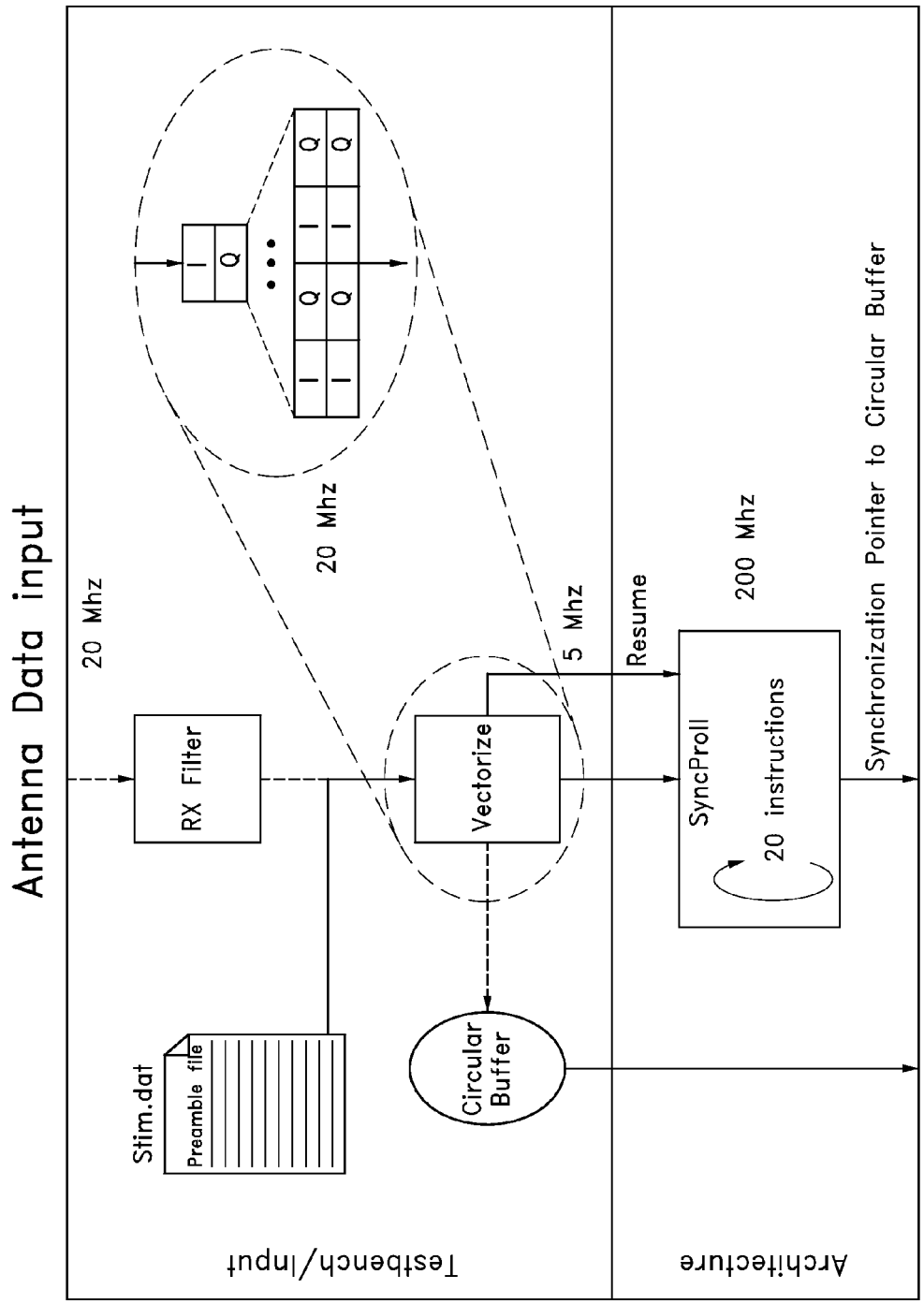

FIG. 12 shows the testbench for the SyncProll.

Figure 13:
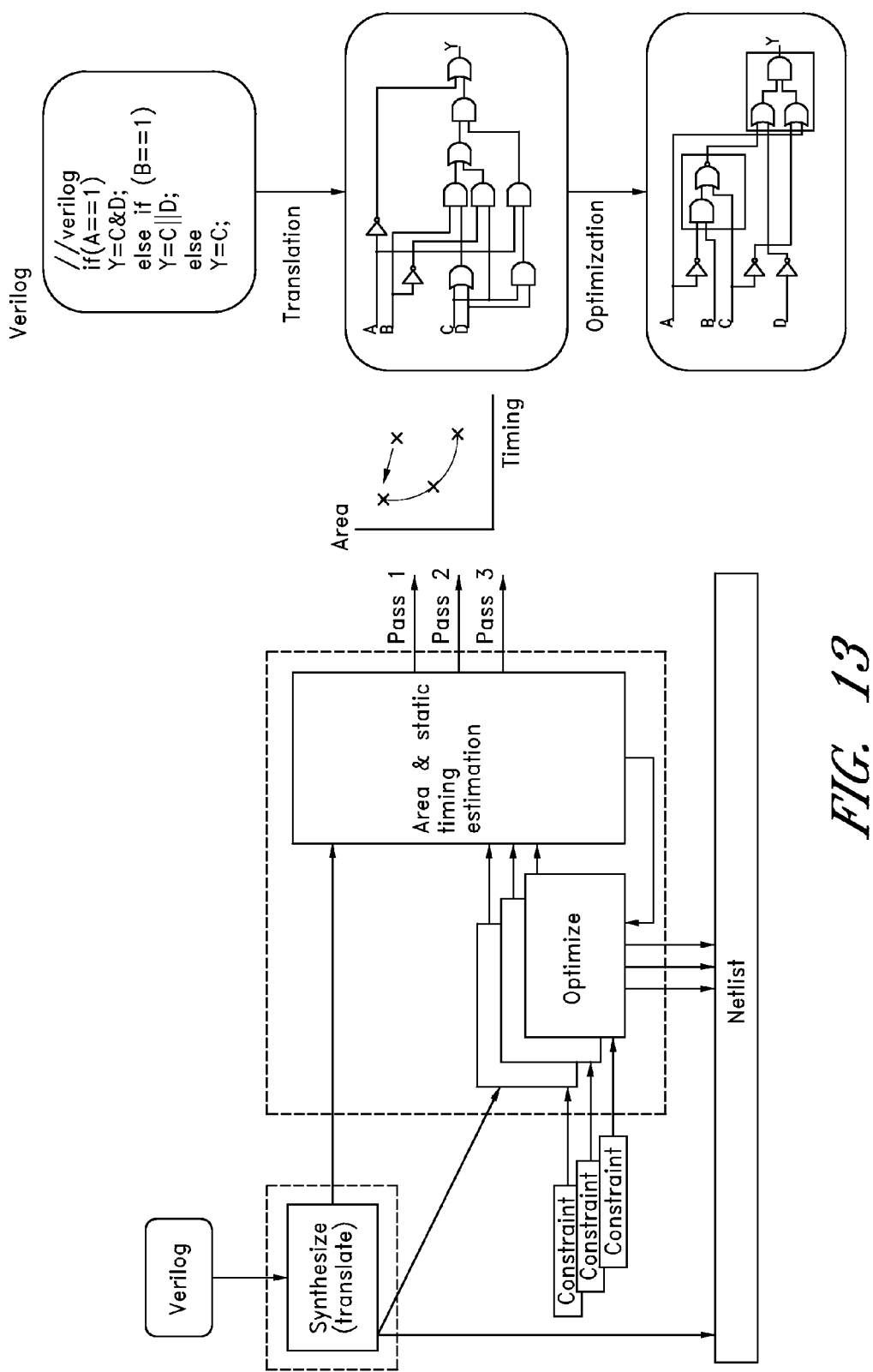

The left side of FIG. 13 shows the general functionality of a synthesis flow in accordance with embodiments of the present invention. The flow translates the VHDL or Verilog file and tries to optimize the netlist under designer's defined constraints. The right side shows the output for each step.

Figure 14:
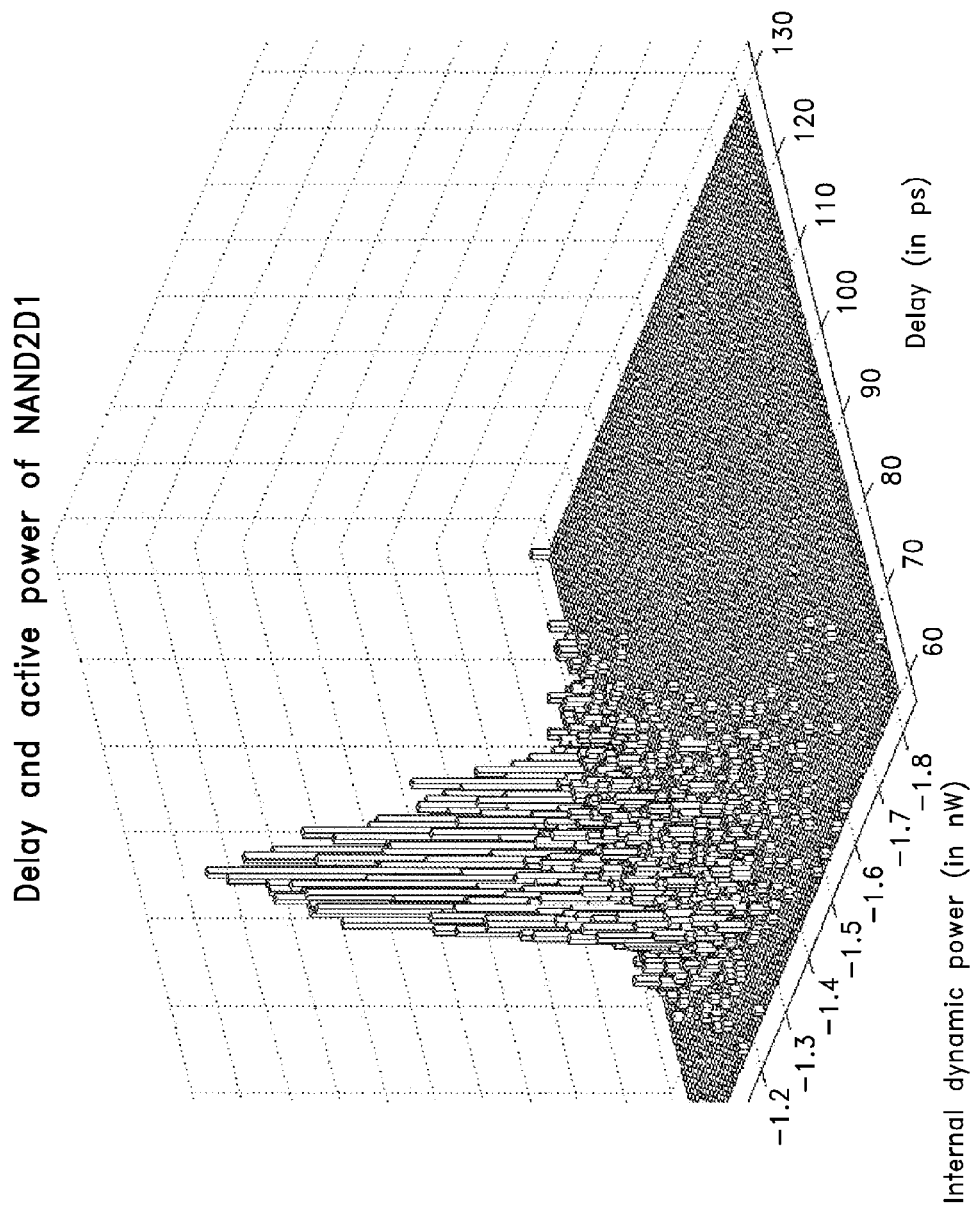

FIG. 14 is a graph of internal dynamic power and delay for a two input NAND gate (intrinsic load).

Figure 15:
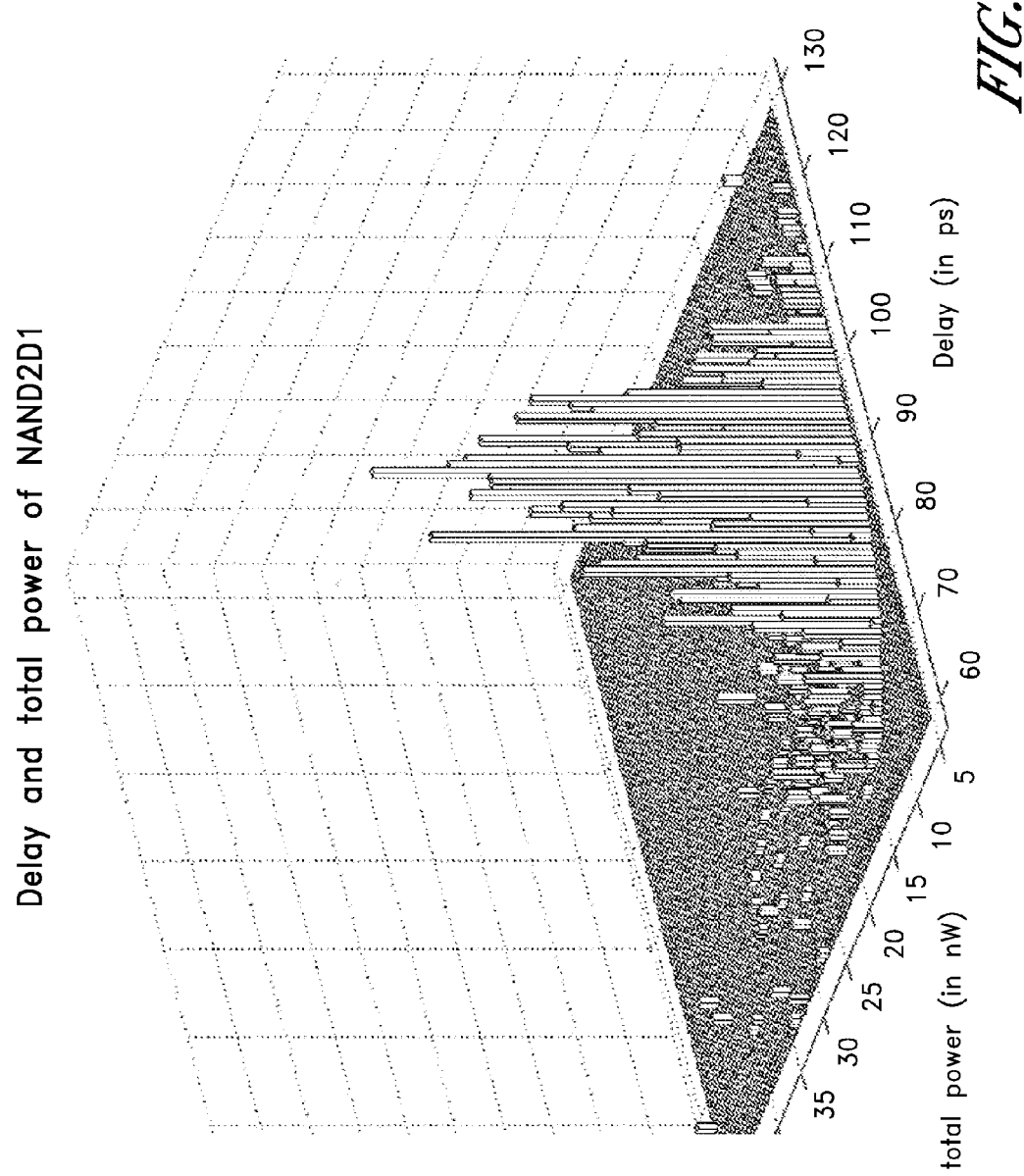

FIG. 15 is a graph of total power and delay for a two input NAND gate (intrinsic load).

Figure 16A:
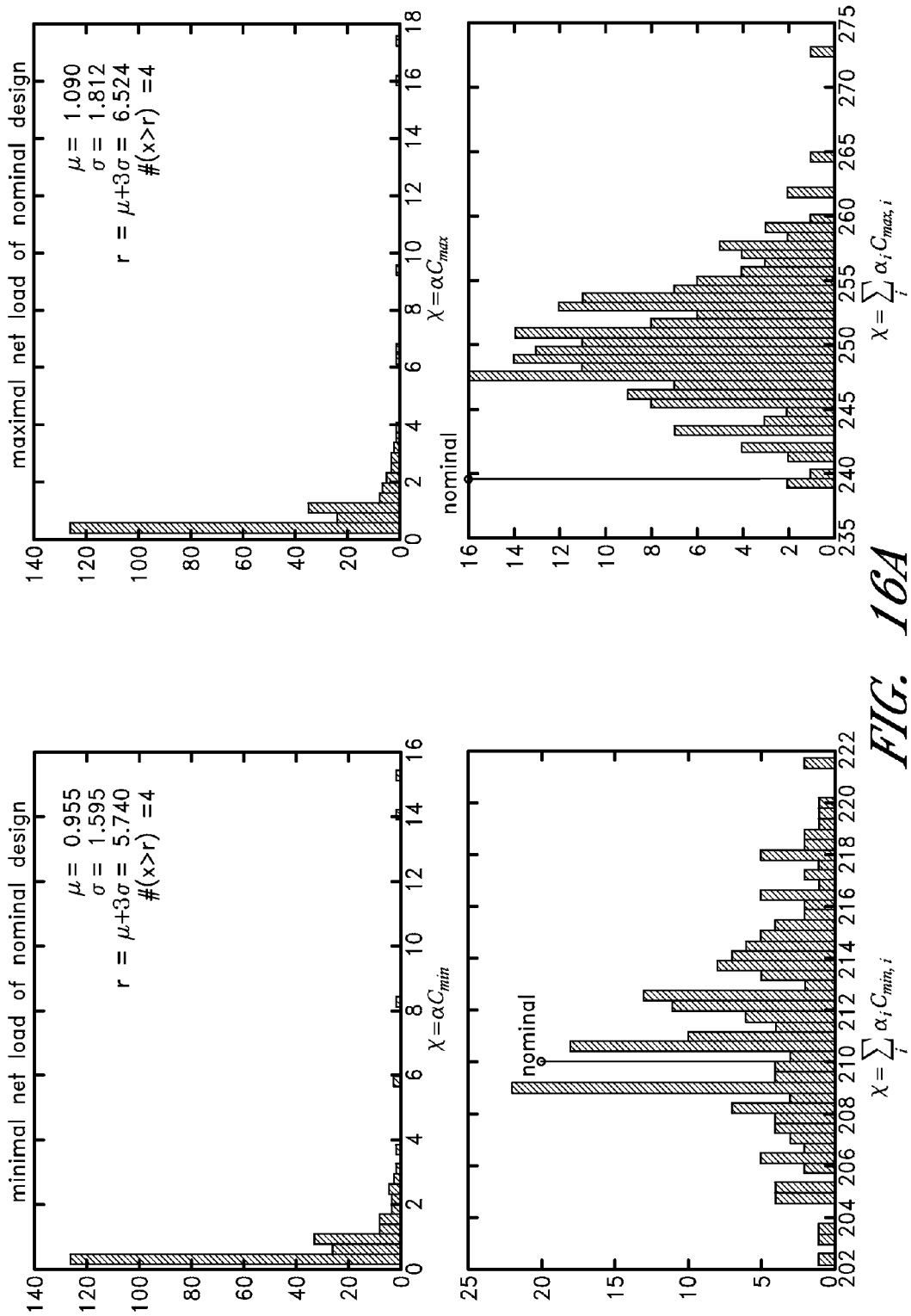

FIG. 16a illustrates a histogram representing the variation of the weighted activities using maximum capacitance in comparison to nominal for the VALU_VECTOR_0 block of the SyncProll processor.

Figure 16B:
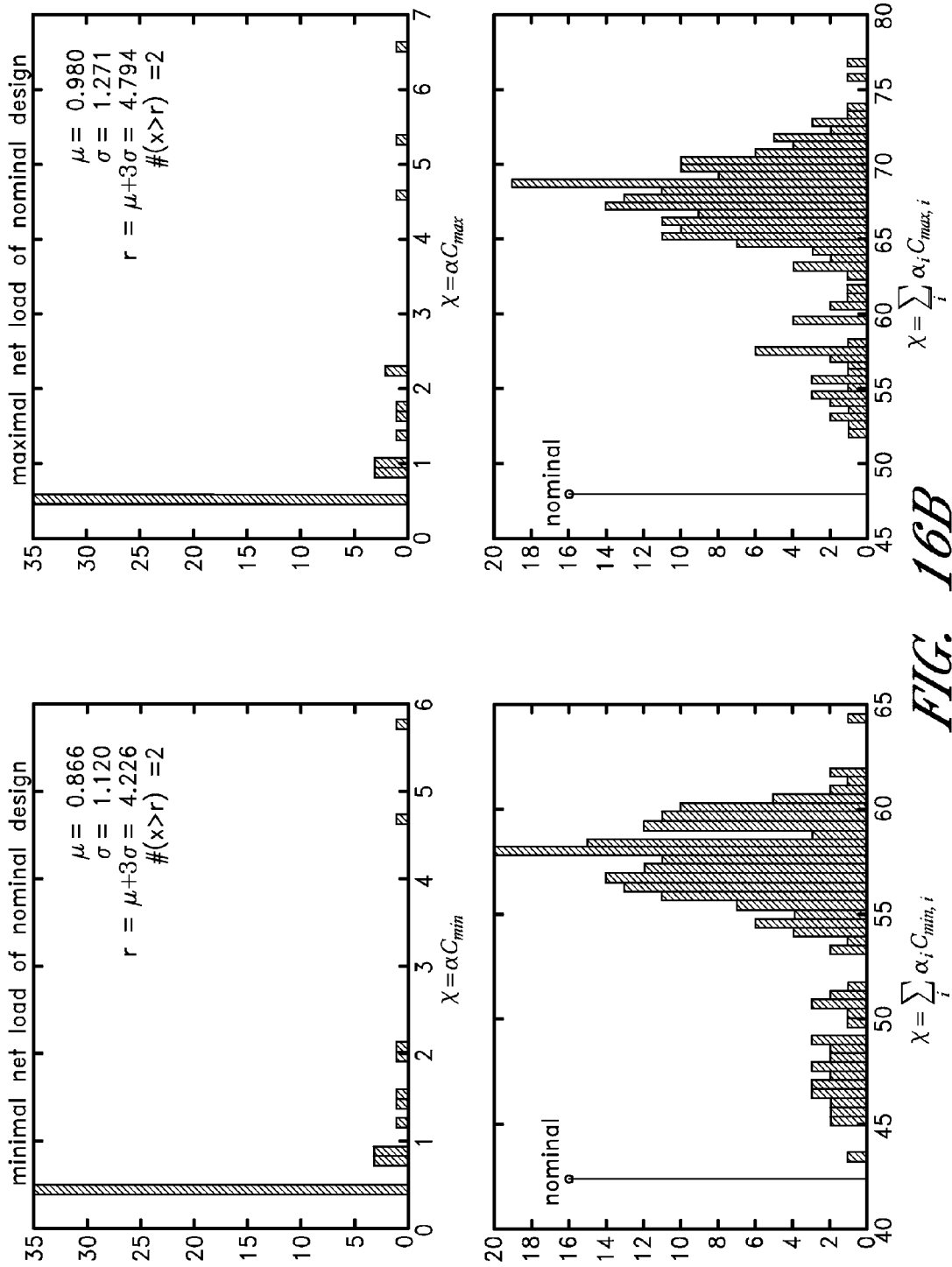

FIG. 16b illustrates a histogram representing the variation of the weighted activities using maximum capacitance in comparison to nominal for the complete SyncProll processor.

Figure 17A:
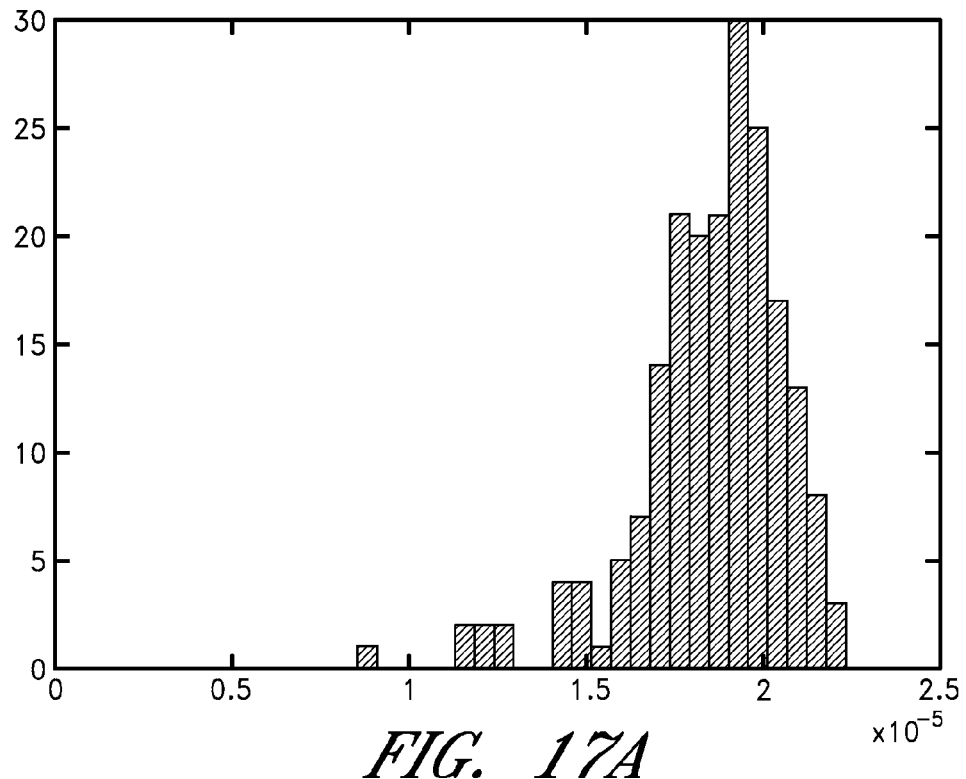

FIG. 17a shows an active power histogram of the VALU_VECTOR0 block of the SyncProll processor.

Figure 17B:
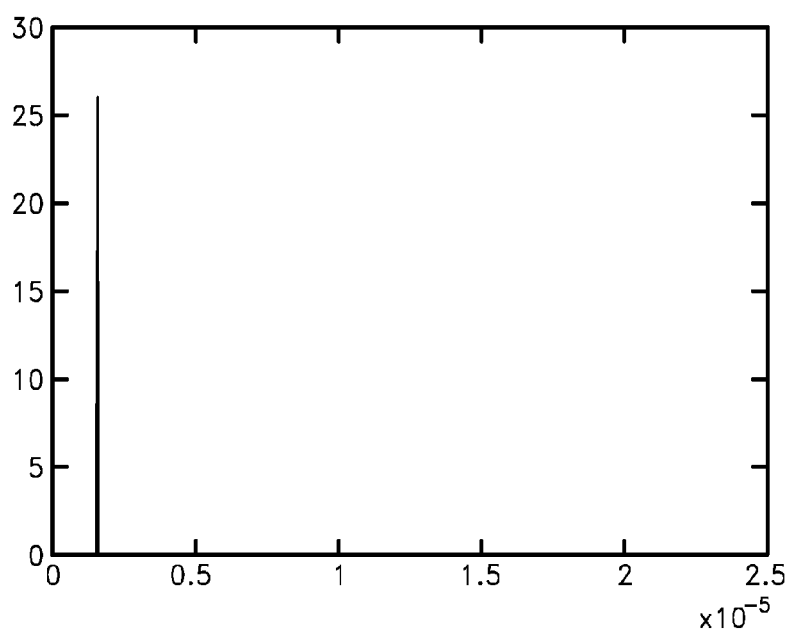

FIG. 17b shows a leakage power histogram of the VALU_VECTOR0 block of the SyncProll processor.

Figure 17C:
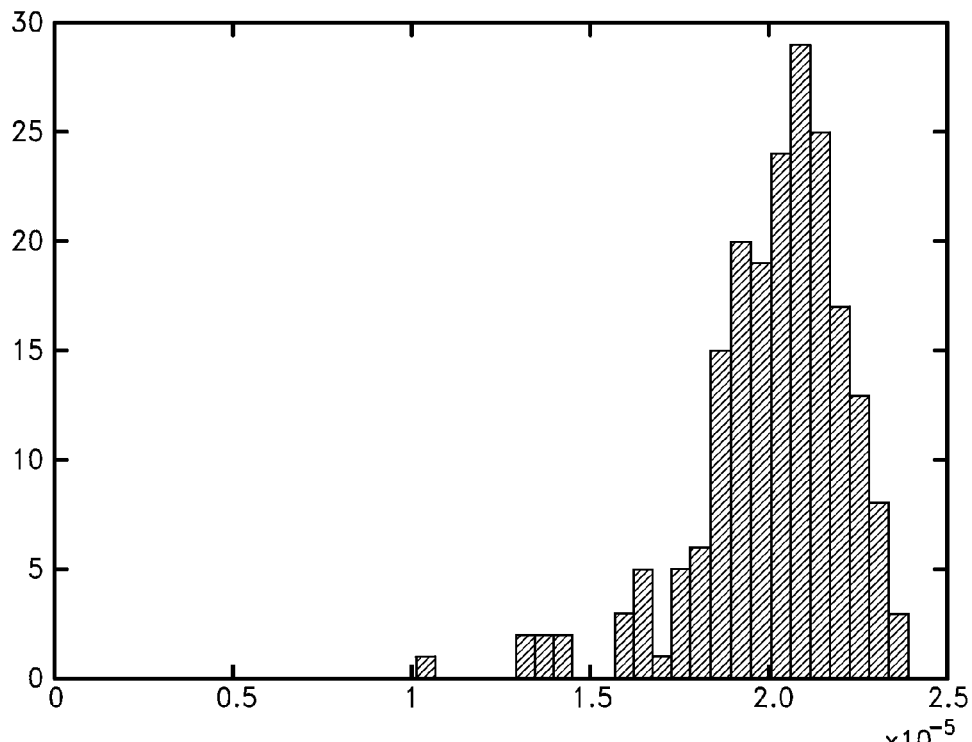

FIG. 17c shows a total power histogram of the VALU_VECTOR0 block of the SyncProll processor.

Figure 18:
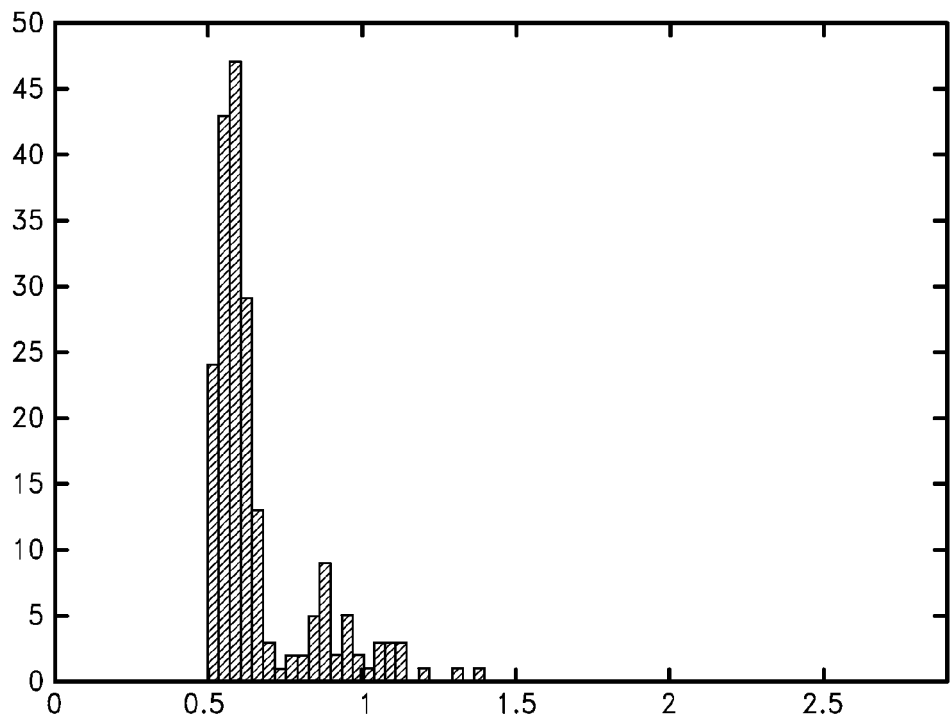

FIG. 18 shows a histogram for delay of the "VALU_VECTOR0" block of the SyncProll processor.

Figure 19:
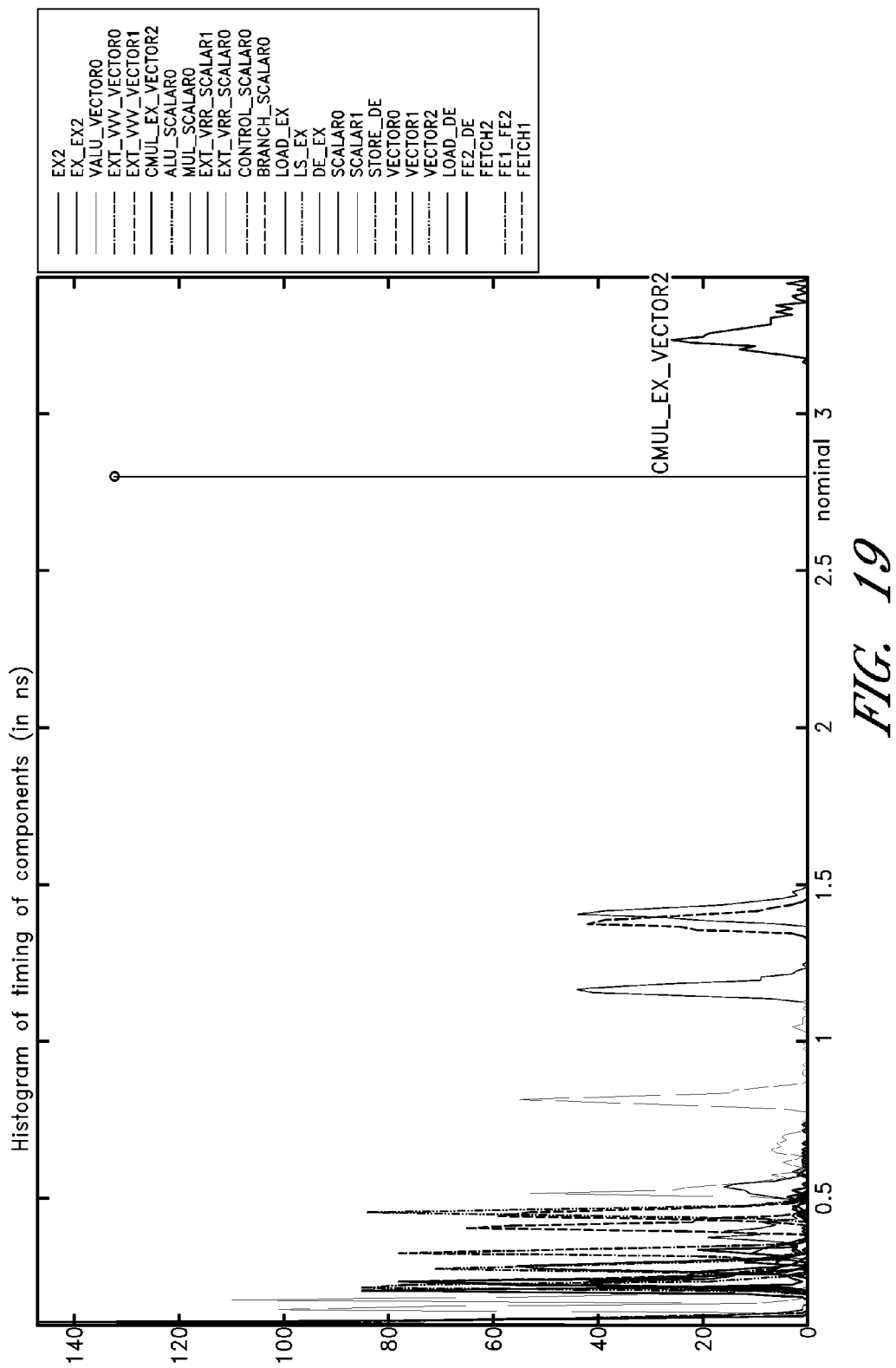

FIG. 19 shows a histogram representing the delay curves of each logic block of the SyncProll architecture, including the nominal value as a line. The Figure shows the Designer, which component requires most time and furthermore, which component is slower than the nominal.

Figure 20:
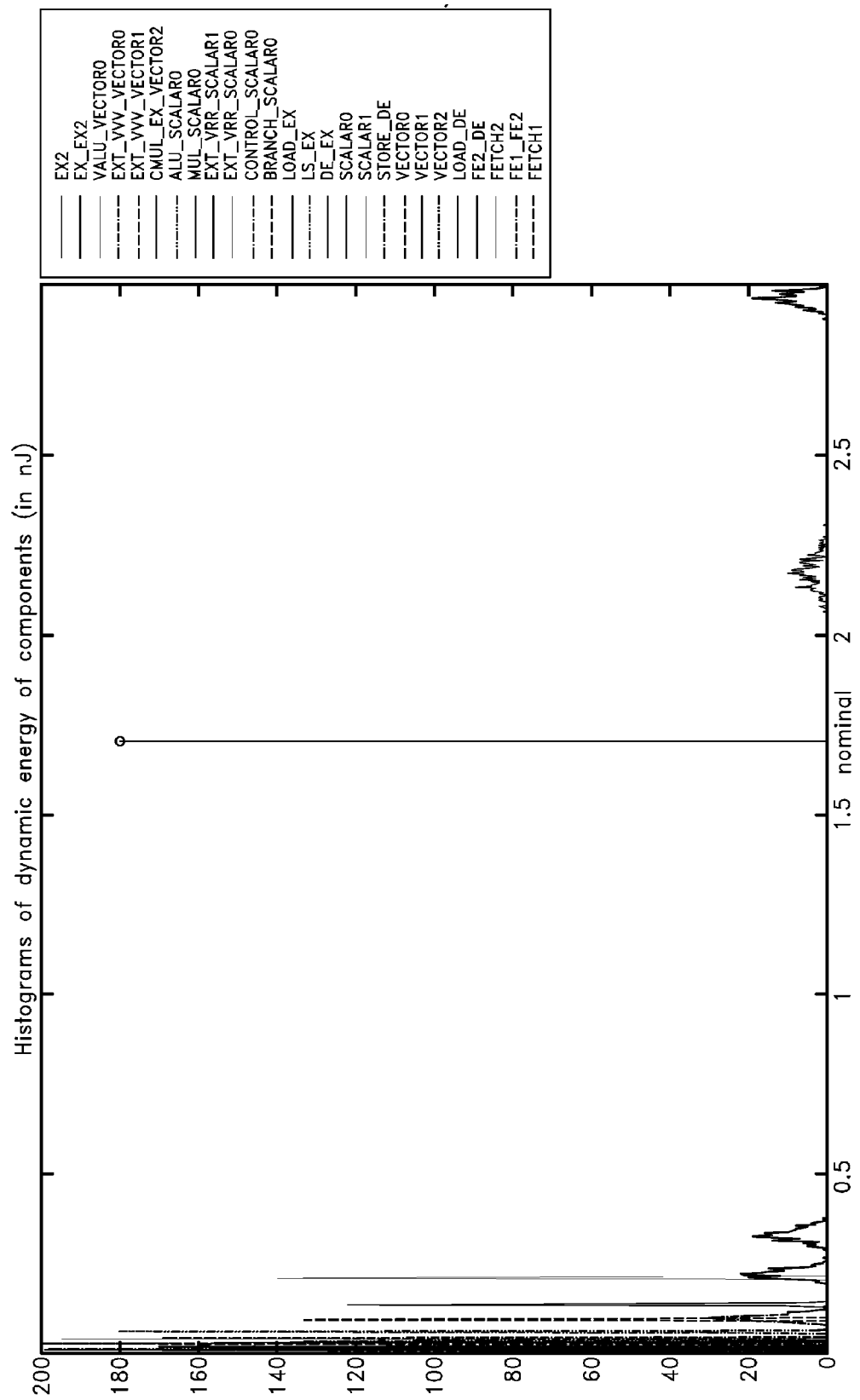

FIG. 20 shows a histogram representing the active Energy curves of each logic block of the SyncProll architecture, including the nominal value as a line. In comparison with FIG. 21 the designer can review the critical Energy consumption.

Figure 21:
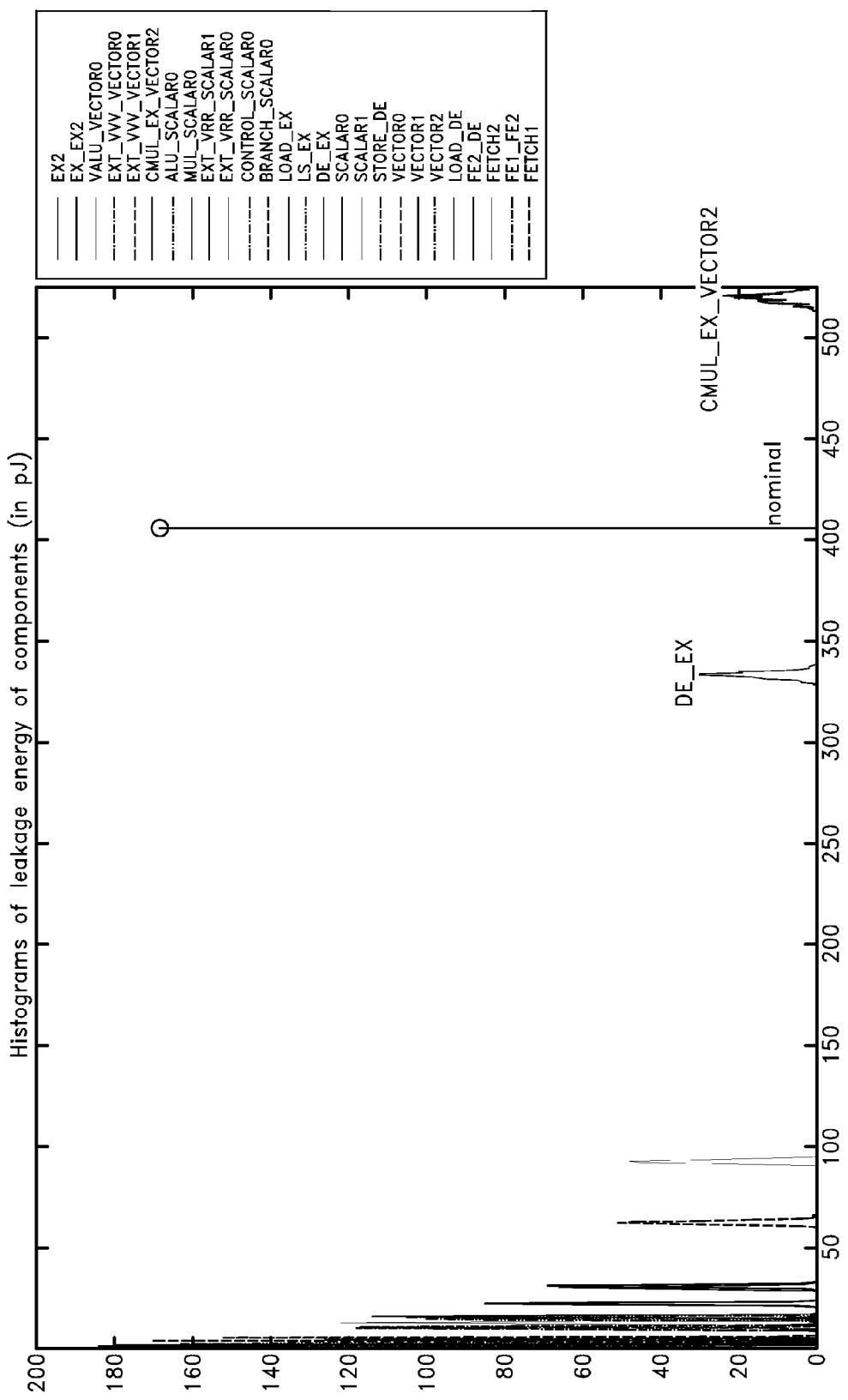

FIG. 21 shows a histogram representing the leakage Energy consumption of each logic block of the SyncProll architecture, including the nominal value as a line.

Figure 22:
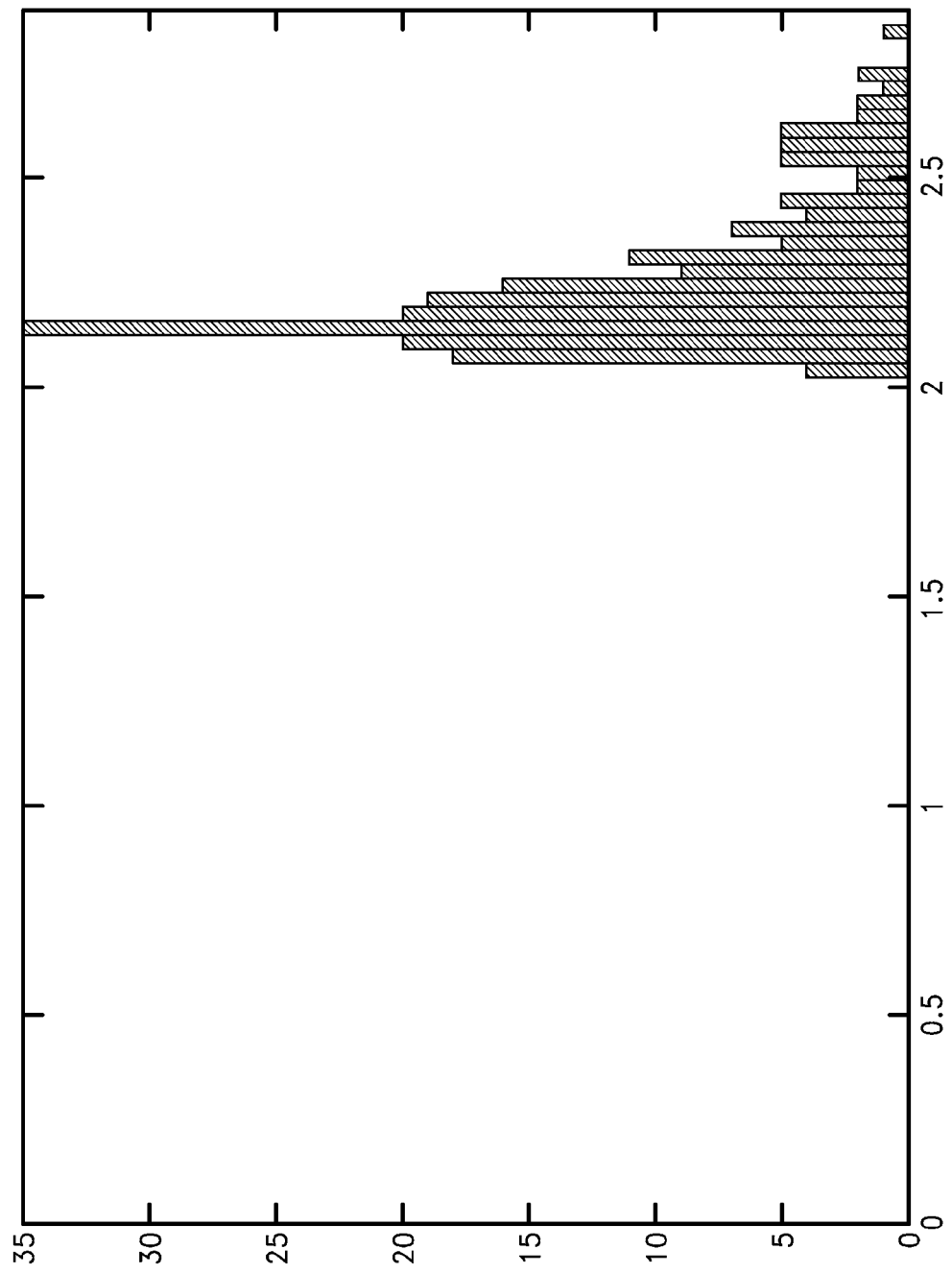

FIG. 22 shows a histogram illustrating critical path delays for the SyncProll under variability impact.

Figure 23:
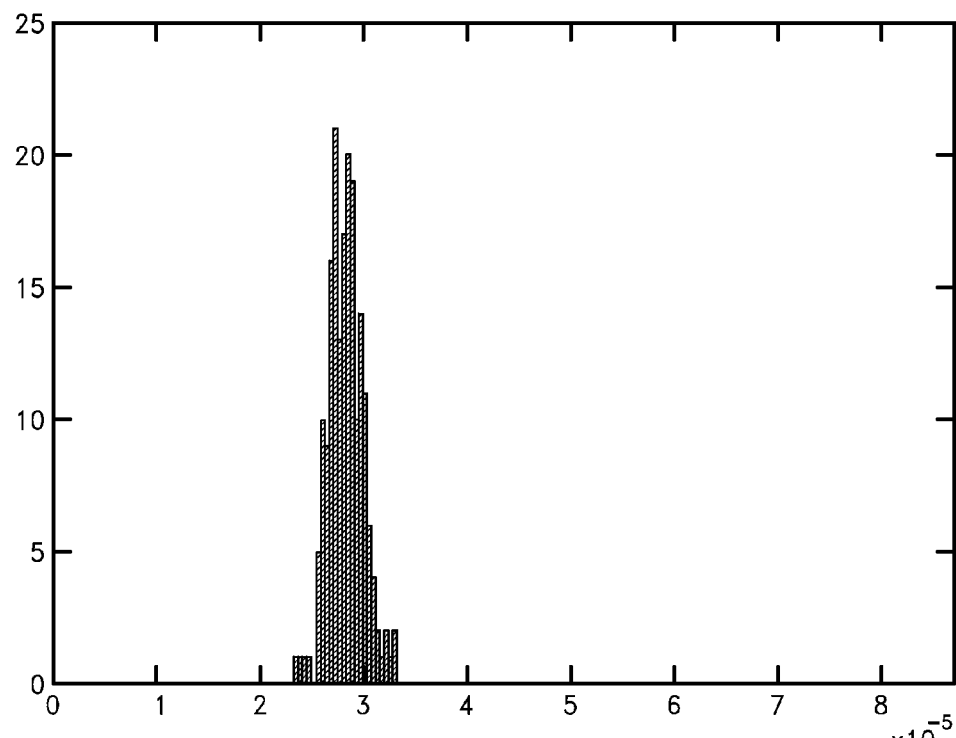

FIG. 23 shows a histogram illustrating average active power consumed by SyncProll under variability impact.

Figure 24:
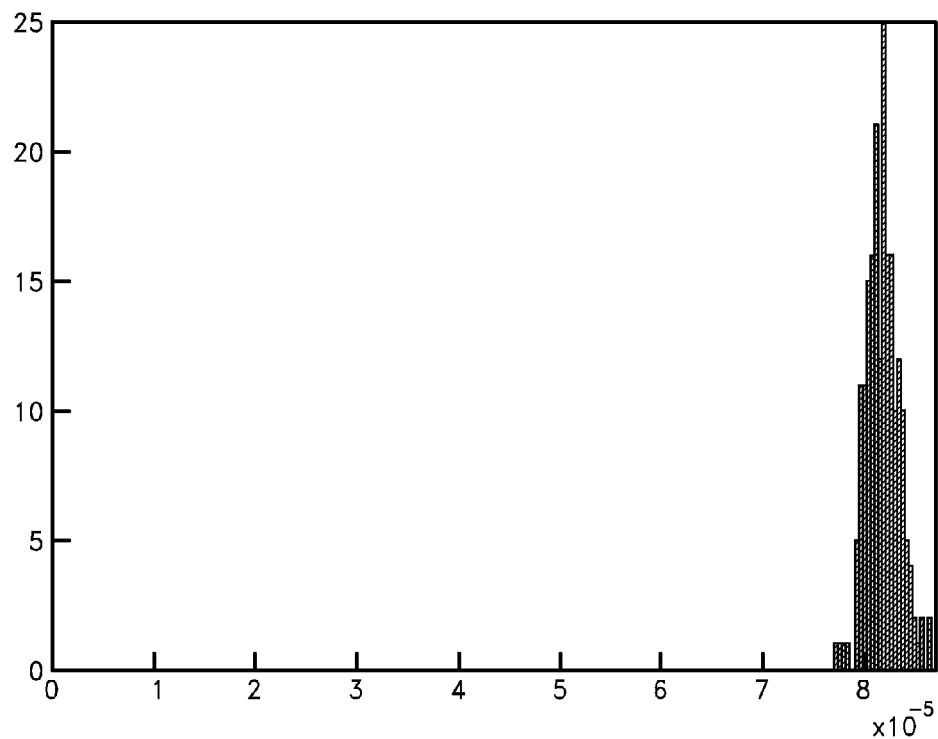

FIG. 24 shows a histogram illustrating total average power consumed in SyncProll under variability impact.

Figure 25:
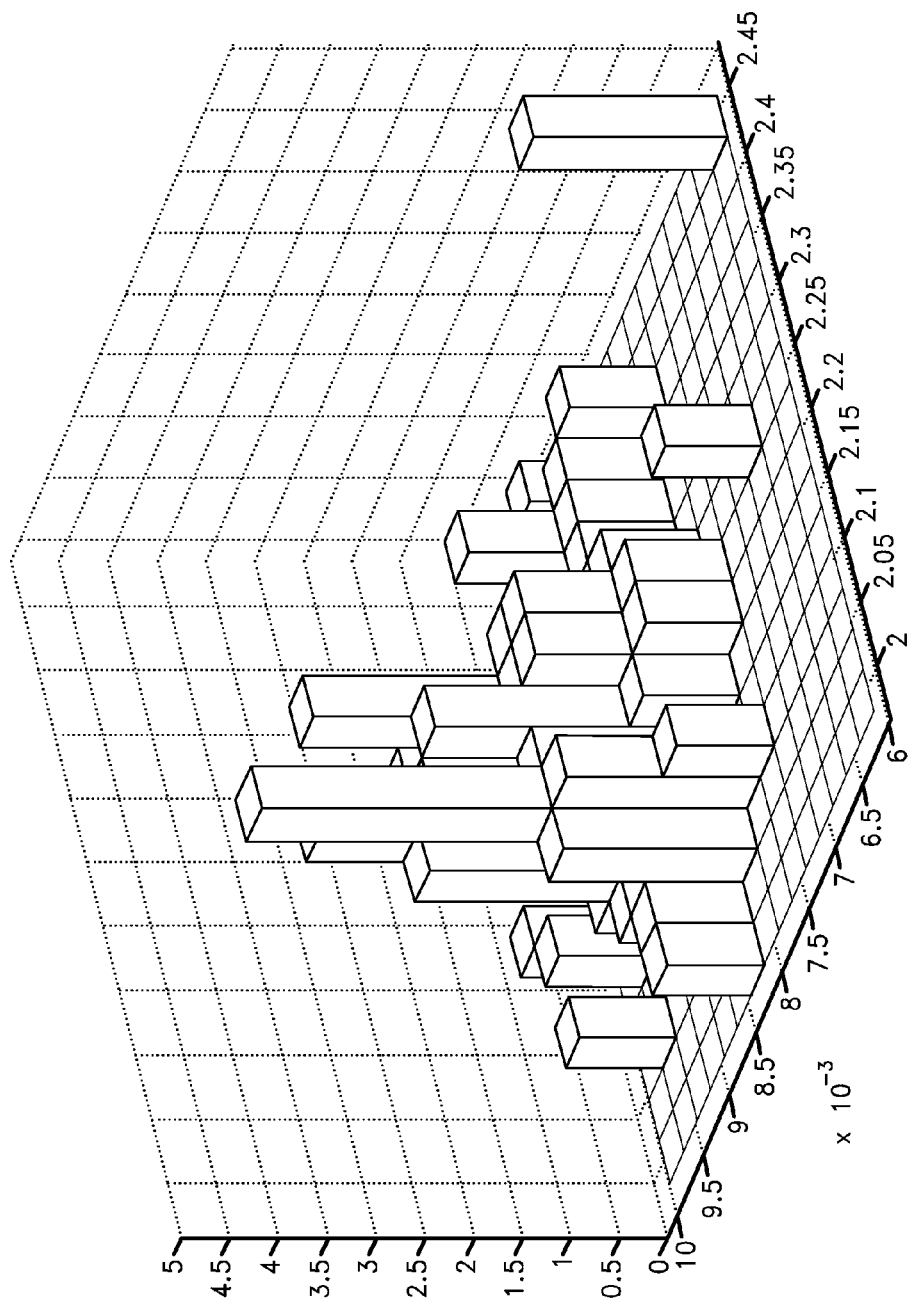

FIG. 25 is a bidimensional histogram showing the full correlation between total power consumed in SyncProll and delay under variability impact.

Figure 26:
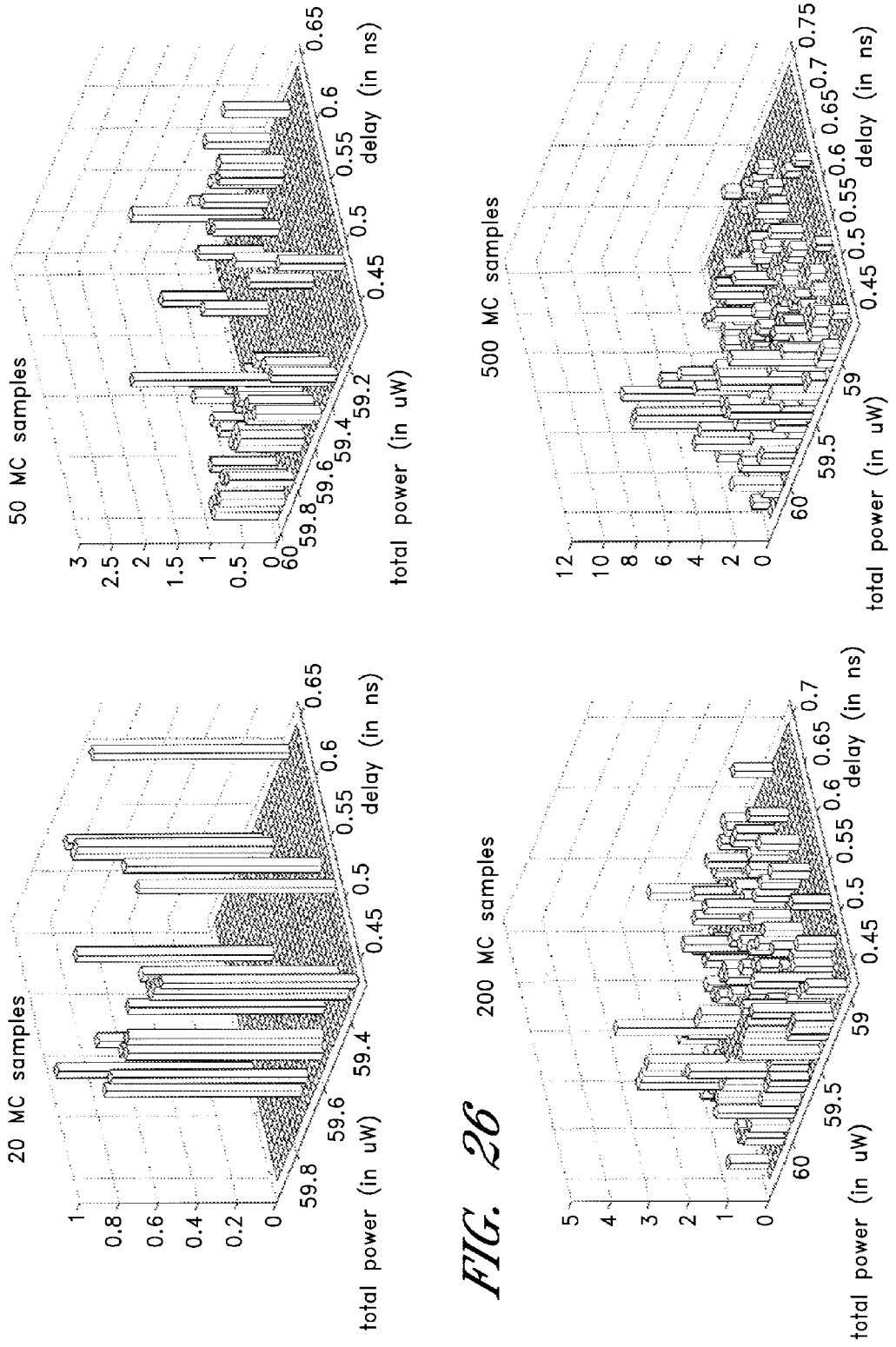

FIG. 26 shows histograms of the "VALU_VECTOR0" block of the SyncProll architecture using different amounts of MC.

Figure 27:
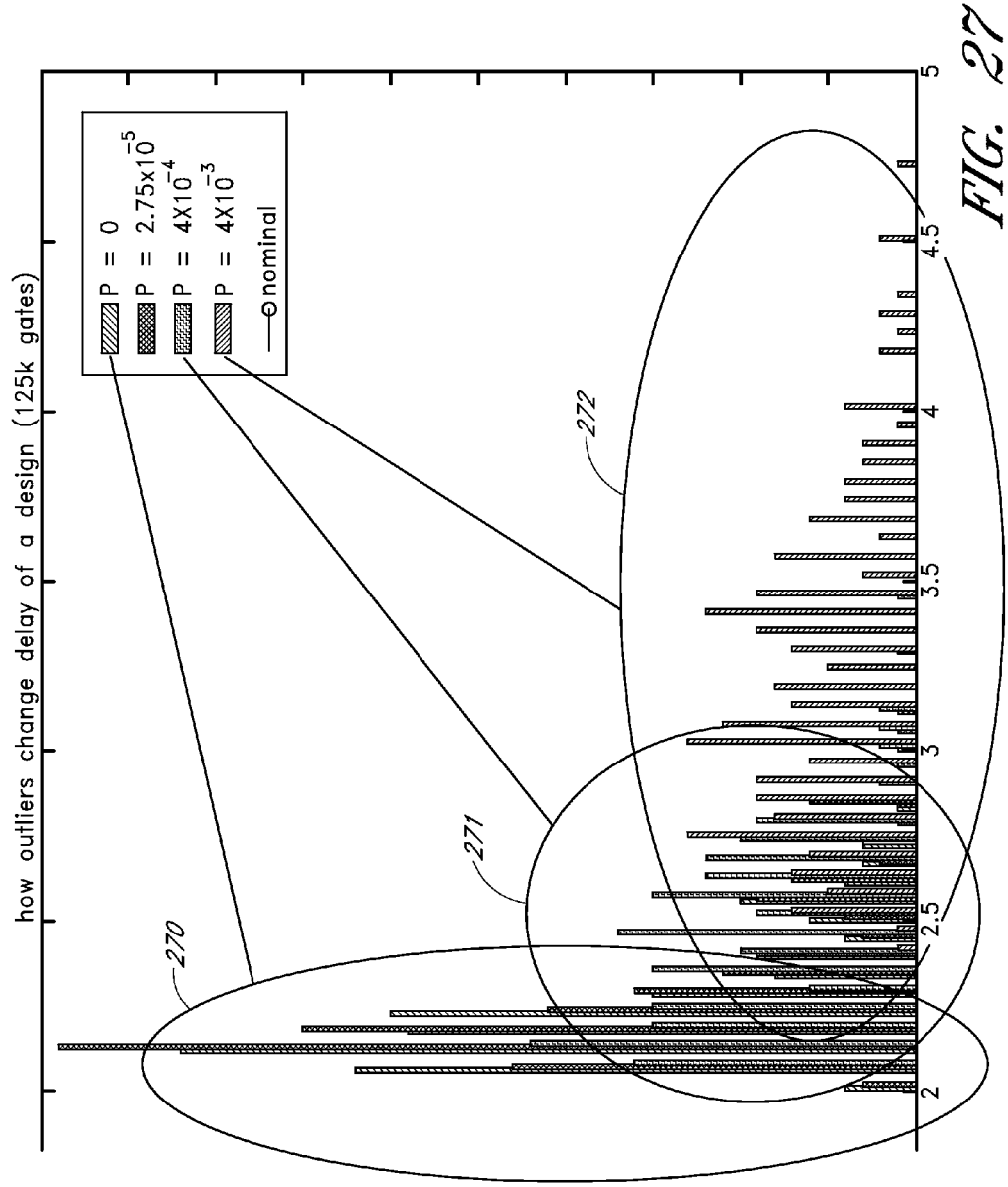

FIG. 27 illustrates timing histograms of SyncProll pipe showing the impact of the presence of outliers.

Figure 28:
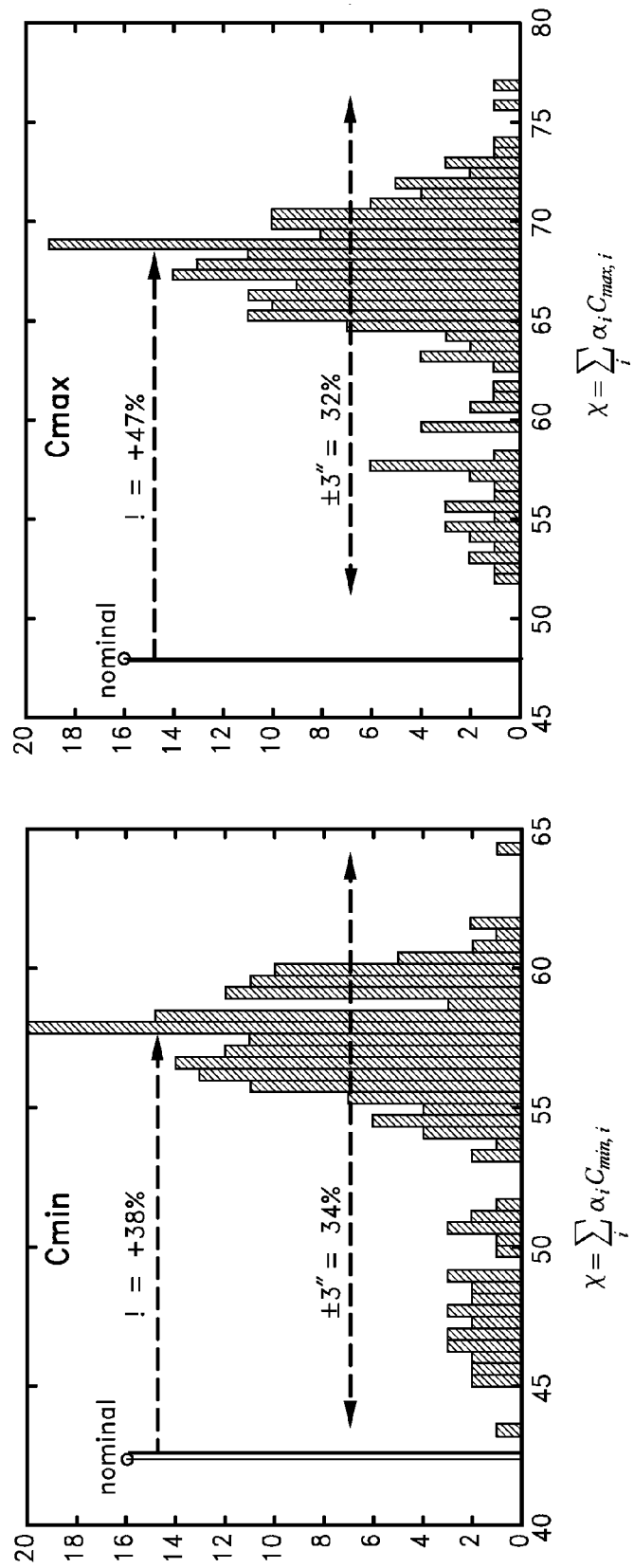

FIG. 28 illustrates a histogram of weighted activity (WA) under process variability for a 120 Kgate design after 200 Monte Carlo iterations.

Figure 29:
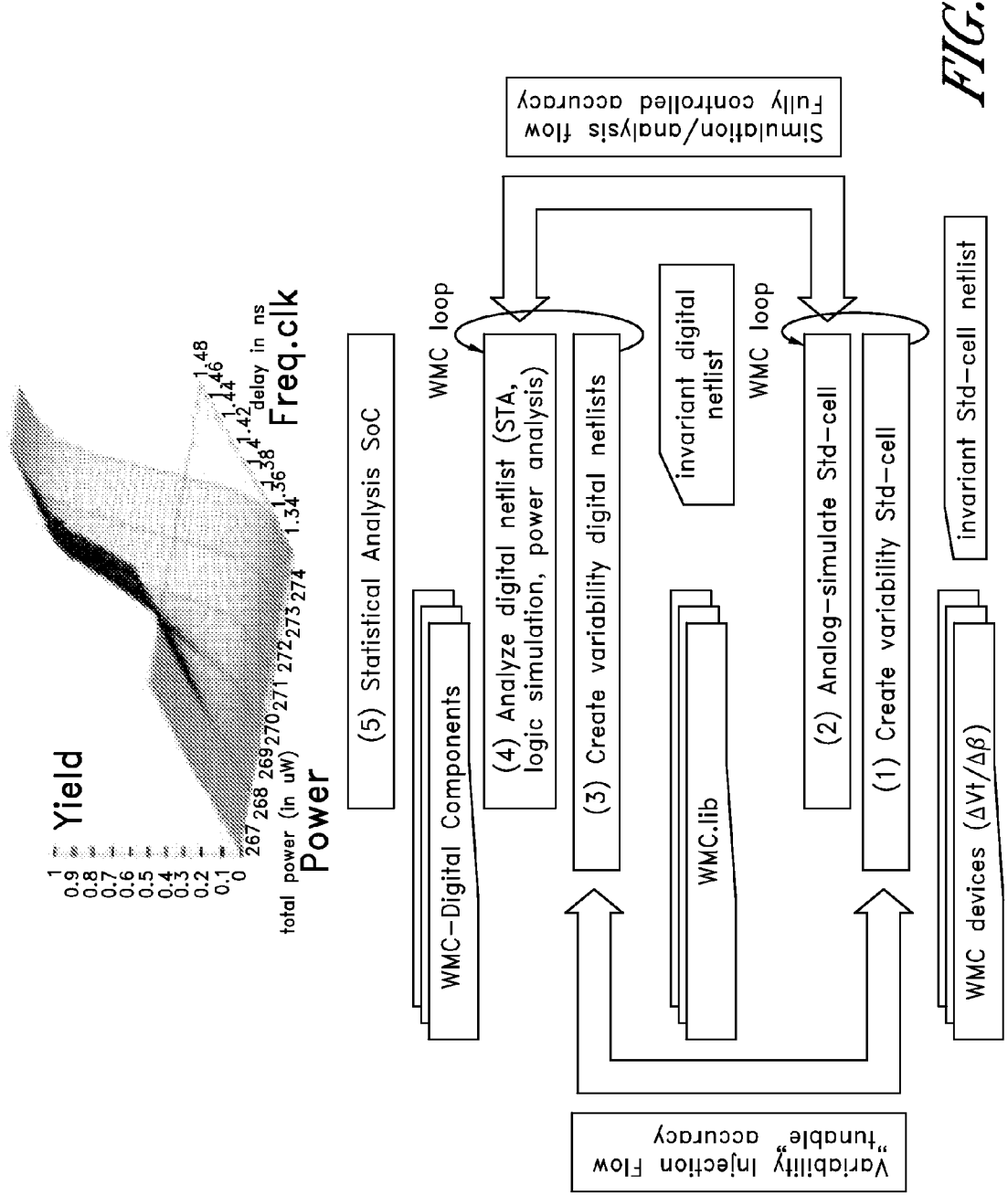

FIG. 29 is a functional fiew of the Variability Modeling Framework according to a second embodiment of the present invention, illustrating the four design abstraction levels it spans.

Figure 30:
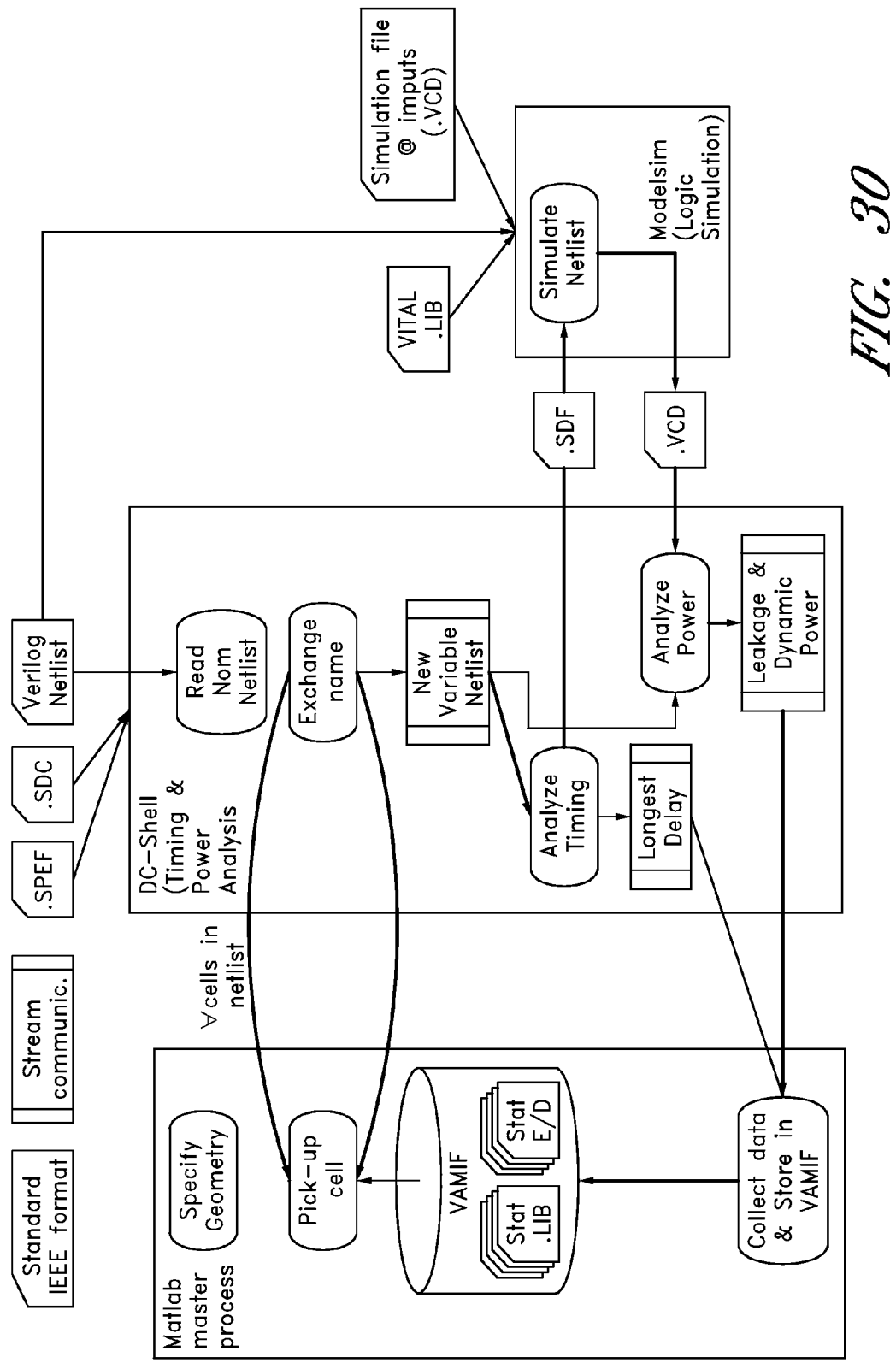

FIG. 30 is an illustration of the statistical analysis flow for a digital netlist according to the second embodiment of the present invention.

Figure 31B:
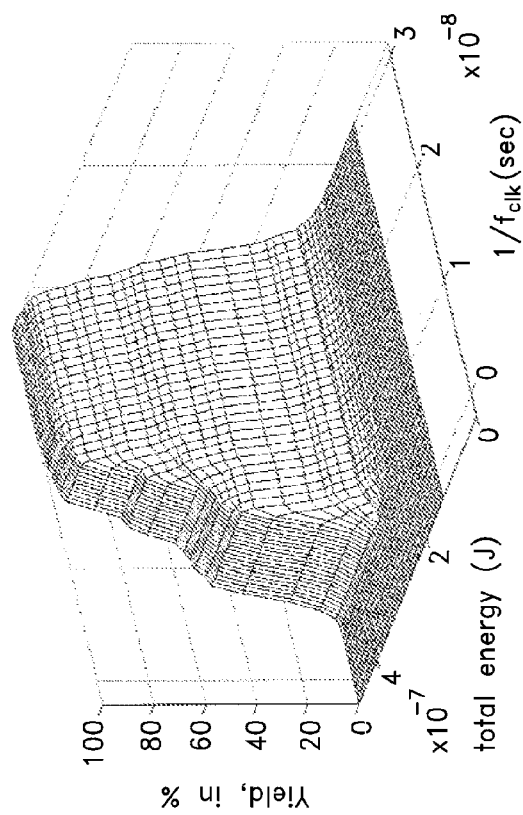
Figure 31A:
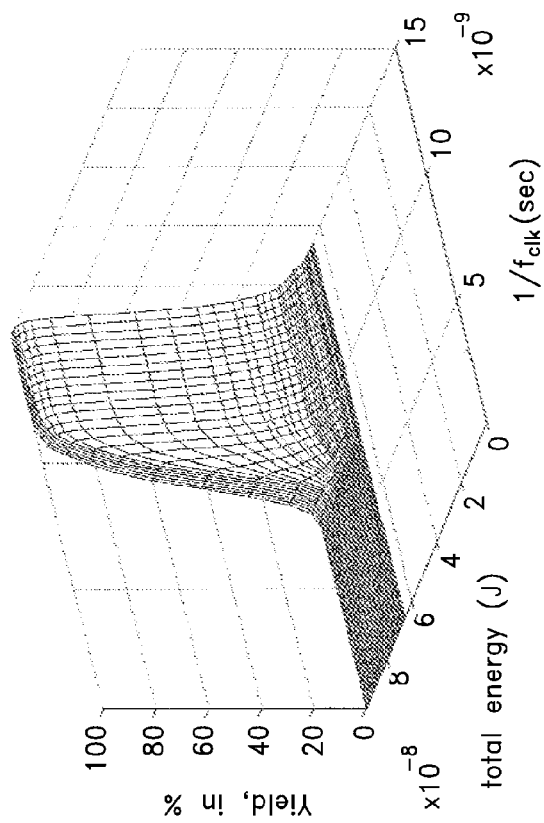

FIG. 31 illustrates a joint Cumulative Density Function for correlated energy and cycle time for two different technology options: (a) 300 mV Vth; (b) 200 mV Vth.

FIG. 32 illustrates a joint Probability Density Function for test vehicle correlating different types of power and longest path delay: (a) dynamic, (b) leakage and (c) total.

Figures 33A, 33B:
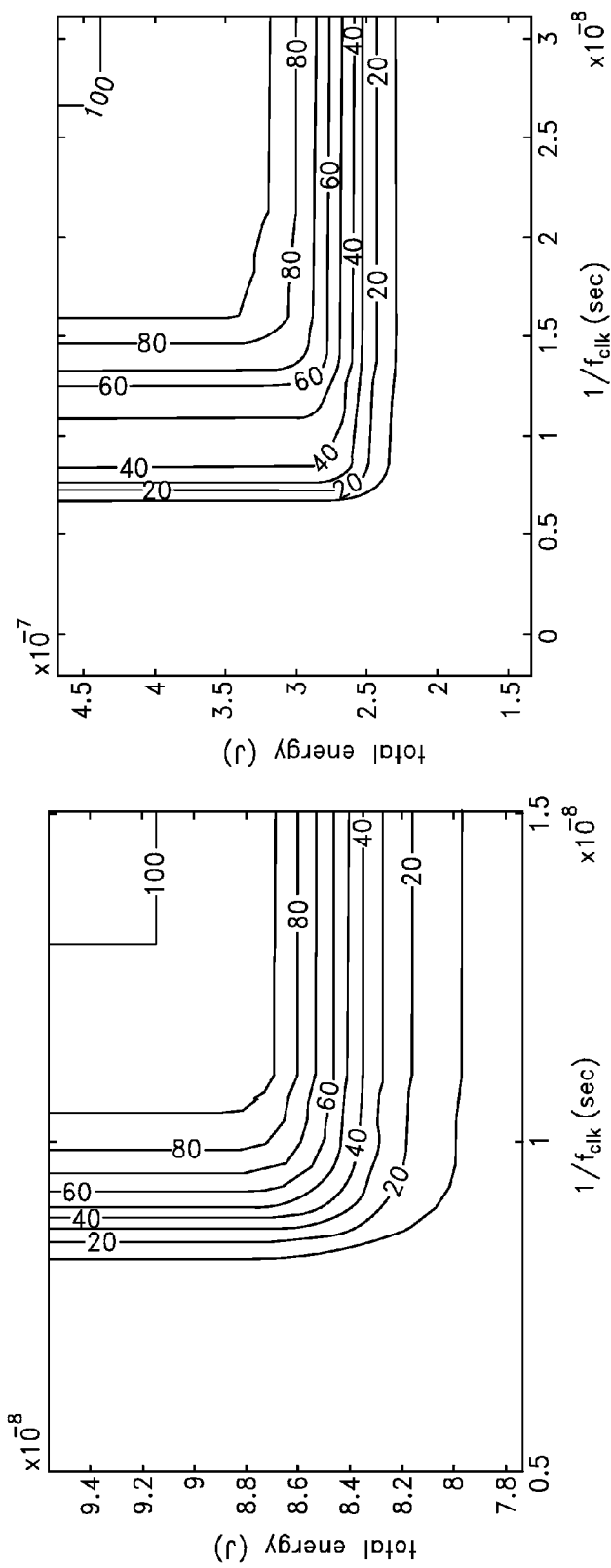

FIG. 33 shows an iso-yield map for correlated energy and cycle time for the two different technology options as illustrated in FIG. 31: (a) 300 mV Vth; (b) 200 mV Vth.

Figure 34:
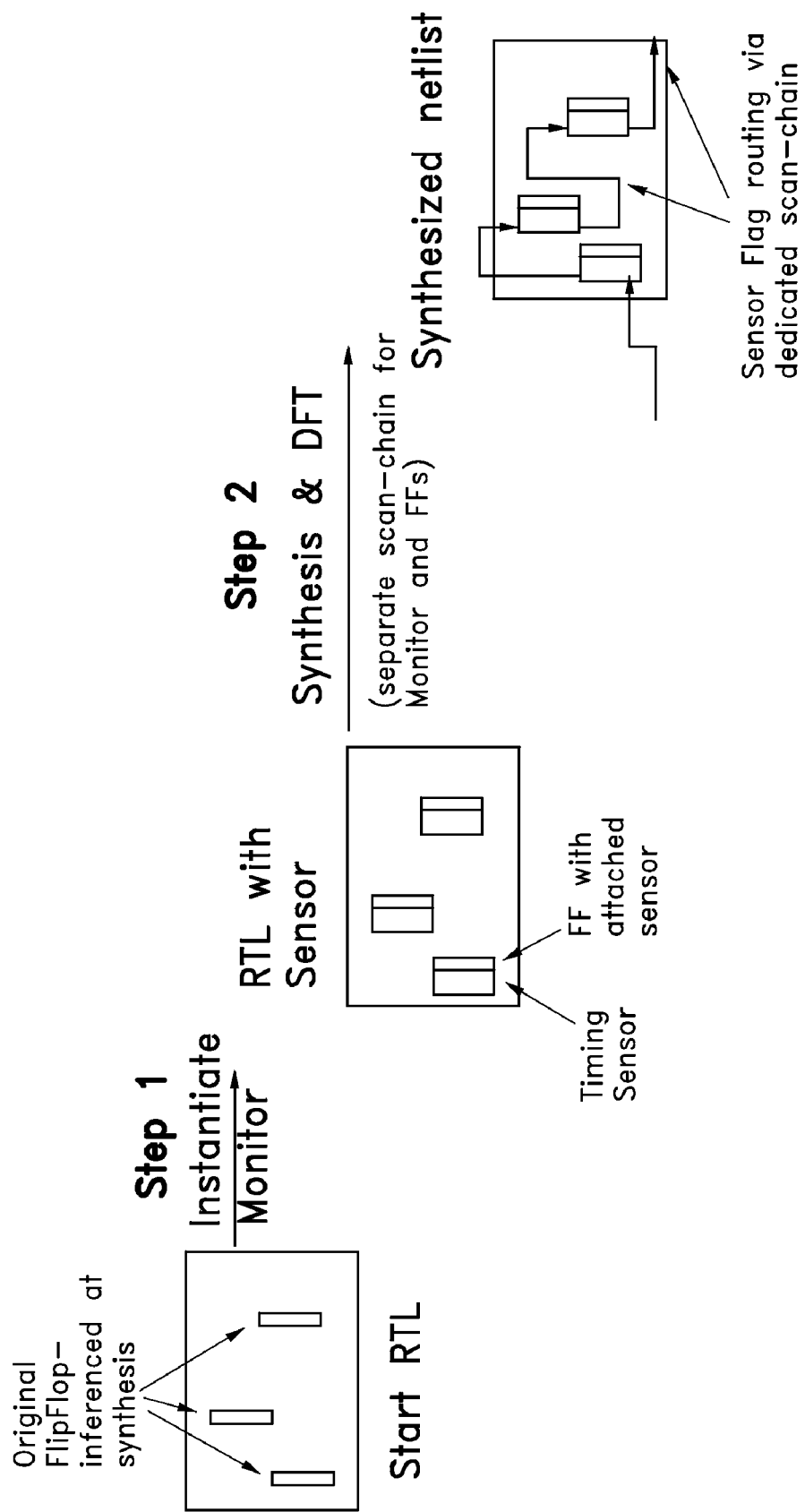

FIG. 34 illustrates the RTL2RTL flow according to another embodiment of the present invention for the insertion, synthesis and routing of digital and analog monitors.

FIG. 35 is an illustration of RTL code before and after delay monitor insertion.

Figure 36:
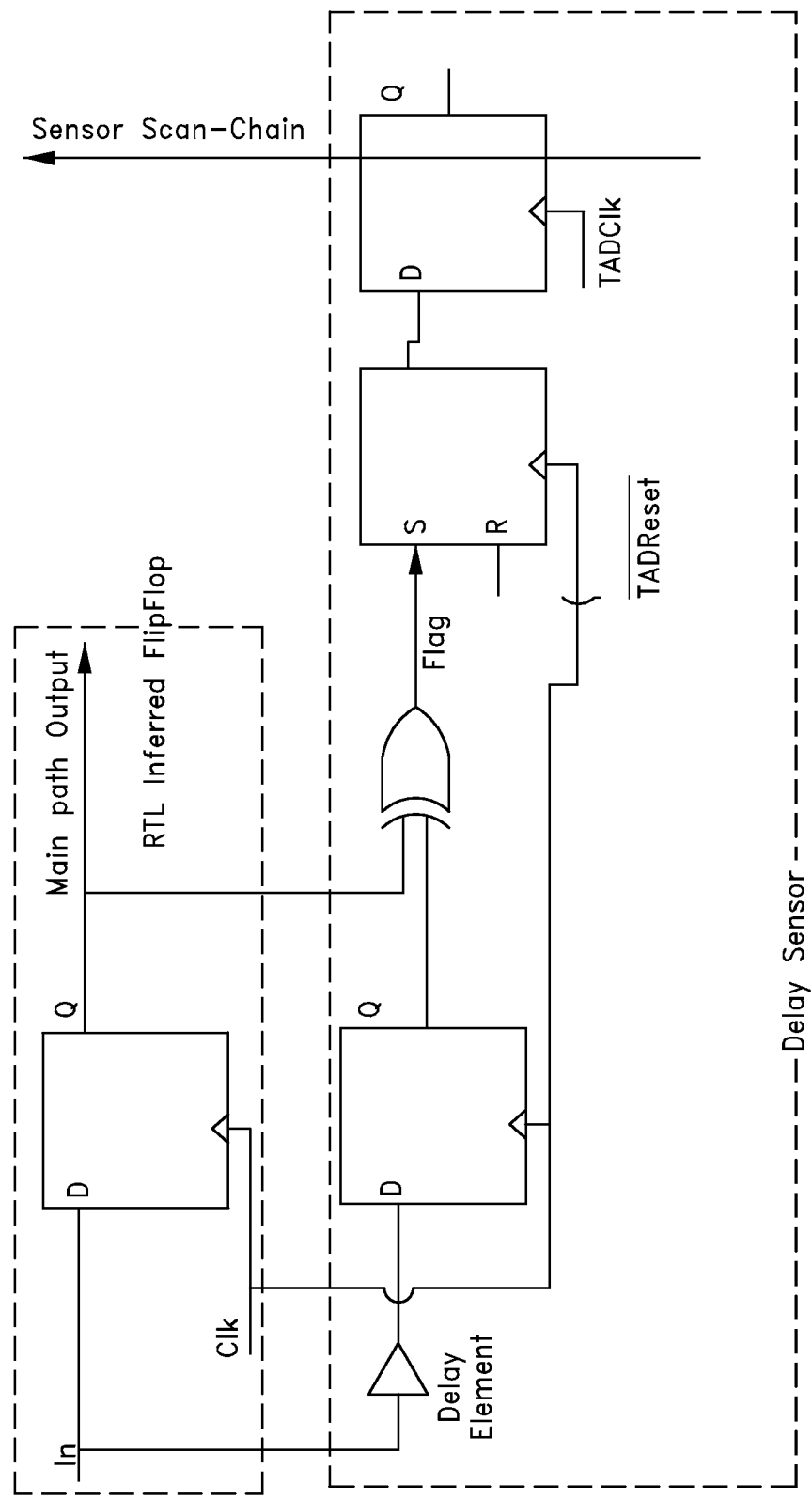

FIG. 36 is a behavioral description of a crystal ball based delay monitor and its output that is routed via scan chain connection.

Figure 37:
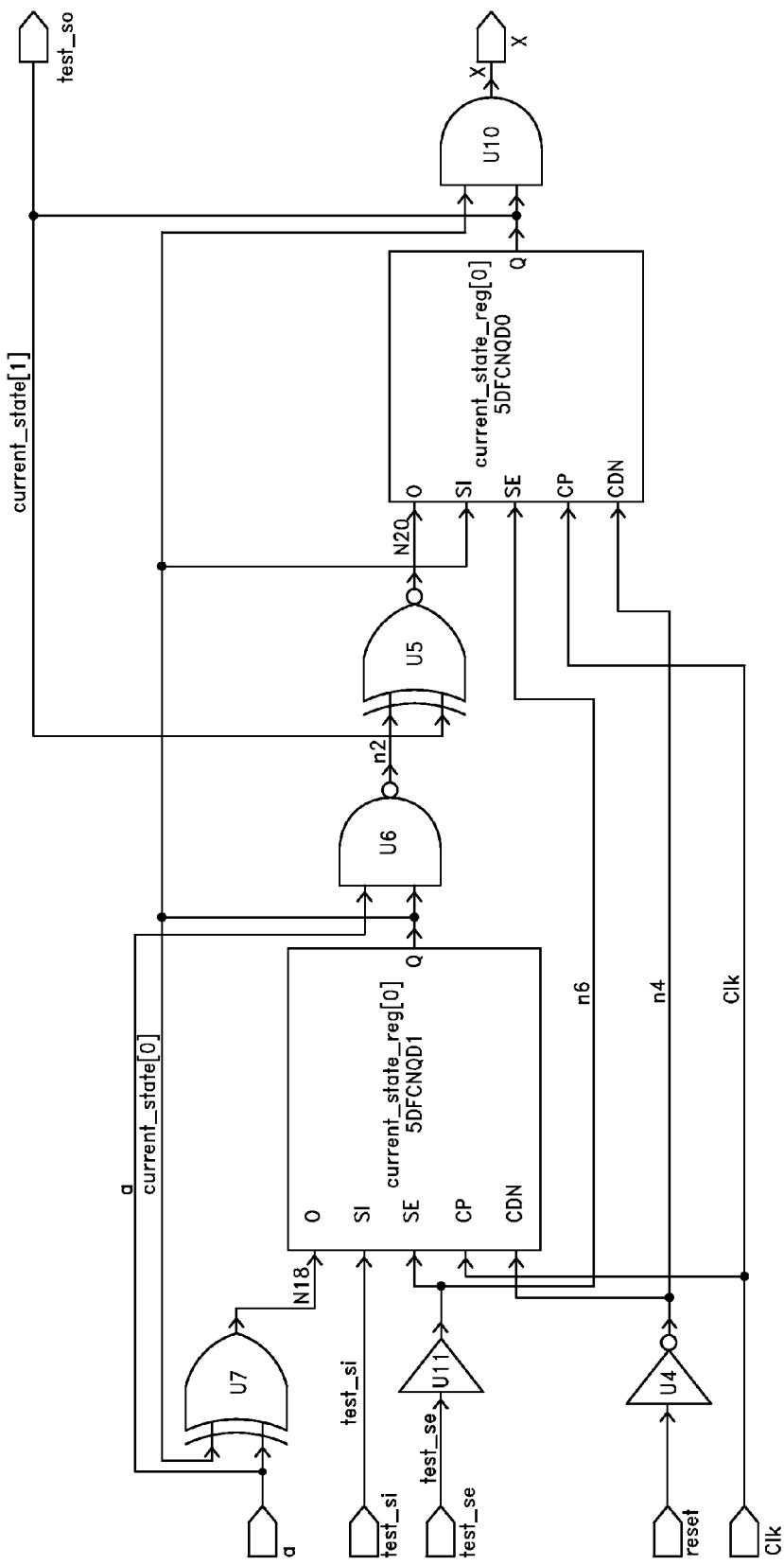

FIG. 37 illustrates a Gate level netlist after synthesis of an original finate state machine.

Figure 38:
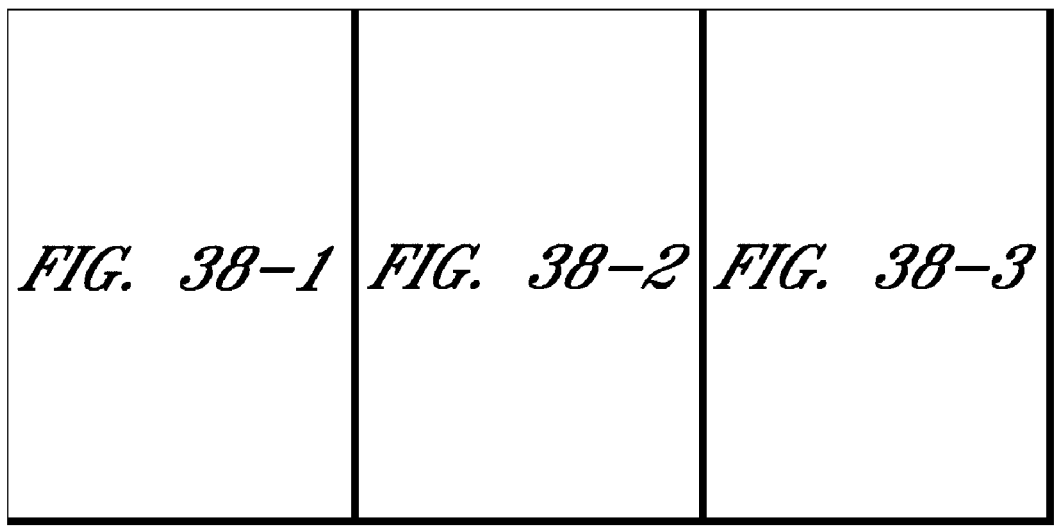
Figures 1, 38:
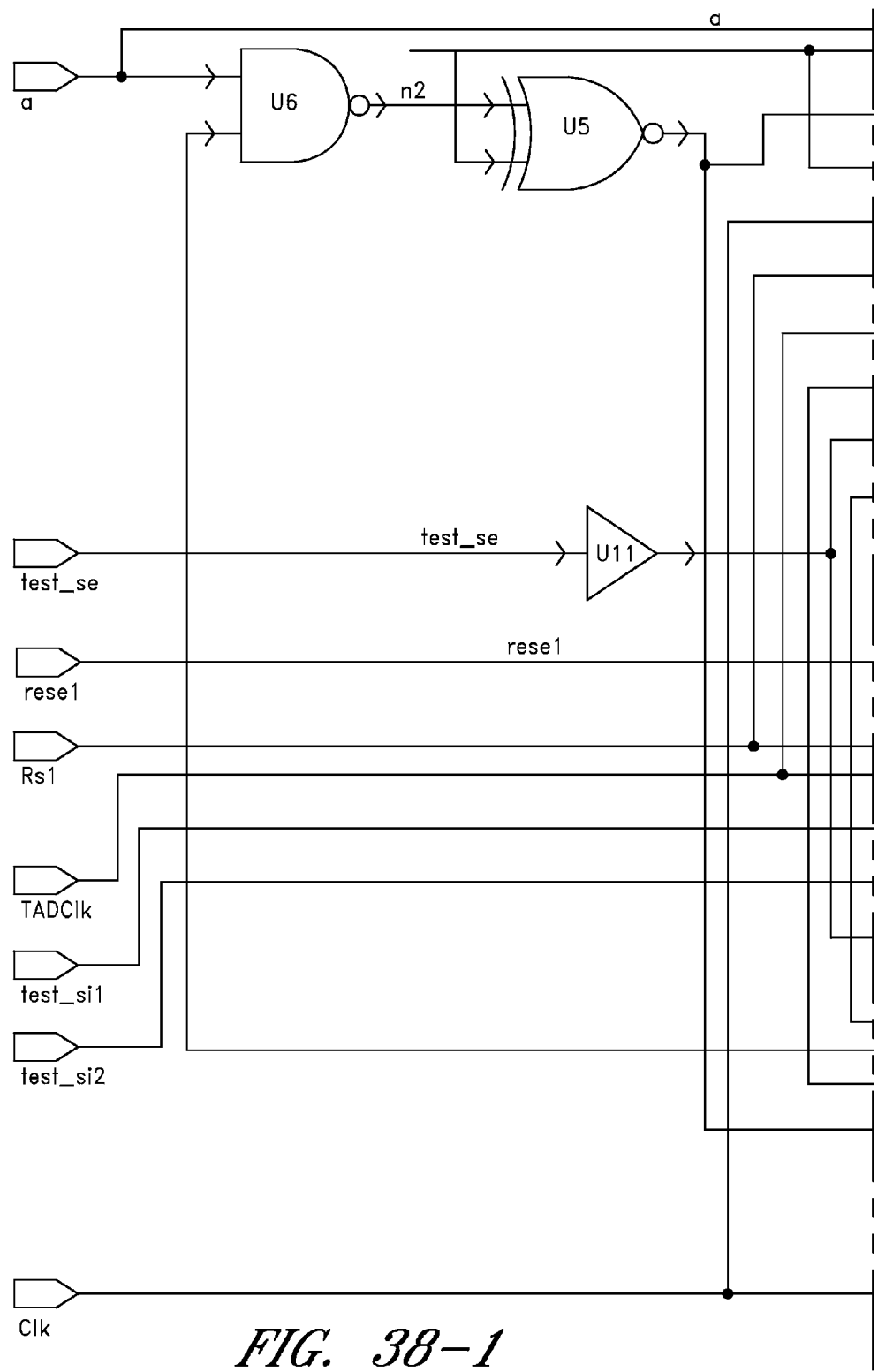
Figures 2, 38:
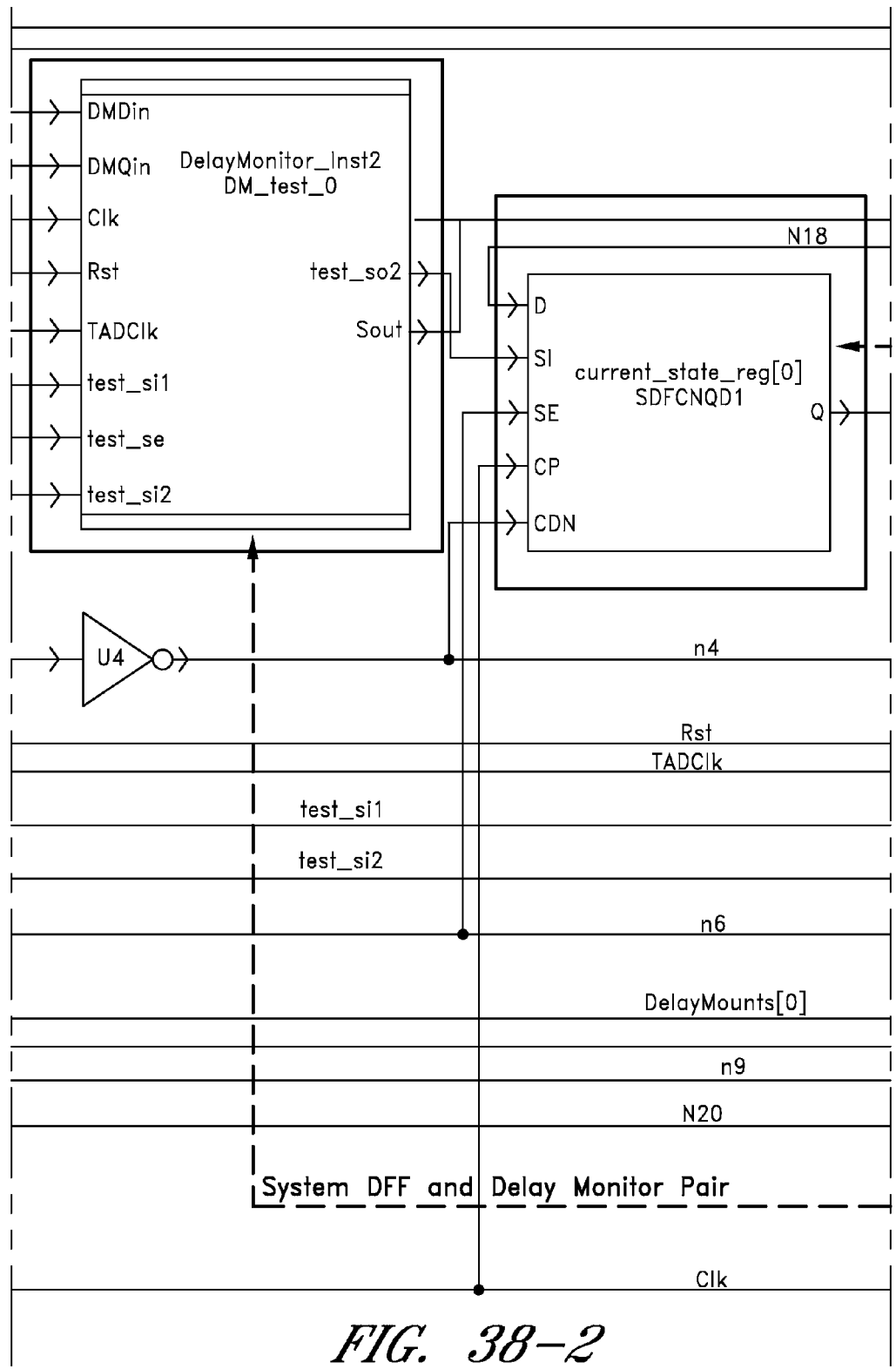

FIG. 38 illustrates a Gate level netlist after synthesis of a transformed finite state machine.

Figure 39:
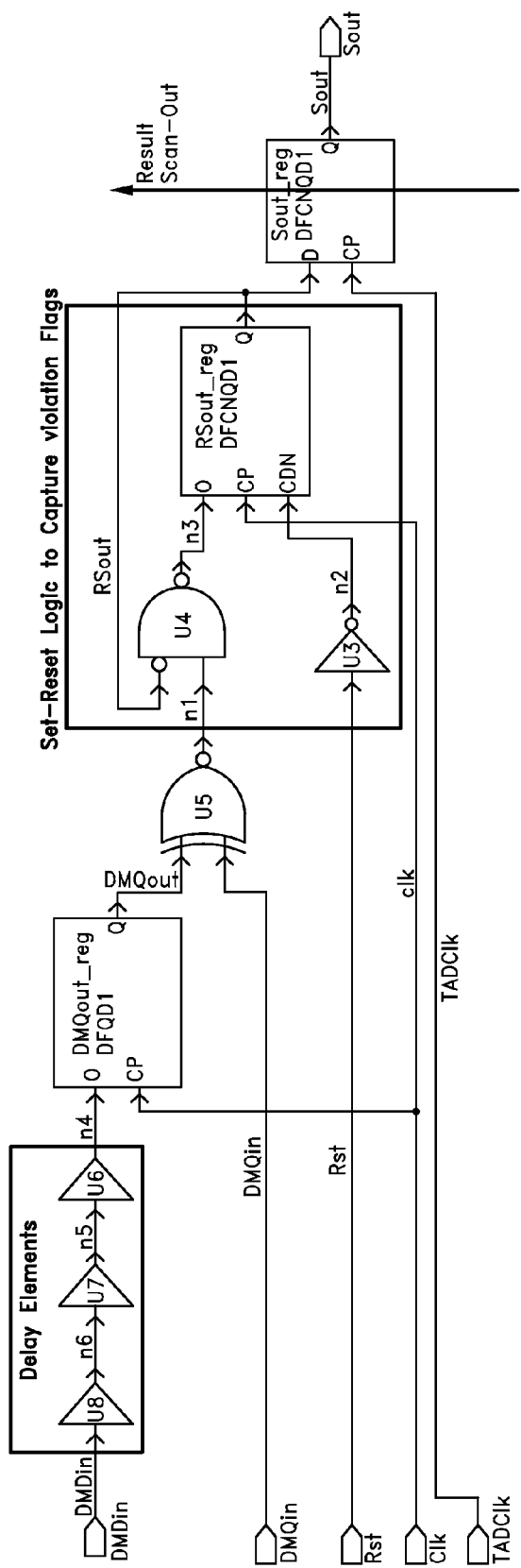

FIG. 39 illustrates the Gate level netlist of Delay Monitor after Synthesis

DETAILED DESCRIPTION OF CERTAIN ILLUSTRATIVE EMBODIMENTS

Hereinafter, the methodology behind and implementation details of an embodiment of the present invention (prototype, called Version0) and its application to a test vehicle of industrial relevance (filled as an EP application), are described in detail.

1. Characterization of Elements of an Electronic Circuit 1.1. Statistical Characterization of Standard-Cell Library A "compact model" of a device is one of the mean inputs for this module both for the p and n MOSFET device types. These models are typically built and calibrated by using information from measurements and/or TCAD (Technology Computer Aided Design) simulations:
Physical, mechanical, chemical, thermal model $$\frac{I}{V}$$

and $$\frac{C}{V}$$

Measurements
Variability, reliability formulas/rules
TCAD including variability

To calibrate the library, which is the output of the module "Statistical Characterization of Standard cells", the provided tools use environmental parameters, like temperature and supply voltage. Most variability parameters and degradation mechanisms have to be added into the simulation flow. For example: $V_{th}$ variability, $\beta$ variability, etc. For that purpose models may be used to be able to simulate the manufacturing problems. One example will be given in the next paragraph, but there are many other ways to include variability into the simulation flow.

Figures 3, 38:
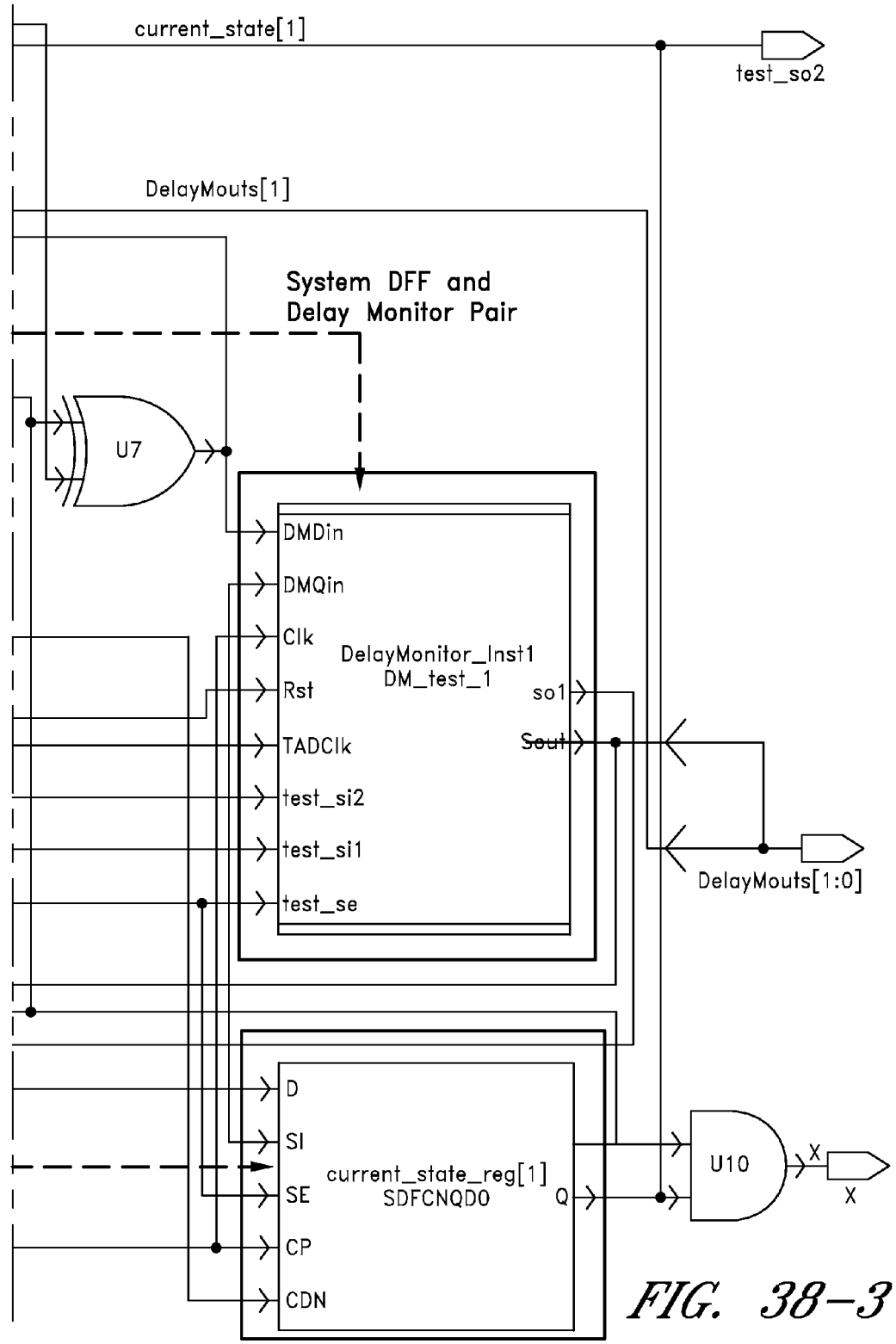
FIG. 3. To include variability the transistor module netlist gets adapted by $\Delta V_{th}$ or/and $\Delta \beta$ calculated by variability rules.

As an example the model for $\Delta V_{th}$ will be explained in general. First every classic transistor will be considered in a SPICE netlist and additional elements are added to model the impact of variability. FIG. 3 shows the netlist of a MOSFET as example. This MOSFET is seen as a black box regarding variability impact, which means every other compact model, macro or even sub-circuit can be used to inject variability by modifying the netlist.

As shown in FIG. 3 the $\Delta V_{th}$ and and $$I_D * \frac{\Delta \beta}{\beta}$$

are added to get variablilty effect. Both variabilities consist of 5 independent geometrical correlations shown in FIG. 1:
intra-device or matched is the consideration of variability within a transistor
inter-device or local is the variability on a chip
inter-die or chip to chip is the variability from one produced chip to an other chip on one waver
inter-wafer or wafer to wafer is the variability from one waver to an other waver
inter-batch or batch to batch is the variability from a set to an other set of wafers.

For the matched intra device geometrical problem, the Pelgrom's rule may be used:

$$\sigma(\Delta V_{th}) = \sigma(\Delta V_{th_0}) * \sqrt{\frac{(W_0 + \Delta W) * (L_0 + \Delta L)}{\sqrt{(W + \Delta W) * (L + \Delta L)}}} \quad (1)$$

where $\sigma(\Delta V_{th_0})$ is the variability for the nominal transistor size, having nominal design size width $W_0$ and length $L_0$. A similar law applies to $$\frac{\Delta I_D}{I_D}:$$

$$\sigma\left(\frac{\Delta I_D}{I_D}\right) = \sigma\left(\frac{\Delta I_D}{I_D}\right)_0 * \sqrt{\frac{(W_0 + \Delta W) * (L_0 + \Delta L)}{\sqrt{(W + \Delta W) * (L + \Delta L)}}} \quad (2)$$

At this point it can be the, that not every technology problem can be modeled using Pelgrom's model. For example for all other geometries $\sigma(\Delta V_{th})$ is independent of width and length and has to be modeled in another way.

Library Format of Standard Cells:

The result of the module "Statistical Characterization of Standard Cells" is the characterization of the standard cell library in terms of power and delay affected by the variability. This Cell library may be written in .LIB (LIBERTY) format. This library includes the following information:

Library Header

The library header includes the general definition for units, threshold voltage and operating condition of the library. There are two different kinds of parametric definitions for the delay and energy of the cell:
scalable polynomial based—provides a polynomial equation based model
table based—provides a table based model including output load capacitance In particular examples, the table based model may be used for delay_model, therefore also the lookup table templates for delay, energy, recovery, hold time, setup time and active energy etc. can be defined in the header.

Cell

In the cell region the area and the leakage are specified. The library assumes the cell leaks all the time and is not timing dependent hence results from DC analysis. The next era in the Cell region defines for each pin of the cell the direction, the capacitance for rising and falling transition and the timing tables. For area no cost is assumed. However, in other implementations cost for area may be assumed as well.

The variability standard cell library consists of a number of MC versions of each cell. This variability cell library may also be expressed in LIB format and it can be converted to other library versions for the commercial tools for example to VITAL for logic simulation or DB for synthesis.

1.2. Statistical Characterization of Digital Components

This VAM module is a framework, which may be implemented by combining different commercial tools in a particular way, providing the right inputs and outputs. This gives the advantage to exchange these tools to use different vendor's tools by keeping the functionality of the flow. Such a functionality is to estimate the delay and energy of a given gatelevel netlist, such as a component in an architecture or, in embodiments of the present invention, a complete flatten architecture. Flatten means in this case, that this netlist uses only standard cells of given cell library without any additional hierarchical component being present. This is, however, not a function of the methodology of embodiments of the present invention, but rather a feature which may be required by the implementation of a script in charge of creating the MC netlist which may be designed for dealing only with flattened verilog descriptions. The functionality of the framework can be divided into five steps:

MC Netlist is a tool in this module, which duplicates the nominal netlist of a block while adding a randomised version of the cells by using the statistical standard library. This randomisation may be based on a pure Gaussian random process.

Activity traces are the activities of the primary input output of the block which provide the possibility to simulate the netlist via stimulation of the input ports. The tool simulates the functionality behavior of the whole architecture for the defined block. However, it is also possible to simulate the whole gatelevel description by exchanging the defined blocks with their synthesised netlist. The tool involved here may for example be Modelsim from MentorGraphics.

Timing analysis is the first MC analysis loop in this module. This loop estimates for each created netlist the timing reports by using the statistical standard cell library information. The designer obtains from this tool the statistical time of the critical path of the block from the different MC netlists and also the standard delay file, which contains the delay information for the different operation conditions. Other tools, such as the Gatelevel simulator, may use this file to obtain the activity of each net using accurate timing information of the cells. The timing analysis tool used in this loop can for example be Prime Time from Synopsis.

Activity analysis uses the delay files from the previous analysis tool and the activity traces at the input of the component to simulate the gatelevel description. The result of this tool is the toggling count of the nets in the simulated block. Because it can be controlled which MC netlist is being structured, there is a correlation between timing and activity information. Modelsim from Mentor graphics may for example again be the tool used in this loop.

Power Analyses is the last MC analysis loop. This one calculates the power consumption of the component under characterization based on the toggle count information and delay information to estimate the power for the cells and additionally net parasitic capacitance information.

1.3. Variability Aware Analysis of Switching Power

It may be questioned how device variability can create switching power variability. Timing uncertainty on the toggling activity of converging nets results in unnecessary switching or glitches; this can propagate through the logic gates and create a multiplying effect. Fanout paths, reconvergent logic and logic depth can create a considerable amount of unnecessary switching activity under timing variations. This useless activity adds up to the required activity needed to perform the actual function of the circuit and it correlates to the timing variability.

To evaluate the magnitude of process variability in switching power a figure of merit is defined, hereafter called the Weighted Activity (WA) product. This figure of merit accumulates the product between toggling count and equivalent capacitance of every net of a circuit (including parasitic) and is directly correlated to the switching energy spent in the circuit, independently of the selected clock frequency. Hence, $$WA = \sum_i \alpha_i * C_i \qquad (3)$$

wherein $\alpha_i$ is the toggling count per net i of the netlist, and
$C_i$ is the equivalent capacitance per net.

The toggling count per net is obtained after gatelevel simulation and the capacitance per net is obtained as a report from the timing or power analysis tool. To account for the statistical impact of random process variability a number of Monte-Carlo logic simulations are performed on the target hardware description, e.g. Verilog, netlist. This is done according to the simulation flow described below. In that simulation flow the logic simulator is fed with a timing file (e.g. .sdf) obtained after static timing analysis of each MonteCarlo loop. Such .sdf file contains the influence of process variability in the timing of the signals along their propagation paths. The process parameters are changed by using a simulation based percolation flow from the standard cell library to the verilog netlist. The flow proceeds in two steps. In a first step we go from device level variability to gate level variability, resulting in a set of MonteCarlo libraries of characterized (.lib) files. Given an invariant (e.g. nominal) SPICE level description of the netlist, Monte-Carlo versions of such description are created by adding voltage and current in its netlist and selectively injecting threshold voltage variations and transconductance variations on these sources. In a second step gate level variations are injected in the digital netlist of the circuit. Given a verilog netlist, Monte-Carlo versions of this Verilog netlist are created by replacing the original cells of the netlist by one of the cells found in a Monte-Carlo characterized Jib library.

After Monte-Carlo analysis the WA metric is calculated for the architecture (e.g. a Very Long Instruction Word—VLIW processor from the portable wireless terminal domain). The processor considered (in the embodiment described below a symbol synchronization engine located before the base band processing) contains five pipeline stages and it is synthesized on a 32 nm standard cell library. The circuit has 120K gates. The test-benches (application input) used here were derived from the Wireless LAN functionality simulations. In particular it contains 1714 processor vectors that are required to synchronize one actual symbol of the wireless channel. On the technology a PTM compact model for the 32 nm technology node has been used. In fact a hypothetical transistor compact model has been created that corresponds to the low standby power transistor from the ITRS roadmap. The model parameters used were the following: printed channel length 32 nm, Leff 13 nm, tox 1 nm, Vth 300 mV for the NMOS and −300 mV for the PMOS device, VDD 0.8V and Ron 150 Ohms. In this, and other experiments reported here, the underlying MOSFET variability was a synthetic distribution based on the 1 sigma=20% of Vth as predicted in the ITRS.

Glitch power has always been present even without process variations. Also timing analysis does not give all the possible arrival times at any given input. It only provides a range (max and min) and, since in real semiconductor, e.g. silicon, technology the actual signals can arrive at any time within the range, it is possible to generate extra glitch activity. Therefore such range is considered in the analysis in the form of min-max capacitance at the net. However as shown here, random WID process variations also cause uncertainity and cause additional gltiching power, in the case illustrated up to a 47% of glitiching power additional to the already existing power without the presence of WID variations.

The results are actually depicted in the histograms plotted in FIG. 28. The net capacitance report summarizes two values, a minimum and a maximum capacitance depending on the actual signal transition type at the net (e.g. rise or fall). Therefore two histograms Cmin and Cmax are computed associated to these two possible situations. Every Monte-Carlo run simulates all the 1714 vectors of the RTL test bench. Consequently, every Monte-Carlo run already accounts for the impact of the vector variation in the WA metric. Therefore the remaining variability that is observed in WA can only be due to extra switching activity which is not required to perform the logic functionality of the processor. Indeed this is attributed to unnecessary switching or glitches created by signals "travelling" the logic and converging at gates with unsynchronized timing. Such situations are avoided during synthesis, hence the invariant circuit (hereafter called the "nominal" circuit) does not suffer of such effect. Indeed the logic synthesis tool ensures such timing paths are properly balanced. Unfortunately this is not the case for the circuit after fabrication, affected by process variability.

The amount for process induced activity variability can be very large. For the driver discussed, this results in a shift of the nominal activity toward a higher statistically expected value between 38% and 47% and a +/−3\sigma spread between 32% and 34%. After power analysis (see below), the final dynamic power figure for the complete SoC (that includes switching capacitance and internal switching power) shows a shift of 35% for the statistical mean over the nominal value and a +/−3\sigma spread of 30% of such mean. This clearly proves that for random WID variations, capacitance variations do not average linearly across the switching nodes of the die and thus do not have negligible impact on switching power when the impact on activity induced variability is not ignored.

1.4. Architecture Level Yield Analysis

In the previous steps each component in the design has been statistically characterized. This characterization includes the statistical critical path and the power information, both active and leakage power. The goal of the architecture level yield analysis is to statistically estimate the timing and power consumption at the system level. Using these results it is possible to compare the system parametric timing/power against their specifications. Based on the activities of the connections and the nature, asynchronous or clocked, the statistical properties of the different logic blocks get combined.

This is accomplished by techniques for system yield analysis starting from components that are characterized at the gate level (see referenced patent applications).

2. First Embodiment of A Simulation Flow for Statistical Energy/Delay Characterization of Digital Components According to Embodiments of the Present Invention In the previous chapter the methodology of a VAM Environment in accordance with embodiments of the present invention has been explained. In this chapter a methodology for the "Statistical digital characterization for standard-cell blocks" will be presented, as outlined in FIG. 4. The Figure shows the bottom up Framework of the VAM Environment.

The Framework Module "Statistical standard cell library characterization" creates random cells based on the designers configuration for the compact model including $V_{th}$ variability and transistor gain (β) variability. These standard cells are simulated by the "Characterized standard-cell" module and this simulation creates the variability library for the next level.

The Interface "create random logic Components" placed between the "Statistical standard cell library characterization" and the "Statistical digital characterization for standard-cell blocks" can be explained using a brick and wall analogy. The variability standard cell library can be thought of as a basket of a random set of bricks, one for each type of brick. The script implementing that interface randomly picks a brick instance out of a brick type basket. This brick is then randomly assigned to a brick of the same type in the random wall. This wall is in the present case the gate level netlist for the specified Component.

The goal of the "Statistical digital characterization for standard-cell blocks" is to simulate gatelevel netlists (walls), preferably with any commercially available standard simulation and analysis tool. For timing, Static Timing Analysis (STA) tools exists for example the Prime Time tool from Synopsis or XT tool from Mentor Graphics. To obtain the vector set at the inputs of each component while preserving activity correlations between components application related activity information is propagated from the Register Transfer Level (RTL) testbench down to the logical netlist. These activities can be obtained by simulating the RTL implemented in the Hardware Description Language VHDL of the Architecture simulating a defined Application, as outlined in FIG. 4. These Activities, which are recorded during simulation, provide input to the logic simulation phase for activity analysis under variability. The goal of this step is to obtain the correlated delay and power for the characterized gatelevel netlists under variability. The framework module "Statistical characterization of SoC architecture" catches the variability information for the complete SoC architecture providing feedback on system wide yield integration. Using the above simile of bricks and walls this step can be seen as building MC houses out of MC walls.

In the following section, a detailed description of these steps is given.

2.1. Simulation Methodology to Obtain Bit-Level Activities of Specified Components It is clear that the MC loop is a time consuming process. Therefore, a solution has been looked for to minimise the work in the loops. In accordance with embodiments of the present invention, it has been decided to simulate the VHDL source of the Architecture in RTL by using a specified Application testbench. This provides the possibility to create a Stimuli file for the Gatelevel simulation. Therefore it is not necessary to simulate the application on the whole architecture at the gatelevel in contrast to simulating only the Component. This saves a significant amount of CPU time.

For the RTL module it is necessary to have beforehand, in addition to the architecture description, a simulation framework including a testbench.

FIG. 5 shows the architecture behind this framework. The algorithm will be described in detail below.

The architecture for simulation is explained using the testbench framework for the architecture of the test vehicle. Such architecture corresponds to a real life design of a processor, hereafter called SyncProll. Still, this architecture is generic enough to accumulate any other application functionality for the SyncProll processor but also for different designs. The design of the processor which is used as input for the RTL module, is a VLIW machine. This is a pipelined architecture with two fetch, a decode and two execute pipes. By using the memory compiler the simulation script, e.g. the Modelsim script, is able to simulate the complete behavior of the micro processor. This is possible, because Modelsim provides the functionality to load his memories with a particular file, which contains the application information in form of VLIW instructions. To be able to simulate the behavior of the whole design a testbench maps the test-vectors of the stimuli file, e.g. stim.dat file, to the input pins of the design. The Modelsim script receives as input the RTL VHDL sources of the architecture, configuration files, the testbench and the initialisation files for the memories in the architecture. The Modelsim scripts works in three steps. The first step is to compile the RTL VHDL sources of the architecture. The second step is to initialise the program memory based on information, captured by simulating the application opcode. The third step is to simulate the architecture by running the application testbench by reading the data value of the stimuli file, e.g. Stim.dat file. During this simulation, the activities are stored, e.g. the function "vcd dumpports" of Modelsim, writes the activities into the Value Change Dump (VCD) file. This is used to obtain the stimuli information for the Gatelevel simulation. The Components for which the activities are collected may be specified into a configuration file. After simulation the generated activity tracing file, e.g. a vcd file, contains the bit-vector set for the defined component in the architecture. If the designer changes the system architecture, only the following modifications need to be changed:

If there are no memories in the architecture, no initialisation in the Modelsim script is necessary. It can be commented out.

Only the configuration file has to be changed with the new components name and instantiations.

2.2. Monte Carlo—Characterization of Digital Components

In this section the "Statistical digital characterization for standard-cell blocks" is described in detail. Outlined in FIG. 6 the simulation flow shows the four MC loops, one for generating the variability netlists and the other three for analysis of the timing, activity and power, respectively. The "Create Random logical component" module creates the variability logical netlists based on the variability library obtained in level below in VAM. It also requires the original netlist of the block to be studied. The MC loop of the "Timing Analysis" module reads all existing variability netlists of the defined component and calculates the delay of the critical path capturing the delay for each cell. The module "Switching Activity" provides the transitions of each signal based on the stimuli simulation of the RTL simulation. The last MC loop calculates the power of each netlist based on the activity and timing information obtained in the previous modules.

2.2.1. Create Random Logic Components

The heart of this VAM module is a script that creates random Netlists by using statistically characterized standard cells.

The random netlist generator takes the nominal verilog netlist and uses the information of the Variability library to change the Cell names and modify the netlist file. A very straight forward solution could have been to simply concatenate a randomly generated number to the cell name found in the netlist. However, there is no guarantee that that cell instance may exist in the target variability cell library. Indeed sometimes a too high variation in the threshold voltage of a cell may lead to a non functional cell, therefore such cell is discarded from the variability library. If the randomly generated number refers to a cell that has been discarded it will therefore refer to a non existing cell in the library and this should be avoided. Possible solutions are outlined FIG. 7a and FIG. 7b.

In the solution illustrated in FIG. 7a, the Random Netlist Generator saves the different Cell names into a Hash table. The Cell name is the key to an extended list, where the different version numbers are saved. If the script finds the target Cell name in the hash table it uses a random key for the extended Hash table to obtain a version of the cell, which is then used to replace the target cell in the variability netlist.

In the solution illustrated in FIG. 7b, an alternative implementation of the Random Netlist Generator avoiding the use of a hash table is shown. The nominal Cell name is the first key to a double list. The second key points to where the different version numbers have been saved. When the script finds the target Cell name in the first list it uses a random key for accessing the second list to obtain a version of the cell, which is then used to exchange the target cell name in the variability netlist.

2.2.2. Timing Analysis

After creating the MC netlists a timing analysis tool, like for example Prime

Time, loops over all defined Components to calculate the delay file for the gatelevel simulation and for the critical path. FIG. 8a shows the input and output of the timing analysis tool. The script reads the synopsys design constraint (SDC) file which contains the timing/area or power constraints and clock, library, and load capacitance for primary output/input configuration of synthesis. The LIB file represents the variability library with the random type cells, which are used in the verilog netlist. The synopsys parasitic exchange (SPEF) file includes the parasitics obtained after physical design. This file is received after place and route for example with the commercial tool SoC-encounter. In this case VAM would simulate an architecture after place and route. The script uses then these inputs to calculate the timing file, e.g. SDF file, with the delay information of the cells and a timing report counting the delay of the critical path.

2.2.3. Activity Analysis

After obtaining the timing information accurate switching activity information is to be gathered at a switching activity file, e.g. a SAIF/VCD file. This is typically obtained after detailed gatelevel simulation. FIG. 9a shows the script for the Activity Analysis. As an example, for such activity analysis the tool Modelsim from Mentor Graphics may be used. The script reads the standard delay file, with the cell delays and their operation condition, the variability library and the MC netlist to simulate the MC gatelevel descriptions. For this step the VITAL files and the netlist need to be compiled. This VITAL library represents the cell information of the LIB file in VHDL or verilog format. After this the logic simulation can be run. To get the Switching Activities the switching activity file is created, e.g. a VCD file. This File Format is structured and it may be similar to the SAIF. The difference is the VCD file provides detailed information on activity per clock cycle to the SAIF file, which only gives total toggle count. It is possible to convert the VCD file to the SAIF file, if necessary, by using a commercial tool. Both files can be used for the power analysis, however, using a VCD file provides a more accurate result as it contains cycle true information (e.g. the actual waveform information instead just the total toggling count).

2.2.4. Power Analysis

After processing timing and activity MC loops the switching activities are obtained considering the delays of the cells and the delay of the critical path. Hence any spurious at the output of gates have been accurately captured. Once this is done power analysis can be performed, e.g. using a commercial power analysis tool such as for example Prime Power. To be able to perform the power calculation, the following input information is needed (as shown in FIG. 10a):

variability netlist: these files are the result of the module "Create random logic components" and are used here as well as in other modules.

variability library: the variability library is used by the power analysis tool, e.g. the Prime Power script, for example by using the LIB format. This file provides the characterization of the random type cells, which are used in the netlist.

switching Activity File: the results of the Gatelevel simulation entered into a power analysis tool, e.g. Prime Power, to get transitions and the state in each net per clock cycle.

synopsys design constraint (SDC) file: this is the constraint file like used for a time analysis tool, e.g. Prime Time, to get the same design configuration (e.g. default load conditions at primary output, default slew rate at primary inputs, etc.) as defined for synthesis.

Resulting from back annotation it presents from the physical design phase, it is possible to add a synopsys parasitic exchange file (SPEF) with the net information of the Component after routing. The back annotation netlist can be used in the simulation flow like a logical netlist. Based on the input information the power analysis tool can calculate the power report for each simulated component. Their are two different power calculations, that have to be summed up to reach the total power figure:

leakage power and
active power.

The leakage power is the power consumed by the gate when inactive, hence when the gate does not switch. This is mostly due to leakage between source and drain, but may also be due to gate leakage. The active power is the power, consumed by the gate when it is active because of the switching of the output net. Active power can be represented with the following equation:

$$activepower = switchingpower + internalpower \quad (4)$$

The third party power analysis tool may use for calculation of power the information of the library, which in embodiments of the present invention is the statistical standard library. The following calculations are assumed to be by the power analysis tool:

Leakage power is the sum of the leakage of all cells in the netlist. In the .LIB format assumed every cell has a fix value of leakage, which means that this is not timing dependent. However, the leakage of the same cell affected by variability may change over time.

Internal power is the dynamic power consumed inside the standard cell, considering the short circuit components Switching power is the dynamic power consumed in the capacitances of the nets of the circuit, including also the parasitic capacitances extracted from the layout.

Both the internal and switching power components consider the toggling rate information contained in the activity files (.SAIF and/or .VCD). Also the timing of the signals at the nets are involved in these calculations.

Total power is shown in the power report as the summary of active power and leakage power.

Using this power report and the delay report the histograms for power and/or energy can be calculated against timing curves and a comparison against the nominal design can be performed by using the functionality of the last module "Statistical characterization of SoC architectures".

2.2.5 Integration with Foreign Data Frameworks and CPU Time Efficiency Aspects

The CPU time efficiency of the characterization framework in accordance with embodiments of the present invention can be drastically speed-up by performing the task "create random logic component" (See Section 2.2.1 above) inside third party tools. Indeed by doing so the CPU time intensive task of unnecessarily re-parsing all over again each Monte Carlo is avoided. Indeed, this is a redundant task since all Monte Carlo netlist are structurally (e.g. topologically) the same, hence it is unnecessary to repeat a large part of the parsing effort (e.g. the circuit topology check and construction) over time. Instead this task can be performed by accessing and changing the reference of the netlist cell instance to a particular library cell element (a Monte Carlo standard cell). FIGS. 8b, 9b, 10b show how to adapt the different steps to implement this variant.

FIG. 11a shows details of an implementation of a VAM Module according to embodiments of the present invention when creating variability netlists outside third party tools. The flow comprises generating a Monte Carlo (MC) set of netlists (see box Create Random Netlist) by following the process illustrated in FIG. 7a or 7b which are later on, each of them, analyzed for their critical timing path (see box Timing Analysis); simulated at the logic level (see box Gatelevel simulation) and analyzed for power (see box Power Analysis). At each intermediate step a number of standard MC files are generated (see .v, for verilog, see .vcd, for value change dump, see .sdf, for standard delay format and see .saif for standard activity information format). Besides these intermediate files there is a second output of the flow in the form MC of timing and power reports in a non-standard format (see .rep files)

On the other hand, FIG. 11b shows details of an implementation of a VAM Module according to embodiments of the present invention when creating variability netlists inside third party tools. In this case, instead of storing all intermediate MC files as illustrated in FIG. 11a, the process is done by making all needed analysis (e.g., analyzing the timing, performing the logic situation and analyzing the power) for each MC generated netlist before the next one is actually being produced. This saves intermediate storage by several orders of magnitude (from GBytes to Mbytes) and CPU time by avoiding the repetitive parsing of netlists which are topologically identical (see the different MC .v files of FIG. 11a). This requires however the capability of exchanging names of the original identifiers for the cells of the input gate-level netlist by the respective variation versions in the third party tool. FIG. 30 shows an implementation of the concept enabling such capability.

3. Experimental Set-Up and Results of the First Embodiment

This chapter presents the outcome of applying a particular environment according to embodiments of the present invention, called the DIGIVAM environment, to a real-life test-vehicle of industrial relevance. Such test-vehicle is part of a software defined radio (SDR) being developed at IMEC. It comprises a synchronization engine for a baseband processor. This processor is the second generation of its nature designed at IMEC and is called hereafter SyncProll.

The results obtained in this chapter are based on the "Characterized standard-cell" script of the variability aware modeling in accordance with embodiments of the present invention. The output of this script is the statistical library. A synthesis flow is used to obtain the netlist of the design. The following sections discuss how to obtain the variability library and netlist of the design. The last section in this chapter compares the nominal design with the design effected by variability.

3.1. Description of the Test-Vehicle

The SyncProll is a pipelined synchronization processor. It is implemented in LISA and can be exported into an RTL VHDL description by using the Lisatek tool suite from Coware. The SyncProll itself is a part of an SDR architecture of a receiver for WLAN or WIMAX communications. The methodology is generic and can be adopted for other architectures as well.

The principal functionality of the Testbench of the SyncProll is to find out a synchronization point in the data received by the antenna interface. This receiver obtains a set of specified preambles via the antenna of the receiver. The SyncProll architecture obtains the vectorised data from the antenna and verifies the correctness of the data. For the RTL simulation a file is used, which contains examples of data input. This information is specified via "Stim.dat" file, which includes the defined preambles data. The next block (see FIG. 12) vectorises this information, saves it to a Circular Buffer and sends this to the SyncProll architecture including a signal that indicates the processor is ready to resume the operation. This resume signal wakes up the processor and starts the application which evaluates the preambles.

The functionality performed by the processor is the accumulation of these preambles to verify a specified threshold. By adding up these vectors a ramp function is obtained. After a defined amount of preambles the ramp reaches a specified value. The first correct value of these preambles is the output of the processor and provides the pointer to a circular buffer that queues the data. After obtaining the bitvector information at the sub-architecture level the behavior of the specified component or of the complete architecture can be simulated. For applying the steps in the "Statistical digital characterization for standard-cell blocks" the designer has to provide a synthesis flow to obtain the logical or physical netlist. The designer can increase the accuracy of the simulation flow by providing a netlist after place and route including the SPEF file. In the next section the logical synthesis will be described.

3.2. Synthesis of the SyncProll in a 32 nm Technology

The synthesis flow used for the SyncProll is shown in the FIG. 13. The input for the synthesis tool is the architecture written in a hardware description language such as verilog or VHDL. In the case illustrated, we start from the architecture written either in LISA or VHDL source code. If formated in LISA, the VHDL code is generated compiling such LISA description using the LISATEK tools. However, in case it is already expressed in a RTL language only a synthesis step needs to be performed to obtain a gate-level VHDL or Verilog description in terms of logical netlist or a boolean equation representation of the combinational logic. This logical netlist includes the behavior of the VHDL code in gatelevel format. Obeying constraints, specified by the designer, the synthesis tool is able to optimize for area and/or timing. FIG. 13 shows a design optimized with three different constraint settings. The first setting selects optimisations to achieve a minimum delay design. On the other extreme, setting 3 selects optimisation for an area optimized design (minimum power) with maximum delay. In the middle of both, setting 2 selects an intermediate trade-off constraint to a timing in between the minimum and maximum achievable delay. In the case illustrated it is considered to optimize to the minimum possible delay to investigate the impact in parametric timing yield, shown in FIG. 13 as the upper point in the graph, by setting the maximum target delay constraint to zero. The synthesis tool uses for this optimisation the delay, area and power information of the cells in the nominal library. After optimisation the nominal Gatelevel netlist with the nominal cells of the library is obtained.

Hierarchical Synthesis Versus Flatten Synthesis:

For the simulation flow it is preferred to obtain a complete flatten netlist. To be able to manipulate a logic block all design ware libraries or macro blocks are preferably flattened. This configuration possibility is specified in the synthesis script via an 'ungroup' synthesis option. For the SyncProll 22 different logic macro blocks and 4 pipelined registers are available. However, it is also possible to create one flatten netlist for the complete SyncProll excluding the memory and register file.

3.2.1. Obtaining and Characterizing Under Variability a Target Standard Cell Library in 32 nm FIG. 14 represents the delay and internal dynamic Power histogram of standard cells during gate activation.

FIG. 15 shows the delay and internal total Power histogram of standard cells considering leakage effects. The total power is the addition of active and leakage power.

For the experiments on the SyncProll, 24 basic standard cells including BUF, NAND, NOR, EXOR, INV, MUX, NOR and DFF (FlipFlop) with different driver strengths are used. To characterize these cells at the 32 nm node, the PTM is used, a predictive technology as described by W. Zhao and Y. Cao, "New generation of predictive technology model for sub-45 nm design exploration", Technical report, 2006. The parameters for this model are chosen based on the prediction of ITRS for using low standby Transistors, as described in "International technology roadmap for semiconductors", http://public.itrs.net, 2005:

Effective channel length 13 nm
$T_{ox}$ 1 nm
$V_{TH}$ 300 mV for the NMOS and −300 mV for the PMOS
$V_{DD}$ 0.8 V
$R_{ON}$ 150 Ohm These cells are characterized under variability using 250 MC versions. At this point only $\Delta V_T$ variations have been considered. However this is not intended to be a limitation of the flow. Variations in the current gain factor of the MOSFET can be introduced in the flow without any change required above the statistical standard cell library characterization step.

3.2.2. Modeling Bit-Level Net Activity Under Variability

The results of the gatelevel simulation, e.g. using Modelsim as a simulation tool, are the switching activity files for each netlist. The files include the active and the inactive time of the signals of the logic block and the transition of the signals. However, a more relevant figure of merit is to account for the activity of each net weighted by the corresponding net capacitance. Such metric gives an idea of the variation in dynamic power. Indeed this is the case as dynamic power directly relates to the sum of toggling activity in each net multiplied by the total lumped capacitance in that net (besides other proportional factors as supply voltage and clock frequency). Such capacitance can be obtained as a report of either the timing analysis and/or power analysis tool. These tools usually report two metrics for the total lumped capacitance in the net as the input capacitances of a gate depending on the type of transition (raise or fall) at its input: a maximum and a minimum capacitance. Therefore it is possible to calculate the weighted activities of the netlist as a range of weighted activities $$[\Sigma \alpha_{net_i} * C_{net_i}^{min}, \Sigma \alpha_{net_i} * C_{net_i}^{min}] \quad (5)$$

with
- $net_i$ ... signal transitions
- $C_{net_i}^{min}$ ... minimum capacitance per signal
- $C_{net_i}^{max}$ ... maximum capacitance per signal This formulation has been applied to the SyncProll block VALU_VECTOR0 of the execute pipe and to the complete SyncProll as examples. The two lower plots in FIG. 16a and FIG. 16b illustrate the information of the equations for minimum/maximum capacitance including the nominal weighted activity for comparison. The nominal design has usually a lower weighted activity than the mean of the weighted activity curve under variability. This demonstrates the existence of higher activities in the system caused by glitches due to variability impact in the timing of the signals.

At this point it is to be noticed that there is a variation both in capacitance and in activity due to variability. However, no parasitic capacitance information was available for the nets between the different cells of the digital block. This means that only capacitance of the cells has been included for the different activation at their input and output. The sensitivity of the variation is expected to increase in netlist with actual physical parasitic information annotated. The two upper plots in FIGS. 16a and 16b represent the histogram of lumped capacitances per net in each of the blocks.

3.3. Characterization of Individual Components Under Variability

Using the statistical standard cell library and the MC analysis techniques explained in previous section Power and Delay information of each variability netlist of the defined logic block has been obtained. The "VALU_VECTOR0" component of the execute pipe in the SyncProll architecture is shown as example. The "VALU_VECTOR0" netlist contains 11000 cells. The cell count between components ranges from 350 for the "STORE_DE" memory storage unit to 49000 cells for the "CMUL_EX_VECTOR0" complex multiplier unit. The "VALU_VECTOR0" unit includes the vector arithmetic logic unit functionality MOVE, ADD, AND, SHIFT, SUB and OR operation for vectors and is therefore above the average complexity in comparison to other components of the architecture. Power has been calculated for the vector exciting the critical path of the component.

FIG. 17a,b,c show the histograms for active, leakage and total power of the "VALU_VECTOR0" block of the SyncProll processor, which shows a mean of 2 mili Watt spreading from 1 till 2.4 mili Watt variation for Power, such spread mainly due to active power. This shows a variation of 70% in Power. This value is calculated by using the statistical standard cells without any wire load model and does not consider the actual load of the component within the architecture. FIG. 18 shows a histogram for delay of the "VALU_VECTOR0" block of the SyncProll processor, which shows a mean in delay of about 0.6 nano seconds with a spread up to 1.5 nano seconds standard. This shows a variation of 150% in delay. These values are calculated by using the statistical standard cells without any wire load model and do not consider the actual load of the component within the architecture.

3.4. Simulation 3.4.1. Use of VAM for the Identification of Critical Components

FIGS. 19, 20 and 21 show the delay and energy histograms in comparison with the nominal design, indicated in these Figures by a line. The designer is able to see the energy and delay curve for each component in the system. For delay the nominal line is calculated as the maximum delay of all the nominal values for each component. The components at the right side of the nominal line are statistically slower than the excepted nominal design. This is thus an indication to the designer for speed bottlenecks under variability. Something similar appears for the energy histograms: the components at the right side of the nominal line statistically consume more energy than the nominal design. In the example illustrated it happens for active energy for both the "CMUL_EX_VECTOR" and the "EX_EX2" components. They clearly become dominant in active energy under variability. This is the case of the "CMUL_EX_VECTOR2" which is statistically 25% slower than targeted. The designer can change constraints to optimize the components to redo the top-down synthesis flow. The power is calculated this time for vectors obtained from the RTL simulation.

The load of the component in the system is not included in the characterization. This means that the components are simulated with the assumption that they have nothing to drive. Similarly they are assumed to be ideally driven. Every input/output of the different components has no specified driving/load conditions even if other components are connected to/from it. More accurate information is obtained if components are characterized considering the actual driving and load conditions they have. This can be done via the information contained in the Synthesis Design Constraint file and feeding this file to the timing and power analysis tools as shown in FIGS. 8a, 8b, 10a, 10b, 11a, 11b.

FIGS. 20 and 21 show the active and the leakage Energy consumption of each block and the nominal active and leakage energy value of the SyncProll excluding the register files and memories. The designer can locate, which component has the highest leakage energy or the highest active energy consumption. Depending on the problem, the logic block can be modified for example to reduce leakage by increasing transistor length or properly shutting down gates by properly controlling the introducing sleep transistors present in the cell.

An observation to be made is the fact that not only the spread of the different components should be considered but more importantly the shift between mean of the characterized component affected by variability in comparison to the nominal design.

The advantage of the VAM flow in accordance with embodiments of the present invention is the overview of the curves for delay, active and leakage Power in comparison with the nominal design. The designer can check the mean shift to the architecture nominal value but also the comparison component nominal value and component variability mean value and distribution.

3.4.2. Power/Performance of Complete Architecture Using a Flatten Netlist Description Based on the results from the different macro blocks of the design the whole architecture can be simulated excluding memories and registers. However the digital characterization loop can also be used to characterize the complete flattened netlist of the SyncProll instead of its components. The simulation results of a complete architecture Of the SyncProll, excluding memories and registers, are shown in FIGS. 22 to 25.

The nominal value for the characterized pipe is not the same as in the previous section. The reason (mentioned in the previous section) is the missing drive/load information for each component assumed when the component alone was characterized. In case of using the pipe flattened description these drive/load conditions are implicitly included. It is also to be mentioned that a significant shift is observed of the mean of the characterized architecture affected by variability and the nominal value for delay (36%), active power (20%), and total power (10%). The shift in power increases when considering about the 1000 vectors resulting from the RTL simulation, reporting shifts up to 46% for total power.

3.5. Accuracy of Characterization Flow for Digital Blocks

There are three different points in the VAM flow according to embodiments of the present invention, where results can be influenced by introduced inaccuracy:

The modelling of the nominal cell and cell under variability. Today, this is mainly by using ITRS data and PTM models. The whole simulation flow dependends on this source of accuracy. However it allows making comparative analysis.

The selection of the amount of MC experiments to be done. The designer can configure this and increase the accuracy by using a specified amount of MC loops.

The accuracy of the analysis of the commercial tools, which are used in the VAM flow. There are third party analysis tools such as e.g. Modelsim, Synopsis PrimePower and Synopsis PrimeTime, which specify the correctness of the analysis.

FIG. 26 shows the results of the characterized "VALU_VECTOR0" block of the SyncProll architecture by using different amounts of MC loops. FIG. 26 shows a mean shift of power and delay and also an increase of the spread depending on the MC count.

Obviously, the accuracy of the results increases with the amount of MC loops. In the experiments simulations have been performed from 20 to 1000 MC loops and comparing the mean values and deviation values of the different results. The differences in delay are in case of 20 MC and 1000 MC loop about 5%; however, this value is only an estimation. The reason is that gauss and log normal distributions have been assumed, while in reality the histogram follows a more complex function.

Another aspect is how accurately outliers can be captured. These outliers or extreme values are critical values outside of the bulk of the distribution. By using percentiles the amount of outliers captured by the different MC runs can be quantified, as shown in Table I. The percentile is calculated for X % of the population starting from maximum value. The table shows the percentile for 0.1%, 1% and 10% of delay, active and total power. By using the 0.1% percentile for delay we can see a strong increasing of maximum delay of about 18%. In case of the total and dynamic Power we have a increase for about 1% of outliers.

The simulation time for the SyncProll fully flattened description took about nine and a half hours. That means DIGIVAM can simulate about 1 Kgate per second and this for 1000 input vectors while is quite effective.

3.6. Characterization of Digital Circuits in the Presence of Outliers

One of the advantages of the VAM scheme according to embodiments of the present invention is the possibility to simulate random events not part of the main statistical distribution. This is exactly where any analytical method not assisted by Monte Carlo analysis would fail. Simply to assess the capabilities of the VAM environment an experiment has been performed where a set of 2-input NAND gates characterized for extreme variability where added to the target statistical library. Such NAND gates had approximately ten times more gate delay than the nominal gate and it was obtained by statistical simulation at the gate (analog) level by injecting a random process in the threshold voltages of the transistors of the gate netlist that were characterised by a gaussian process with a standard deviation of roughly ten times bigger than the standard deviation used to simulate the statistical gates following the "normal" statistical distribution. Only these gates showing an extreme behavior were caught and kept as "outlier" gates from all simulated gates. The number of NAND gates simulated under "normal" standard deviation conditions was 2500 gates. The number of NAND gates present in the test vehicle was about 36000 gates. A random process was developed to inject a variable number of such outliers in the netlist of the test vehicle.

TABLE II

Influence in yield loss due to the presence of outliers

| Probability for outlier | Avrg. no. outliers per netlist | Total no. failed chips (out of 200) | Yield (%) |
|---|---|---|---|
| 0 | 0 | 1 | 99.5 |
| 2.74E−05 | 1 | 6 | 97.0 |
| 4.00E−04 | 14.4 | 26 | 87.0 |
| 4.00E−03 | 145.9 | 162 | 19.0 |

FIG. 27 and Table II show the outcome of the experiment. Any statistical analysis tool would report the histogram indicated by reference number 270 as opposed to the histograms 271, 272 obtained via VAM simulation in accordance with embodiments of the present invention.

3.7. Use of VAM Flow to Guide Point Optimization Tools for Variation Aware Timing-Energy Trade-Offs The flow described above may be used to guide existing or future optimization tools that, although not being variability aware, have the goal to change and/or introduce new elements in such netlist with the purpose of changing the energy/delay parametric characteristics of the circuit. Such tools, having as input a (back-annotated) netlist of the circuit in terms of standard cells and/or the transistor level view of such standard cells and a library of such standard cells, share the same input information as the VAM flow. Therefore the flow described

TABLE I

| | Delay(ns) | | | Active Power(uW) | | | Total Power(uW) | | |
|---|---|---|---|---|---|---|---|---|---|
| MC | 0.1% | 1% | 10% | 0.1% | 1% | 10% | 0.1% | 1% | 10% |
| 10 | 6.50E−10 | 6.50E−10 | 6.35E−10 | 4.15E−05 | 4.15E−05 | 4.13E−05 | 5.99E−05 | 5.99E−05 | 5.98E−05 |
| 20 | 6.50E−10 | 6.50E−10 | 6.25E−10 | 4.15E−05 | 4.15E−05 | 4.12E−05 | 5.99E−05 | 5.99E−05 | 5.97E−05 |
| 50 | 6.50E−10 | 6.50E−10 | 6.20E−10 | 4.15E−05 | 4.15E−05 | 4.14E−05 | 6.00E−05 | 6.00E−05 | 5.99E−05 |
| 100 | 7.00E−10 | 6.85E−10 | 6.20E−10 | 4.15E−05 | 4.15E−05 | 4.14E−05 | 6.04E−05 | 6.03E−05 | 6.00E−05 |
| 200 | 7.00E−10 | 6.75E−10 | 6.20E−10 | 4.16E−05 | 4.15E−05 | 4.14E−05 | 6.04E−05 | 6.03E−05 | 6.00E−05 |
| 500 | 7.50E−10 | 6.90E−10 | 6.20E−10 | 4.18E−05 | 4.16E−05 | 4.14E−05 | 6.04E−05 | 6.02E−05 | 6.00E−05 |
| 1000 | 8.00E−10 | 6.90E−10 | 6.20E−10 | 4.18E−05 | 4.16E−05 | 4.14E−05 | 6.05E−05 | 6.02E−05 | 5.99E−05 | here may be used after the optimization phase to provide feedback to these tools on the impact of their decisions in the energy/delay/yield metrics of the circuit under variability. Indeed, the flow described in this patent shall enable such tools taking the optimal trade-off decision while accounting for the process variability effects in energy/delay and yield. One example of such optimizing goals is the step of allocating transistors with different threshold voltages in a netlist to reduce leakage power. Such allocation affects the timing of the paths in the netlist and given such timing is statistically affected by variability it may create more or other paths that become statistically critical than in nominal condition (e.g. not affected by variability), hence affecting yield.

Given the VAM flow according to embodiments of the present invention allows to estimate the energy, the timing and the yield of the circuit in statistical conditions, the flow will guide the selection process of the threshold voltage with minimal impact on yield.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention.

4. Second Embodiment of an Analysis/Simulation Flow According to Embodiments of the Present Invention How the impact of power variations originating at both device level (e.g. leakage power) as well at the gate (e.g. internal gate power) and the standard-cell netlist (e.g. switching power) percolates all the way up to the SoC level via counter-intuitive circuit level interactions (e.g. timing through glitch activity and switching power) has been shown above. To account for that impact an analysis flow has been built that aims at propagating process variability over the entire design flow. This flow discriminates four levels of design abstraction, being device compact models (for MOSFETs and parasitic extracted files for R, C, interconnects etc), standard cells, digital blocks and level SoC (including the application running on it).

The variability modeling flow according to the second embodiment of the present invention is depicted in FIG. 29. It starts from information about the impact of process variability in device compact models (such as BSIM) and from a complementary set of variability scaling rules based on measurement data, data estimated by TCAD simulations or ITRS trends. A similar approach is taken for passives and interconnects (R, C . . . ). Such "rules" include models about how variability affects transistors of different gate lengths or widths, such as Pelgrom's mismatch model for FETs.

Figure 2:
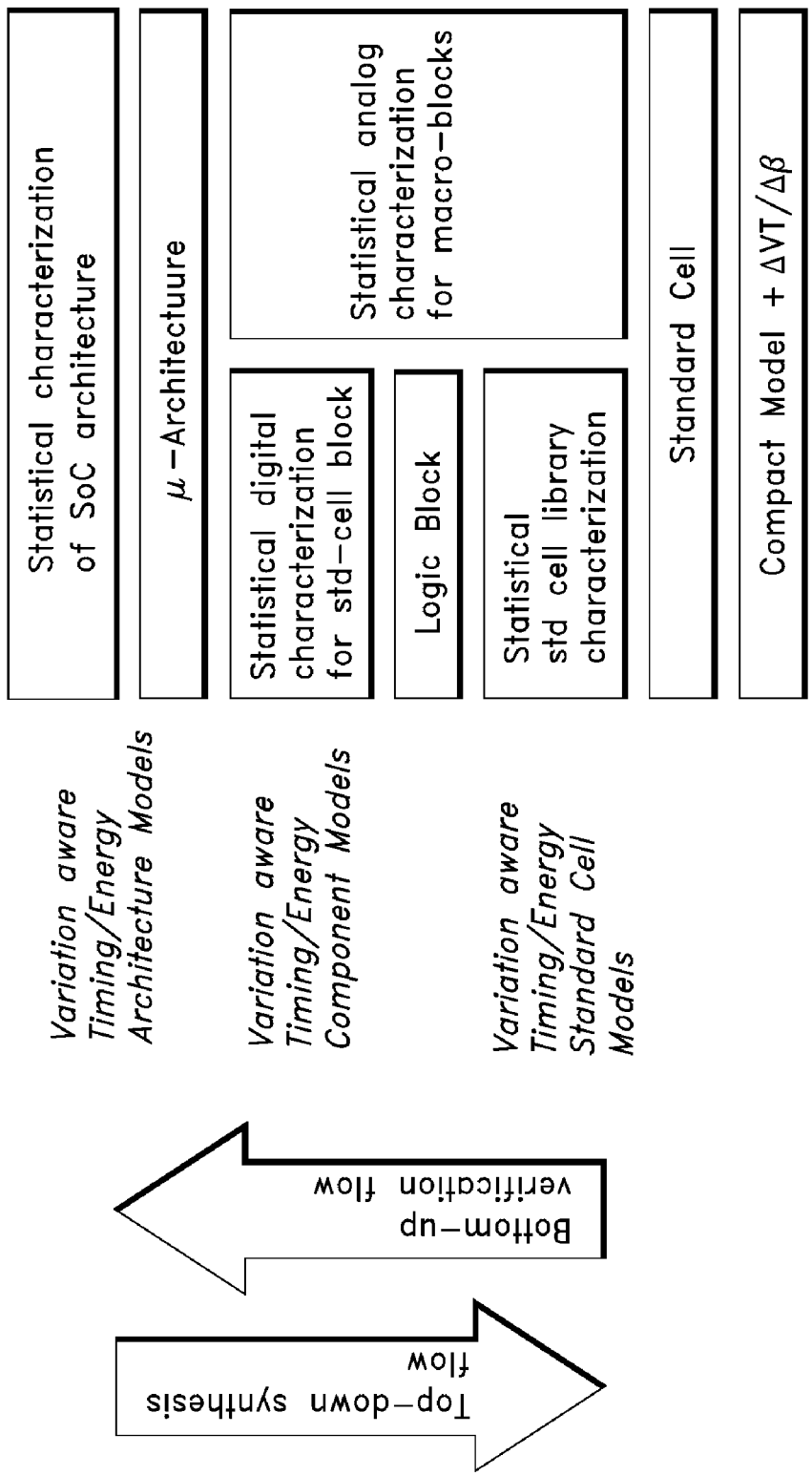
FIG. 2 shows two flows for VAM tools in accordance with embodiments of the present invention: the top-down synthesis flow, which provides the logical, physical or routing netlists; and the bottom-up VAM flow, which infects the nominal netlists with variability to estimate Energy/Delay and Yield for the system.

The flow according to the second embodiment is divided into two interleaved subflows: a variability injection flow comprising boxes (1) and (3) at the left hand side of FIG. 29 and a simulation/analysis flow comprising boxes (2) and (4) at the right hand side of FIG. 2. A fully analytical technique (described in EP-07075505.3) integrates in box (5) the correlated power/delay variations from each of the SoC subcomponents to obtain the unified SoC level statistics in the form of a trade-off model between SoC level design metrics such as parametric yield, clock frequency and power.

The goal of the variability injection flow is twofold:

(a) given an invariant (e.g. nominal) target standard cell SPICE netlist to create Monte-Carlo versions of the different cells of the target cell library (this is done by adding voltage and current sources of random values in the netlist of the standard cell; and (b) given an invariant Verilog netlist of the circuit to create Monte-Carlo versions of this Verilog netlist (this is done by randomly replacing the original cell of the Verilog netlist by one of the cells found in a Monte-Carlo characterized Jib library).

On the other hand, the goal of the simulation/analysis flow is twofold:

(a) to simulate at the analogue level each of the SPICE cell netlists so as to generate a set of characterized libraries (Jib) which will be used for later digital analysis/simulation;

(b) to analyze and simulate at the digital level each of the Verilog netlists to provide correlated timing, activity and power reports.

The flow for this digital analyis/simulation is illustrated in FIG. 30. It is based on a matlab script as master process controlling two slave Synopsys DC-shell and Mentor Graphics Modelsim processes. The Synopsys DC-shell process serves the purpose of providing conventional static timing analysis and standard power analysis capabilities to the flow. The Mentor Graphics Modelsim process provides standard time sensitive logic simulation capabilities. The standard static timing analysis results in a delay format report, e.g. a standard delay format report (.sdf) and critical path for each Verilog netlist which are then fed into the logic simulator resulting in value change dump report for activity (.vcd) which is then analyzed by a power analysis tool for final reporting on dynamic and leakage power consumptions. As mentioned above, the simulation flow may build on top of mainstream commercial EDA analysis tools and simulators. For example, it may be built on top of Mentor Graphics's Modelsim simulator (for RTL and gate level simulation) and on top of Synopsys's PrimeTime and PrimePower analysis tools for static timing and power analysis purposes. However, any other available tool performing the cited functionality can serve the purpose. A Matlab script around these third party tools may implement a Monte-Carlo based methodology. In particular, the implementation of the flow may be tuned to make Matlab code to direclty interact with the API interfaces of the third party tools to avoid unnecessary reparsing of the topologically identical Verilog netlists. In this way timing may be analysed, a logic simulation may be performed and power may be analysed with an average of 2K gate per second per simulation including 2K vector logic simulation. Indeed, 200 iterations of a flow according to the second embodiment for a 120K-gate test vehicle may take less than 4 hours.

The analysis at the integration level (see box 5 of the flow, FIG. 29) may actually be performed hierarchically. If the components are so large that digital simulation becomes too time consuming, the digital level analysis flow (box 4 of FIG. 29) may be applied to the sub-parts of the SoC components and then the component level results may be obtained using this technique. This can be done on condition the SoC component is broken up at places where register boundaries exists (see EP-07075505.3), for instance the logic between pipeline stage in a processor (see experimental results below). At the integration stage it can applied to bring together all top-level component statistical properties.

5. Experimental Results of the Second Embodiment

The variability modeling flow of the second embodiment has been applied, including the technique for SoC analysis proposed in EP-07075505.3, to the wireless test vehicle described above. This way variability impact has been percolated all the way up from the device to the processor level. FIG. 31 illustrates the joint probability density function for the complete VLIW processor between longest path delay and energy.

In this case leakage power has been transformed into leakage energy by assuming a clock cycle equal to the longest path delay and considering the SoC requires 1714 of these cycles to complete one symbol synchronization. This is indeed the total simulation time considered for the calculation of dynamic energy during logic simulation. Similarly we can proceed to transform dynamic energy into dynamic power disipation but this time dividing energy by the total simulation time. FIG. 32 shows the less intuitive statistical correlation between timing and power (both dynamic and leakage).

The nominal results for longest path delay, dynamic energy and leakage power are about 8 ns, 57 pJ and 633 uW respectively. They are shown as thick lines in the graphs. Now as variability is used, the whole SoC suffers a significant shift on the mean value for all three metrics: longest path delay (+35%—see FIG. 31(A)), dynamic energy (+35%—see FIG. 31(B), and leakage energy (+10%—see FIG. 32(C)); and a considerable +/−3\sigma spread also in each metric: longest path delay (52%), dynamic energy (35%) and leakage power (10%).

Having a complete framework for variability impact propagation of correlated timing and power metrics enables the co-exploration of the design and manufacturing space. These can include technology options, like evaluations of the impact of high-k metal gates or high/low Vth devices; manufacturing options, like restricted design rules; circuit options, like threshold voltage assignment in MTCMOS libraries or different circuit architectures; architecture options, like memory organization partitioning versus aggregation. An experiment has been performed to evaluate the impact that threshold voltage has in the selection of the device type option for a wireless test-vehicle. These are two devices, the already characterized 300 mV low standby device (hereafter called standard Vth option) and an extra faster device with 200 mV as nominal theshold voltage (hereafter called low Vth option).

At the top level, the SoC's yield is evaluated as a function of its specifications, which are expressed as clock frequency, power budget, but also others as supply voltage range, temperatures range, etc. FIG. 31 shows the yield (expressed as the Cumulative Density Function) for each of the device options at the full VLIW processor level.

Additionally, by performing a horizontal "cut" in these curves, in FIG. 33 an iso-yield map of the SoC yield as a function of clock cycle time and total energy consumption can be displayed. It is to be noted that the more leaky technology provides a faster execution for partial yield (less than 100%) while for full 100% yield, the standard Vth technology becomes more attractive. The reason is that in the experiment described the same amount of variability (60 mV) has been kept in both options. While this represents a 20% variability for the 300 mV case it becomes a 30% variabilty for the 200 mV case. Hence the design using the low Vth option is more exposed to the impact of variability. This is a counter-intuitive effect that can only be observed at the top processor level though. Thus the need for holistically percolate timing/energy variability to the highest possible level of abstraction.

6. RTL-to-RTL Level Monitor Insertion Method and Flow for Digital Circuits

6.1. Introduction

Hereinafter a design flow is described to perform the automatic insertion of monitors of different nature (analog, digital) in an essentially digital circuit so as to gather online parametric information of the timing, power, voltage, temperature and other important metrics from the internal sub-components of the circuit including its interconnection and communication subsystems, according to a further aspect of the present invention. Such information gathering does not interfere with the functionality of such device thus can take place during operation. Such flow allows describing the behavior and/or the connectivity of the monitor circuitry at a high abstraction level, above the cell/gate level netlist, hence at the RTL level. Consequently, existing synthesis and digital design flows can be used to carry out the implementation of these monitors and their connection to the circuit in the form of a VERILOG and/or VHDL compatible cell level description, without requiring additional custom synthesis steps or tools. Complementary to that, and once a cell level netlist description is obtained; any physical design flow can thereby used to deliver the layout of the integrated circuit performing the original intended functionality including the desired additional monitoring capabilities.

Such flow benefits from a number of properties, such as, but not limited to:
- It builds on top of existing RTL synthesis tools and flows for digital design hence is compatible with any vendor specific tool or combination of tools, hence not requiring extra implementation steps compared to the existing widely accepted design practice. Therefore easily adoptable by existing industrial design practices.
- It guarantees that the timing constraints of the modified design obey these intended for the original design. This property is a straightforward consequence of performing the modification of the design at the RTL level where the target timing constraints are considered by the synthesis tool to be met for the complete transformed RTL code as one single behavior.
- It allows the functional validation of the combination of the original code and the monitoring functionality using essentially the same test bench as the one intended for the original behavior.

6.2. Description of the Method

Figure 1:
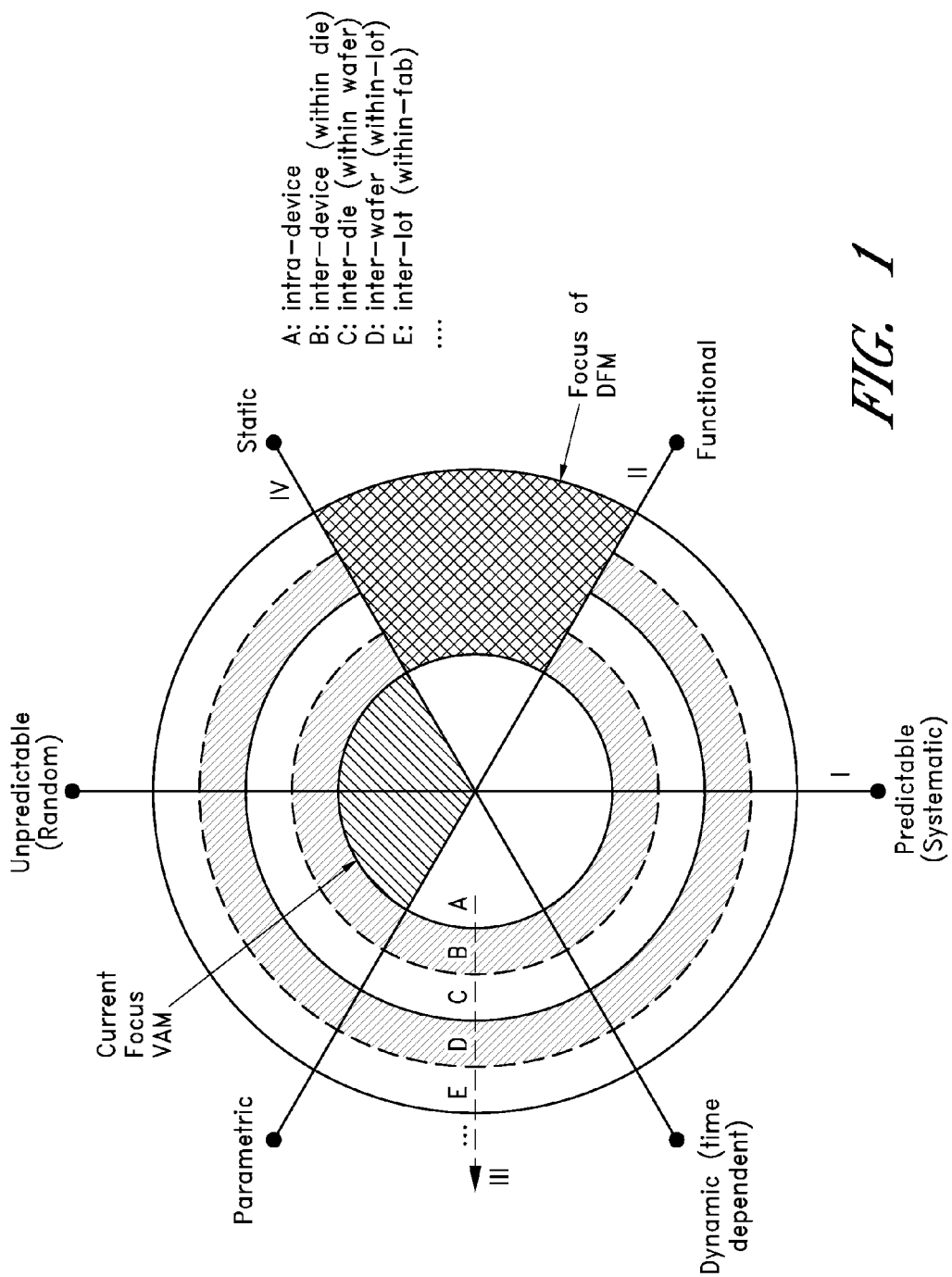
FIG. 1 shows a four axes classification for process variability because of manufacturing problems. DFM (Design for Manufacturability) and DFV (Design for Variability) tools can solve the grey hatched areas. The current focus of VAM in accordance with embodiments of the present invention is indicated in FIG. 1. VAM also is extendible to cover the whole area at the left of the piem, including the parametric effects of dynamic nature

One aspect of the invention relates to method for the insertion of digital and/or analog monitors in the digital circuits where this is done before synthesis, hence at the RTL level, as opposed to all other described techniques where this is done after synthesis, hence at the netlist level. The method comprises two steps as illustrated in FIG. 1.

6.2.1. Step 1. Monitor Instantiation

A delay monitor senses the position of an edge of a combinational logic output relative to the clock edge that controls the corresponding FlipFlop (FF). Therefore the goal of Step 1 of the flow is to identify in the RTL code these places where the synthesis tool will infer sequential logic. Such places are easily recognized in the code whenever an assignment to a signal or variable takes place conditional to waiting for a clock event. Indeed a property of RTL is that there exists a one-to-one mapping between such constructs of the code and the inferred FFs. The actual syntax depends on the language used to describe the RTL functionality. However, the mechanism is essentially the same in both languages.

In FIG. 35, the Right Hand Side (signal_RHS) of the statement corresponds to the output of the path of the combinational logic that will be monitored (D port of the inferred FF); while the Left Hand Side (signal_LHS) corresponds to the output of the inferred FF (Q port of such FF). The delay monitor must connect in parallel to the inferred FF (see FIG. 36) in such way that the combinational logic output (signal_LHS) serves as input to both the FF and the delay monitor. This may be done by enforcing a port assignment (or port mapping in VHDL) between both the left hand side of the statement (signal_LHS) and the D-input of the delay monitor.

Similarly must be done to perform the connection between the output of the inferred FF (0 port of such FF) and the external input of the XOR gate of the delay monitor (see FIG. 36). In this case, the port assignment is done between the right hand side of the assignment (signal_RHS) and the XOR-input of the delay monitor. Such transformation is illustrated in FIG. 35.

By following these modifications the synthesis tool will exactly infer the circuit shown in FIG. 36 and the connections of this to the accompanying combinational logic and to any other logic and sequential elements that may be inferred from such code.

6.2.2. Step 2. Synthesis and Monitor Routing

After transforming the RTL according to the method described above, the next step is to perform both logic synthesis and scan chain insertion phases. As motivated in the introduction section, no special care needs to be taken during synthesis. However some care must be taken during the scan chain insertion phase (part of the Design For Testability or DFT flow). In particular additional scan chains besides the ones dedicated to testing purposes must be created during the synthesis script to service the monitors. Also it may be advantageous to specify the synthesis tool that only the output latches or FFs of the timing monitors shall be integral part of such additional scan chains and not the FF used to pre-sample the signal to monitor (see FIG. 36).

6.3. Description of the Delay Monitor

The purpose of a digital delay monitor is to detect any 'significant' shifts in delay of the combinational logic whose outputs shall be connected to the data input of a latch or FlipFlop (FF) of any type (e.g., rising-edge-triggered flip-flop, falling-edge-triggered flip-flops, latches, etc) inferred by the RTL synthesis tool. This is done by adding (rather than modifying) in parallel to the inferred standard latch or flip-flop the behavior of a "crystal ball" FF whose purpose is to pre-sample, using a delay element, the output of the combinational logic according by a pre-specified time slack and to compare it with an XOR operation with the value captured by the FF inferred at the RTL code. The circuit up to the XOR is prone to invalidation due to hazards. Therefore to avoid this situation, the output of the XOR is fed into a latch with set/reset capabilities to make sure the output of the delay monitor can be set to a known state prior to measurement. The output of the latch is then captured by a FF that will serve the purpose of being part of a scan chain that will take the monitor bits to a known location in the chip and/or the outside world for subsequent analysis. The power impact of the delay element is small since the activity factor of the combinational logic output is lower than the clock. Moreover, if the aging sensors are mostly turned off and are turned on as and when required, then the power impact will be very small as well.

When the slack is violated due to a timing degradation of the monitored path (e.g. due to process variations, aging, temperature gradients, IR induced voltage drops or any other physical mechanism), the delay monitor will report a fault in the form of a Boolean output. Moreover, the information carried on by the Boolean output in combination with a controlled sweeping of the clock frequency can be used to measure the actual absolute timing of the critical path of the device. The accuracy of such measurement shall be equal to the delay introduced by delay line that is found inside the delay monitor. Because the Boolean just indicates a particular monitored path that is about to suffer from a timing violation but not yet, that path and the rest of the device paths remain still functional, hence facilitating a successful read out of the monitoring information. This approach enables runtime gathering of information concerning the impact of ageing and/or process variations at the circuit level. Such information can be advantageous to calibrate higher level models of the system. When repeated over a number of samples such information shall be used to calibrate statistical models of the subsystems of the device being sensed.

The delay monitor behavior can be described at the RTL level. See Appendix B for details.

6.4. Other Analog Monitors

Monitors of analog nature such as voltage, current, energy or temperature monitors between others can be also introduced at the RTL by following the techniques described in Section 6.2. The description of such monitor, however, will differ from the delay monitor. Given the analog nature of the monitor, such description will serve the purpose of allowing a behavioral simulation of the complete digital device at the RTL level. During synthesis such monitor shall become part of the available design library as a cell or a macro cell. Specific constructs such as: map to operator (see Synopsys' DC-shell manual for description) will be part of the RTL description of such monitor to instruct the synthesis tool to select a pre-designed cell of the library where such behavioral description shall be mapped to. In synthesis tools from other vendors such direct mapping capabilities from the RTL to a selected component in the library are also available (see vendor specific manuals).

Such analog monitor will have at the output the same combination of latch and FF such as that one being found in FIG. 36 to allow scan chain routing capabilities.

7. Abbreviations Used

IMEC Inter-universitary Micro Electronic Center
ITRS International Technology Road-map for Semiconductors
TAD Technology Aware Design
LISA Language Instruction Set Architecture
VAM Variability Aware Model
VAMIF Variability Aware Model Interface
DFM Design For Manufactoribility
DFV Design For Variability
SSTA Statistical Static Timing Analysis
MC Monte Carlo
PTM Predictive Technology compact model
DDSM Deep Deep Sub Micron
RTL Register Transfer Level
RDF Random Dopant Fluctuations
CMP Chemical Mechanical Polishing
OPC Optical Proximity Correction
LER Line Edge Roughness
CMOS Complementary Metal Oxide Semiconductor
MOSFET Metal Oxide Semiconductor Field Effect Transistor
VLIW Very Long Instruction Word
SDR Software Defined Radio SoC System on Chip
VHDL Very High Speed Integrated Circuit Hardware Description Language
SDF Standard Delay Format
SAIF Switching Activity Interchange Format
VCD Value Change Dump
SDC Synopsis Design Constraint
SPEF Synopsis Parasitics Exchange Format
DB Data Base
LIB Liberty
VITAL VHDL Initiative Towards ASIC Libraries
WLAN Wireless Local Area Network
WIMAX Worldwide Interoperability for Microwave Access
HVT High Voltage Transistor
LPT Low Power Transistor
SRAM Static Random Access Memory
FSM Finite State Machine

8. Conclusion

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

APPENDIX A

VHDL Description of Finite State Machine (Original without Monitor)

```
library ieee ;
use ieee.std_logic_1164.all;
---------------------------------------------------------
entity seq_design is
port(    a:      in std_logic;
         Clk:    in std_logic;
         reset:  in std_logic;
         x:      out std_logic
);
end seq_design;
---------------------------------------------------------
architecture FSM of seq_design is
    -- define the states of FSM model
    signal next_state, current_state: std_logic_vector (1 downto 0);
    constant S0 : STD_LOGIC_VECTOR := "00";
    constant S1 : STD_LOGIC_VECTOR := "01";
    constant S2 : STD_LOGIC_VECTOR := "10";
    constant S3 : STD_LOGIC_VECTOR := "11";
begin
    -- cocurrent process#1: state registers
    state_reg: process(Clk, reset)
    begin
        if (reset='1') then
            current_state <= S0;
        elsif (Clk'event and Clk='1') then
            current_state <= next_state;
        end if;
    end process;
    -- cocurrent process#2: combinational logic
    comb_logic: process(current_state, a)
    begin
    -- use case statement to show the
    -- state transistion
    case current_state is
        when S0 =>          x <= '0';
            if a='0' then
                next_state <= S0;
            elsif a ='1' then
                next_state <= S1;
            end if;
        when S1 =>          x <= '0';
            if a='0' then
                next_state <= S1;
            elsif a='1' then
                next_state <= S2;
            end if;
        when S2 =>          x <= '0';
            if a='0' then
                next_state <= S2;
            elsif a='1' then
                next_state <= S3;
            end if;
        when S3 =>          x <= '1';
            if a='0' then
                next_state <= S3;
            elsif a='1' then
                next_state <= S0;
            end if;
        when others =>
            x <= '0';
                next_state <= S0;
    end case;
    end process;
end FSM;
```

APPENDIX B

VHDL Description of Delay Monitor

```
---------Top Level Circuit
library ieee;
use ieee.std_logic_1164.all;
entity DM is
port (    DMDin: in std_logic;
          DMQin: in std_logic;
          Clk: in std_logic;
          TADRst: in std_logic;
          TADClk: in std_logic;
          Sout: out std_logic
);
end DM;
-------------------------------------
architecture behv of DM is
signal DMQout, DMout, RSout: std_logic;
begin
            process(DMDin, Clk)
                begin
                    if (Clk='1' and Clk'event) then
                        DMQout <=DMDin;
                    end if;
                end process;
            DMout <= DMQin XOR DMQout;
            process(Clk, DMout, TADRst)
```

```
            begin
                if(TADRst='1') then
                    RSout <= '0';
                elsif (Clk='1' and Clk'event) then
                    if(DMout='1') then
                        RSout <= '1';
                    end if;
                end if;
            end process;
            process(TADClk)
                begin
                    if(TADClk='1' and TADClk'event) then
                        Sout <= RSout;
                    end if;
            end process;
end architecture behv;
```

APPENDIX C

Transformed VHDL Description of Finite State Machine with Monitor

```
library ieee ;
use ieee.std_logic_1164.all;
use ieee.std_logic_arith.all;
-----------------------------------------------
entity seq_design is
port(   a:          in std_logic;
        Clk:        in std_logic;
        TADClk:     in std_logic;
        reset:      in std_logic;
        x:          out std_logic;
        TADRst:     in std_logic;
        DelayMouts: out std_logic_vector (1 downto 0)
);
end seq_design;
library ieee;
use ieee.std_logic_1164.all;
entity DM is
    port(DMDin, DMQin, Clk, TADRst, TADClk: in std_logic;
         Sout: out std_logic);
end DM;
-----------------------------------------------
architecture behv of DM is
signal DMQout, DMout, RSout: std_logic;
begin
    process(DMDin, Clk)
        begin
            if (Clk='1' and Clk'event) then
                DMQout <=DMDin;
            end if;
        end process;
    DMout <= DMQin XOR DMQout;
    process(DMout, TADRst)
        begin
            if(TADRst='1') then
                RSout <= '0';
            elsif(Clk='1' and Clk'event) then
                if(DMout='1') then
                    RSout <= '1';
                end if;
            end if;
        end process;
    process(TADClk)
        begin
            if(TADClk='1' and TADClk'event) then
                Sout <= RSout;
            end if;
        end process;
end architecture behv;
architecture FSM of seq_design is
    component DM
        port(DMDin, DMQin, Clk, TADRst, TADClk : in std_logic;
             Sout: out std_logic);
    end component;
    -- define the states of FSM model
    signal next_state, current_state: std_logic_vector (1 downto 0);
    constant S0 : STD_LOGIC_VECTOR := "00";
    constant S1 : STD_LOGIC_VECTOR := "01";
    constant S2 : STD_LOGIC_VECTOR := "10";
    constant S3 : STD_LOGIC_VECTOR := "11";
begin
    -- cocurrent process#1: state registers
    state_reg: process(Clk, reset)
    begin
        if (reset='1') then
            current_state <= S0;
        elsif (Clk'event and Clk='1') then
            current_state <= next_state;
        end if;
    end process;
    -- Delay Monitor insertion
        DelayMonitor_Inst1: DM
        port map (
            DMDin => next_state(0),
            DMQin => current_state(0),
            Clk => Clk,
            TADRst => TADRst,
            TADClk => TADClk,
            Sout => DelayMouts(0)
        );
        DelayMonitor_Inst2: DM
        port map (
            DMDin => next_state(1),
            DMQin => current_state(1),
            Clk => Clk,
            TADRst => TADRst,
            TADClk => TADClk,
            Sout => DelayMouts(1)
        );
    -- cocurrent process#2: combinational logic
    comb_logic: process(current_state, a)
    begin
        -- use case statement to show the
        -- state transistion
        case current_state is
            when S0 =>          x <= '0';
                if a='0' then
                    next_state <= S0;
                elsif a ='1' then
                    next_state <= S1;
                end if;
            when S1 =>          x <= '0';
                if a='0' then
                    next_state <= S1;
                elsif a='1' then
                    next_state <= S2;
                end if;
            when S2 =>          x <= '0';
                if a='0' then
                    next_state <= S2;
                elsif a='1' then
                    next_state <= S3;
                end if;
            when S3 =>          x <= '1';
                if a='0' then
                    next_state <= S3;
                elsif a='1' then
                    next_state <= S0;
                end if;
            when others =>
                x <= '0';
                next_state <= S0;
        end case;
    end process;
end FSM;
```

APPENDIX D

Synopsys's Synthesis Script for RTL to Logic
Synthesis and Scan Chain Generation of FSM
Circuit Including Delay Monitor

```
set synopsys_file = /imec/software/synopsys/release2007/setup/setup_syn_v2007.03-SP5.csh
source ${synopsys_file}
read_lib ../RC_library/SYNTHESIS/tcbn90ghpwc.lib
list_libs
write_lib -format db tcbn90ghpwc -output /imec/users/anchlia/RC_library/SYNTHESIS/tcbn90ghpwc.db
set search_path "$search_path /imec/users/anchlia/RC_library/SYNTHESIS/"
set link_library tcbn90ghpwc.db
set target_library tcbn90ghpwc.db
read_vhdl /imec/users/anchlia/RC_library/SCRIPTS/fsm_withdm.vhd
set hdlin_enable_presto_for_vhdl TRUE
set hdlin_check_no_latch true
set case_analysis_with_logic constants true
set compile_report_dp true
set enable_edif_netlist_writer true
# Design Constraints
create_clock   -name "Clk" -period 5.0 [get_ports "Clk"]
create_clock   -name "TADClk" -period 5.0 [get_ports "TADClk"]
set_fix_hold "Clk"
set_fix_hold "TADClk"
set_operating_conditions WCCOM -library tcbn90ghpwc
set_driving_cell -library tcbn90ghpwc -lib_cell "INVD1" [all_inputs]
set_clock_uncertainty -setup 0.05 [all_clocks]
set_clock_uncertainty -hold 0.05 [all_clocks]
set_clock_transition 0 [all_clocks]
set_input_delay   -max 0.500 -clock [get_clocks Clk] [remove_from_collection [all_inputs] [get_ports "Clk"]]
set_input_delay   -max 0.500 -clock [get_clocks TADClk] [remove_from_collection [all_inputs] [get_ports "TADClk"]]
set_input_delay   -min 0.200 -clock [get_clocks Clk] [remove_from_collection [all_inputs] [get_ports "Clk"]]
set_input_delay   -min 0.200 -clock [get_clocks TADClk] [remove_from_collection [all_inputs] [get_ports "TADClk"]]
set_output_delay -max 0.400 -clock [get_clocks Clk] [all_outputs]
set_output_delay -max 0.400 -clock [get_clocks TADClk] [all_outputs]
set_output_delay -min 0.200 -clock [get_clocks Clk] [all_outputs]
set_output_delay -min 0.200 -clock [get_clocks TADClk] [all_outputs]
set_min_delay 0.300 -from [get_ports DelayMonitor_Inst1/DMDin] -to [get_pins DelayMonitor_Inst1/DMQout_reg/next_state]
set_min_delay 0.300 -from [get_ports DelayMonitor_Inst2/DMDin] -to [get_pins DelayMonitor_Inst2/DMQout_reg/next_state]
set_load 0.10 [all_outputs]
group_path -name INPUTS         -from [remove_from_collection [all_inputs] [get_ports *Clk]]
group_path -name OUTPUTS        -to [all_outputs]
group_path -name IN_TO_OUTS -from [remove_from_collection [all_inputs] [get_ports *Clk]] -to [all_outputs]
remove_attribute tcbn90ghpwc/TIEH dont_touch
remove_attribute tcbn90ghpwc/TIEL dont_touch
set_wire_load_mode top
set_wire_load_model -name ZeroWireload
# Synthesis
compile -boundary_optimization -scan
# DFT Setting
create_port -direction "in" "test_se"
set_dft_signal -view existing_dft -type ScanEnable -port test_se -active_state 1
hookup_testports -verbose
set test_default_scan_style multiplexed_flip_flop
set_scan_configuration -chain_count 2
set_dft_signal -view existing_dft -type ScanClock -port Clk -timing [list 48 50]
set_dft_signal -view existing_dft -type ScanClock -port TADClk -timing [list 48 50]
set_dft_signal -view existing_dft -type Reset -port reset -active_state 1
# Special Scan-Chain look alike connection only through the Output FFs of Delay Monitor
set_scan_path chain1 -head_elements {DelayMonitor_Inst1/Sout_reg} -tail_elements {DelayMonitor_Inst2/Sout_reg} -exact_length 2
```

```
create_test_protocol
dft_drc
report_scan_configuration
report_dft_signal
insert_dft
report_dft -scan
```

APPENDIX E

Synthesis Outcome

FIG. 37 illustrates a Gate level netlist after synthesis of original FSM (behavior in Appendix A).

FIG. 38 illustrates a Gate level netlist after synthesis of transformed FSM (behavior including delay monitor as described in Appendix C).

FIG. 39 illustrates the Gate level netlist of Delay Monitor after Synthesis

What is claimed is:

1. A method of determining an estimate of statistical properties of an electronic system comprising individual components subject to manufacturing process variability, the method comprising:
   (1) obtaining a description of the composition of the electronic system in terms of which individual components are used, the description using only standard cells without any additional hierarchical component;
   (2) obtaining statistical properties of the performance of individual components of the electronic system;
   (3) obtaining information about execution of an application on the system;
   (4) simulating execution of the application based on the obtained information about execution of the application on the system for a simulated electronic system realization constructed by selecting individual components with the obtained statistical properties determining the properties of the 1st and 2nd performance variables of the electronic system;
   (5) determining the statistical properties of the 1st and 2nd performance variables of the electronic system;
   (6) simulating execution of the application based on the obtained information about execution of the application on the system for another simulated electronic system realization constructed by selecting individual components with the obtained statistical properties determining the properties of the 1st and 2nd performance variables of the electronic system; and
   (7) updating the statistical properties of the 1st and 2nd performance variables of the electronic system; and
   (8) repetitively executing the simulating in (6) and the updating in (7),
   wherein the method is performed at least in part by at least one computing device.

2. The method according to claim 1, wherein the 1st performance variable is delay, and the 2nd performance variable is energy consumption of the individual components and electronic system.

3. The method according to claim 1, wherein the determining of the 1st property of the electronic system realization comprises critical path timing analysis and the timing of each of the individual components.

4. The method according to claim 1, wherein the determining of the 2nd property of the electronic system realization comprises activity based energy consumption analysis based on the timing of the individual components.

5. The method according to claim 4, wherein the determining of the 1st property of the electronic system realization comprises critical path timing analysis and the timing of each of the individual components, and wherein the determining and/or updating the statistical properties of the electronic system comprises combining the information from the critical path timing analysis and the activity based energy consumption analysis.

6. The method according to claim 1, wherein the obtaining of statistical properties of the electronic system is at least partly based on information gathered from run-time monitors inserted in manufactured electronic systems.

7. The method according to claim 1, further comprising comparing the obtained statistical properties of the electronic system with information gathered from run-time monitors inserted in manufactured electronic systems, and using the comparison for calibrating the method.

8. The method according to claim 1, further comprising, based on the determined statistical properties of the electronic system, estimating system yield loss.

9. A non-transitory computer-readable medium having stored therein a computer program product for performing the method according to claim 1 when executed on a computer.

10. A modeling tool adapted for carrying out a method according to claim 1.

11. A system for determining an estimate of statistical properties of an electronic system comprising individual components subject to manufacturing process variability, the system comprising:
   means for obtaining a description of the composition of the electronic system in terms of which individual components are used, the description using only standard cells without any additional hierarchical component;
   means for obtaining statistical properties of the performance of individual components of the electronic system;
   means for obtaining information about execution of an application on the system;
   means for simulating execution of the application on a computing device based on the obtained information about execution of the application on the system for a simulated electronic system realization constructed by selecting individual components with the obtained statistical properties determining the properties of the 1st and 2nd performance variables of the electronic system;
   means for determining the statistical properties of the 1st and 2nd performance variables of the electronic system; and
   means for repetitively (a) simulating execution of the application based on the obtained information about execution of the application on the system for another simulated electronic system realization constructed by selecting individual components with the obtained statistical properties determining the properties of the 1st and 2nd performance variables of the electronic system and (b) updating the statistical properties of the 1st and 2nd performance variables of the electronic system.

* * * * *